US009628016B2

(12) United States Patent
Lamascus et al.

(10) Patent No.: US 9,628,016 B2
(45) Date of Patent: Apr. 18, 2017

(54) ELECTRICAL APPARATUS AND CONTROL SYSTEM

(71) Applicant: Harold Wells Associates, Inc., Orange, CA (US)

(72) Inventors: Craig Lamascus, La Habra, CA (US); Lloyd Wentworth, Silverado, CA (US)

(73) Assignees: Craig Lamascus, Orange, CA (US); Lloyd Wentworth, Orange, CA (US)

( * ) Notice: Subject to any disclaimer, the term of this patent is extended or adjusted under 35 U.S.C. 154(b) by 404 days.

(21) Appl. No.: 14/049,693

(22) Filed: Oct. 9, 2013

(65) Prior Publication Data
US 2015/0097504 A1 Apr. 9, 2015

Related U.S. Application Data

(63) Continuation of application No. PCT/US2012/033009, filed on Apr. 11, 2012.
(Continued)

(51) Int. Cl.
*H02P 7/00* (2016.01)
*H02P 27/04* (2016.01)
(Continued)

(52) U.S. Cl.
CPC ............ *H02P 27/04* (2013.01); *E21B 43/127* (2013.01); *F04B 47/02* (2013.01); *F04B 49/06* (2013.01); *F04B 49/20* (2013.01)

(58) Field of Classification Search
CPC .......... F01K 25/06; F01K 27/00; H02J 3/386; G06Q 50/06; Y02B 10/30; H02P 21/12
(Continued)

(56) References Cited

U.S. PATENT DOCUMENTS 4,982,147 A * 1/1991 Lauw ............... H02P 25/021
318/721
2004/0145932 A1* 7/2004 Skeist ............... H02M 5/272
363/152
(Continued)

OTHER PUBLICATIONS

PCT/US2012/033009 Search Report.Written Opinion, Aug. 3, 2012, Harold Wells Assoc Inc.
(Continued)

*Primary Examiner* — Eduardo Colon Santana
*Assistant Examiner* — Gabriel Agared
(74) *Attorney, Agent, or Firm* — John J. Connors; Connors & Associates pc

(57) ABSTRACT

In a system that receives power from an electric power grid, a variable frequency AC drive has an output connected to an AC electric motor, and an input connected to the power grid. The motor is in 1 connection with a load, and the AC drive includes an active converter having a predetermined maximum apparent power capacity. The converter is coupled to a controller programmed to regulate reactive power generation and consumption of the variable frequency AC drive so that the drive produces reactive power when the converter is utilizing less than its maximum apparent power capacity. This reactive power is fed to the power grid. A device monitors current and voltage in the power grid and calculates power factor, which is then used as a feedback to an external controller that generates a reactive power reference signal intended to control the system's power factor. The controller is programmed to respond to the signal, controlling power generation and consumption so that the combination of reactive power and real power does not result in apparent power exceeding the maximum capacity of the active converter and avoids generating reactive power that would result in a leading power factor for the system.

7 Claims, 34 Drawing Sheets

Related U.S. Application Data

(60) Provisional application No. 61/475,336, filed on Apr. 14, 2011.

(51) Int. Cl.
*F04B 47/02* (2006.01)
*F04B 49/06* (2006.01)
*F04B 49/20* (2006.01)
*E21B 43/12* (2006.01)

(58) Field of Classification Search
USPC .......................................................... 318/490
See application file for complete search history.

(56) References Cited

U.S. PATENT DOCUMENTS

| | | | | |
|---|---|---|---|---|
| 2004/0222642 | A1* | 11/2004 | Siebenthaler | F03D 7/0224 |
| | | | | 290/44 |
| 2007/0013190 | A1* | 1/2007 | Al-Khayat | H02M 7/48 |
| | | | | 290/40 B |
| 2008/0241614 | A1* | 10/2008 | McCanney | B60L 1/003 |
| | | | | 429/411 |
| 2010/0038907 | A1* | 2/2010 | Hunt | E21B 41/0085 |
| | | | | 290/7 |

OTHER PUBLICATIONS

PCT/US2012/033009 Prelim Report on Patentability, Harold Wells Assoc Inc.

\* cited by examiner

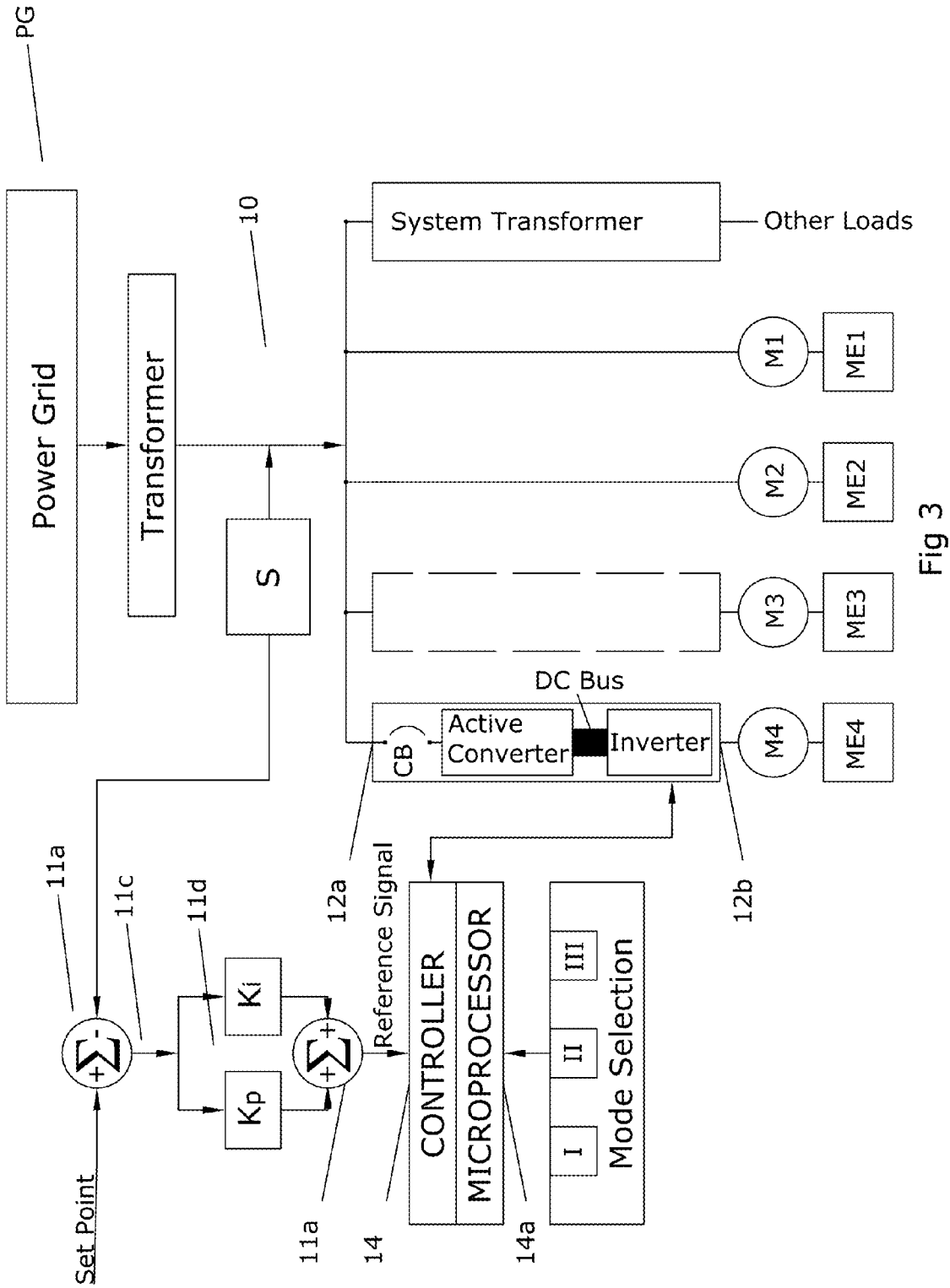

P=0 KW
Q=378 KVAR
S=378 KVA
$\phi = 90°$

P=1,160 KW
Q=919 KVAR
S=1,479 KVA
ϕ = 38.7 degrees

P=1,160 KW
Q=169 KVAR
S=1,172 KVA
ϕ =8.3 degrees

P=1,160 KW
Q=227 KVAR
S=1,181 KVA
ϕ =11.1 degrees

ELECTRICAL APPARATUS AND CONTROL SYSTEM

RELATED PATENT APPLICATIONS & INCORPORATION BY REFERENCE

This application is a continuation application of International Application No. PCT/US 2012/033009, international filing date of Apr. 11, 2012, filed pursuant to 35 USC §363 and claims priority based on U.S. Provisional Patent Application No. 61/475,336, entitled "Electrical Apparatus and Control System," filed Apr. 14, 2011. These related patent applications are incorporated herein by reference and made a part of this application. If any conflict arises between the disclosure of the invention in the PCT application and that in the related provisional patent application, the disclosure in the PCT application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The words "substantially" and "essentially" have equivalent meanings.

The words "oil well" include natural gas wells, and oil and gas wells including water or other fluids.

The word "power" means the rate of flow of energy past a given point in an electrical circuit.

The words "apparent power capacity" mean the limit of a given circuit or device to electrically transfer apparent power. Usually, apparent power capacity is expressed in units of volt-amperes or kilovolt-amperes (KVA) and is meant to convey the KVA limit for an extended period of time, or on a continuous basis.

The words "apparent power" mean the vector sum of the real power and the reactive power. Units are usually expressed as kilovolt-amperes (KVA).

The words "real power" mean the portion of power, averaged over one complete cycle of an alternating current period of the AC wave form, resulting in the net transfer of energy in one direction. Units are usually expressed as kilowatts (KW).

The words "reactive power" mean the portion of power due to stored energy returned to the source (power grid, for example) in each AC cycle. Units are usually expressed as kilovolt-amperes reactive (KVAR).

The words "power factor" mean the ratio of real power to apparent power.

The words "leading power factor" mean a power factor in which current leads the voltage in phase.

The words "lagging power factor" mean a power factor in which the current lags the voltage in phase.

The following abbreviations mean
AC—Alternating Current
C—Celsius
CB—Circuit Breaker
DC—Direct Current
F—Fahrenheit
HZ—Hertz
IGBT—Insulated Gate Bipolar Transistor
K—Kelvin
K—kilo or 1,000 of any unit
M—million or 1,000,000 of any unit
PF—Power Factor
RMS—Root Mean Square
VAC—Volts Alternating Current
—Vector in an xy plane
|x|—Absolute Value of x
PG—Electrical Power Grid

BACKGROUND

Some electrical systems use AC electric motors that are from time to time operated at horsepower levels below that for which they are rated. These motors may be connected to an electric power grid through a variable frequency AC drive, which includes an active converter having a predetermined maximum apparent power capacity. These systems may include one or more motors and one or more variable frequency AC drives. Other electric equipment such as transformers may also be included in the system. For example, in oil fields hundreds of motors driving pumps are connected to the power grid. Some are connected directly to the power grid and others are connected to the grid through individual drives. The system has a power factor that is less than unity (1), but it varies with the changing loads over time as power is demanded from the grid upon operation of the electrical equipment. A leading power factor indicates a circuit that produces reactive power. A lagging power factor indicates a circuit that consumes reactive power. In general, operation of an entire electrical power grid in a leading power factor condition is undesirable and can lead to instability. It is desirable to operate with a slightly lagging power factor, which is close to unity, for example, substantially from 0.93 to 0.97. If the power factor is much below 0.93, current is high and energy may be wasted.

Many variable frequency AC drives use an active converter typically employing insulated gate bipolar transistors (IGBT's) to control and conduct electrical current. In many applications the lifetime of an IGBT is determined by the effects of power cycling. Modern, high power IGBT's are complex devices using silicon dies and substrates. Common failure modes are bond wire fatigue or cracks in a solder layer between the dies and the substrate. This bond wire fatigue can be accelerated under power cycling conditions. While there exists no industry accepted standard to describe "power cycling," in general, power cycling is any method or mode of operation which causes the level of current conducted through the IGBT to change substantially from a high level to a low level in a relatively short time frame, for example, substantially from 3 seconds to 5 minutes.

Power cycling detrimentally affects IGBT lifetime because it results in thermal cycling of the IGBT. Although power cycling results in thermal cycling, thermal cycling can be caused by other factors. For example, thermal cycling can also be the result of inadequate or inconsistent cooling of IGBT's. Thermal cycling can also be the result of ambient temperature conditions that change cyclically. Therefore, thermal cycling and power cycling are related, but not identical. Power cycling, and the resulting thermal cycling, produces shortened lifetimes of IGBT's. There are many manufacturing techniques and materials that are used to reduce the detrimental effects of power cycling on expected lifetime of IGBT's.

The term "power cycling" is somewhat misleading. A high level of current flow through the IGBT is what causes the IGBT to become hotter. A low level of current flow through the IGBT is what causes the IGBT to become cooler. Therefore, it is a pattern of a high level of current flow followed by a low level of current flow that cause the thermal cycling that can lead to shortened lifetimes of IGBT's. Therefore, power cycling would be more accurately described as "current cycling." However, the term "power cycling" has become the industry accepted term to describe the phenomenon described herein. AC current measured in a power distribution system (power grid) is composed of both real power components, comprised of current that has a phase difference of 0° with respect to voltage, and reactive power components, comprised of current that has a phase difference of 90° with respect to voltage. Power cycling describes current flow and includes both real power and reactive power, which are discussed in greater detail in "APPENDIX A—TUTORIAL" attached.

The specific location where the temperature is relevant in regard to shortened IGBT lifetime is the bond wire junction between the die and the substrate. However, in most circumstances using IGBT's in industrial applications the bond wire junction is not equipped with a sensor that measures temperature. In most IBGT applications what is measured is something called "case temperature." Most IGBT's are equipped with a sensor embedded or mounted on the case that encloses all of the semiconductor and other electrical components that comprise the IBGT. Therefore, the relationship of case temperature and bond wire junction temperature must be known or approximated.

The diagram of FIG. 1 shows an example of the transient temperature response during thermal cycling that occurs as the result of power cycling. In this diagram $T_j$ is the junction temperature. $T_c$ is the measured case temperature measured under the hottest die. $T_{corner}$ is the measured case temperature at the corner of the substrate solder layer. As can be seen in the above diagram $T_j$ changes much more rapidly than $T_{corner}$ or $T_c$ during power cycling. During power cycling $T_j$ can be as much as 2 times greater than $T_c$ and 3 times greater than $T_{corner}$. However, during cooling of the IGBT the difference in temperature measured amongst $T_j$, $T_c$ and $T_{corner}$ is very small. In the above graph, the temperature axis is scaled at 10° per division. Therefore, the change from its minimum temperature to maximum temperature of $T_j$ is 72° C. The change from minimum temperature to maximum temperature is called $\Delta T$ (pronounced delta tee). In the above graph: $\Delta T_j$=72° C.; $\Delta T_c$=33° C.; $\Delta T_{corner}$=22° C.

It is $\Delta T$ under power cycling operating conditions that causes shortened lifetime of IGBT's. Much research has been done on the effects of power cycling on the lifetime of IGBT's. It is not the overall absolute value of temperature that is at issue in this explanation of power cycling and associated shortened lifetime of IGBT's. The maximum absolute safe operating temperature need not be exceeded. It is thermal cycling, however, even thermal cycling that does not result in temperatures above the maximum safe temperature for the IGBT that shortens lifetimes of IGBT's during power cycling. Let's consider an example: Say for example an IGBT has a maximum safe operating temperature of 130° C. measured at $T_c$. If the IGBT is operated in a power cycling circumstance in which $T_c$ varies between 65° C. and 125° C. Then the $\Delta T_c$=125° C.−65° C.=60° C. An IGBT operated in this manner may be subject shortened lifetime and premature unexpected failure. The IGBT may have a shortened lifetime even though the maximum safe operating temperature is never exceeded.

The graph of FIG. 2 shows how $\Delta T_c$ reduces the number of power cycling events that can be accommodated in the lifetime of an IGBT. As can be seen in this graph, for a $\Delta T_c$=60° C. the IGBT will be capable of a given number of thermal cycles as a result of power cycling. However, as both axes are on a logarithmic scale, if $\Delta T_c$=30° C., reduction of 50%, the number of power cycles increases by 2000% or 20 times. In general, any significant reduction in $\Delta T$ results in relatively large increase in the number of power cycles the IGBT is capable of Ultimately, this can be summarized as follows: Any significant decrease in $\Delta T_c$ of an IGBT under power cycling operating conditions results in a relatively large increase in the useful lifetime of the IGBT.

This background discussion is not intended to be an admission of prior art.

SUMMARY

When an active converter of a variable frequency AC drive is operated at less than its maximum power capacity, reactive power is generated. In our apparatus, a variable frequency AC drive produces reactive power when the active converter is utilizing less than its predetermined maximum apparent power capacity, and the reactive power is generated without substantially compromising the ability of the drive to provide real power as demanded by a load driven by the AC motor. In a system in which our apparatus is connected, this reactive power is fed to a power grid, provided it does not result in a leading power factor for the system. A device monitors current and voltage from the power grid and generates a reference signal corresponding to a power factor for a system in which our apparatus is connected, and the controller is programmed to respond to this reference signal.

Our control system includes a variable frequency AC drive, adapted to be electrically coupled to a power grid, that drives at least one motor receiving power from this power grid. The drive comprises an input to be connected to the power grid, and an output to be connected to one or more motors driven by the AC Drive. The power grid may be simultaneously connected to a plurality of electric motors or other loads receiving power from the grid. Between the input and output is the active converter coupled to a controller. The controller is programmed to regulate reactive power generation and reactive power consumption of the variable frequency AC drive so that the drive produces or consumes reactive power (the drive does not simultaneously produce and consume power). This reactive power is transferred to the power grid, and thus can be consumed by other motors or loads receiving electric power from the same power grid. The real power is determined by the mechanical load on the one motor connected to the output of the drive. Our system may include a single variable frequency AC drive or a plurality of variable frequency AC drives, all of which may have an active converter, or only some of which may have an active converter. The variable frequency AC drive may be adapted to be connected in parallel with a plurality of loads that receive power from the power grid, and the active converter may be connected to at least one inverter through a DC bus, and the converter may have an output connected to more than one inverter.

The reference signal to the variable frequency AC drives equipped with an active converter may be a fixed constant or generated by an external mechanism or by software programmed to regulate overall power factor of the system. Variable frequency AC drives that use a regenerative converter are often called regenerative variable frequency AC drives. In the most general case, however, the control modes and operation of the active converter in our system can be applied to regenerative or non-regenerative converters used in variable frequency AC drives. A plurality of variable frequency drives may be used, and none, some or all may be regenerative drives. Using each variable frequency drive connected to the same electrical grid as a source of reactive current creates a distributed reactive current source. Using distributed reactive current sources can have the effect of lowering overall current in an electrical power distribution system. This can result in a more economical, efficient and flexible operation of the electric power distribution system. See Example #3 and Example #4 "APPENDIX A—TUTORIAL" for a detailed discussion.

Our apparatus may be programmed for different modes controls that establish which one, or more then one, of a plurality of control strategies is employed. These strategies govern the combination of reactive power and real power to avoid the apparent power exceeding the maximum apparent power capacity of the active converter, and they include, but are not limited to, (1) a first control strategy where the load on the motor changes slowly, (2) a second control strategy where the load changes rapidly, and (3) a third control strategy where the load is cyclic. According to the first control strategy, the reactive power is a function of the maximum apparent power capacity of the converter and the real power demanded. In this first strategy, the real power requirements change at a frequency of less than 4 Hertz. According to the second control strategy, a real power limit implemented in the inverter is employed. This real power limit of the inverter is a function of the maximum apparent power capacity of the active converter and the instantaneous reactive power of the active converter. For example, the instantaneous reactive power may be multiplied by a scaling factor that may range substantially from 1.01 to 1.10. Using the second strategy, as the real power demanded by a load approaches levels resulting in an overload of the active converter, a predetermined real power limit is lowered, and, as said predetermined real power limit is lowered, a predetermined instantaneous reactive power limit is reduced, and as the instantaneous reactive power is reduced, the predetermined real power limit is increased. According to the third control strategy, the reactive power is controlled so that variations in apparent power are kept at a minimum, ideally essentially constant.

One embodiment of our system is an oil well including a pump operatively connected to an AC motor controlled by a programmable, variable frequency AC drive that has an active converter having a maximum apparent power capacity and that transfers electrical energy from a power grid to the AC motor. The AC drive is programmed to produce reactive power that is fed to the power grid when the converter is utilizing less than the converter's maximum apparent power capacity, and the reactive power is generated without compromising the ability of the drive to provide real power as demanded by the pump being driven by the AC motor.

Our apparatus has improved expected IGBT lifetime regardless of the manufacturing technique or materials used, allowing the IGBT to enjoy a significantly extended useful lifetime in the same service. Or considered another way, regardless of the method or materials used in the manufacture of the IGBT, our system and method allows the IGBT module to be operated at higher real power levels when used in a variable frequency AC drive equipped with an active converter without detrimentally effecting the expected lifetime of the IGBT. In our system this reactive power is used advantageously to beneficially affect the power factor, thereby avoiding high current and wasted energy.

Our apparatus and system have one or more of the features depicted in the embodiments discussed in the section entitled "DETAILED DESCRIPTION OF SOME ILLUSTRATIVE EMBODIMENTS," and the claims that follow define our apparatus and system, distinguishing them from the prior art; however, without limiting the scope of our apparatus and method as expressed by these claims, in general terms, some, but not necessarily all, of their features are:

One, our electrical apparatus includes a variable frequency AC drive having an input adapted to be electrically coupled to an electric power grid and an output adapted to be electrically connected to an AC electric motor. The variable frequency AC drive includes an active converter having a predetermined maximum apparent power capacity. The variable frequency AC drive may be adapted to be connected in parallel with a plurality of loads that receive power from said power grid.

Two, the converter is coupled to a controller programmed to regulate reactive power generation and consumption of the variable frequency AC drive so that the drive produces reactive power when said converter is utilizing less than the converter's maximum apparent power capacity. The reactive power is being generated without substantially compromising the ability of the drive to provide real power as demanded by a load driven by the AC motor. The reactive power is fed to the power grid. The active converter may have an output connected to one or more inverters.

Three, our apparatus may include a device that monitors current and voltage from the power grid and generates a reference signal corresponding to a power factor for a system in which our apparatus is connected. The controller is programmed to respond to this reference signal.

Four, the controller may have a selectable mode control that establishes which one or more then one of a plurality of control strategies is employed. These strategies govern the combination of reactive power and real power to avoid the apparent power exceeding the maximum apparent power capacity of the active converter. The control strategies may include (1) a first control strategy where the load on the motor changes slowly, (2) a second control strategy where the load changes rapidly, and (3) a third control strategy where the load is cyclic. According to the first control strategy the reactive power is a function of the maximum apparent power capacity of the converter and the real power demanded. The real power requirements may, for example, change at a frequency of less than 4 Hertz. According to the second control strategy the real power limit of an inverter connected to the converter through a DC bus may be a function of the maximum apparent power capacity of the active converter and the instantaneous reactive power of the active converter. The instantaneous reactive power is multiplied by a scaling factor. As the real power demanded by a load approaches levels resulting in an overload of the active converter, a predetermined real power limit of the inverter may be lowered, and, as the predetermined real power limit is lowered, a predetermined instantaneous reactive power limit is reduced, and as the instantaneous reactive power is reduced, the predetermined real power limit of the inverter is increased. According to the third control strategy the reactive power may be controlled so that apparent power is kept essentially constant.

In one embodiment, our system receives power from an electric power grid and includes a load connected to the power grid, an AC electric motor connected to the power grid through a variable frequency AC drive in parallel connection with the load, and a device that monitors current and voltage from the power grid and generates a reference signal corresponding to a power factor for the system. The variable frequency AC drive has an input electrically connected to the power grid and an output electrically connected to the AC electric motor and includes an active converter having a predetermined maximum apparent power capacity. The converter is coupled to a controller programmed to regulate reactive power generation and consumption of the variable frequency AC drive so that the drive produces reactive power when the converter is utilizing less than its maximum power capacity. The reactive power is to be fed to the power grid. The controller is programmed to respond to the reference signal, controlling power generation and consumption so that the combination of reactive power and real power does not result in apparent power exceeding the maximum capacity of the active converter and avoids generating reactive power that would result in a leading power factor for the system. There may be a plurality of loads in parallel connection with the drive, and there may be a plurality of variable frequency AC drives in parallel connection with the loads. The system may include a plurality of inverters, each inverter having an input connected to the output of the active converter and an output connected to an AC motor. As discussed above, the controller may have a selectable mode control.

In another embodiment, our system comprises an AC motor having its output connected to cyclic load and a variable frequency AC drive including an active converter subjected to damage due to rapid thermal cycling. The converter is coupled to a controller programmed to regulate reactive power generation and consumption of the variable frequency AC drive so that said drive avoids rapid thermal cycling that may damage the active converter. The active converter may comprise a plurality of insulated gate bipolar transistors.

Our apparatus has been utilized in an oil well. This oil well includes a pump operatively an AC motor and a programmable, variable frequency AC drive that transfers electrical energy from a power grid to the AC motor. The AC drive includes an active converter having a maximum apparent power capacity and programmed to produce reactive power that is fed to the power grid when the converter is utilizing less than the converter's maximum apparent power capacity. The reactive power is being generated without compromising the ability of the drive to provide real power as demanded by the pump being driven by the AC motor. The oil well may include a device that monitors current and voltage from the power grid and generates a reference signal corresponding to a power factor for a system including the pump. The controller is programmed to respond to said signal to avoid generating reactive power that would result in a leading power factor for the system.

DESCRIPTION OF THE DRAWING

Some embodiments of our system and method are discussed in detail in connection with the accompanying drawing, which is for illustrative purposes only. This drawing includes the following figures (FIGS.), with like numerals indicating like parts:

FIG. 3 is a schematic diagram of our system employing at least one variable frequency AC drive connected to a power grid providing electrical power to a plurality of loads.

DETAILED DESCRIPTION OF SOME ILLUSTRATIVE EMBODIMENTS

Figure 3A:
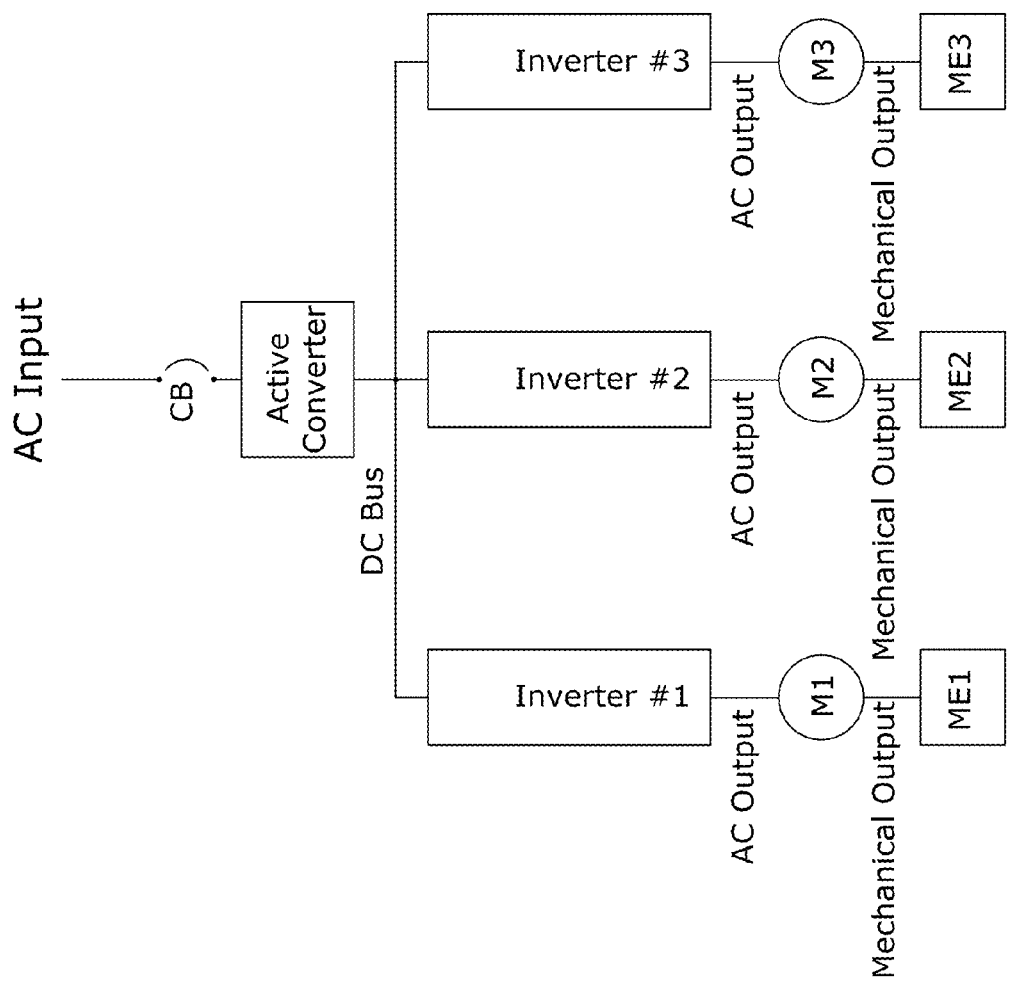
FIG. 3A is a schematic diagram of an active converter having its output connected to a plurality of inverters.
Figure 3B:
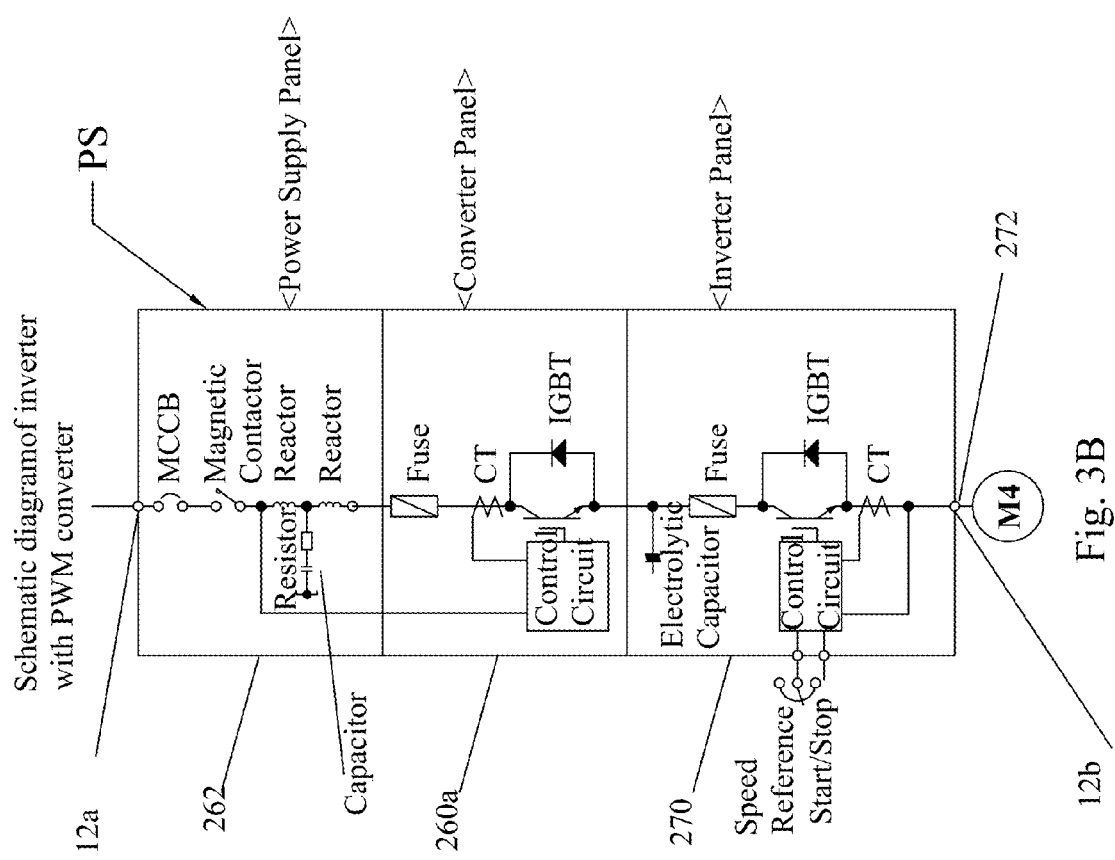
FIG. 3B is a circuit diagram showing the active converter and inverter of the variable frequency drive.
Figure 3C:
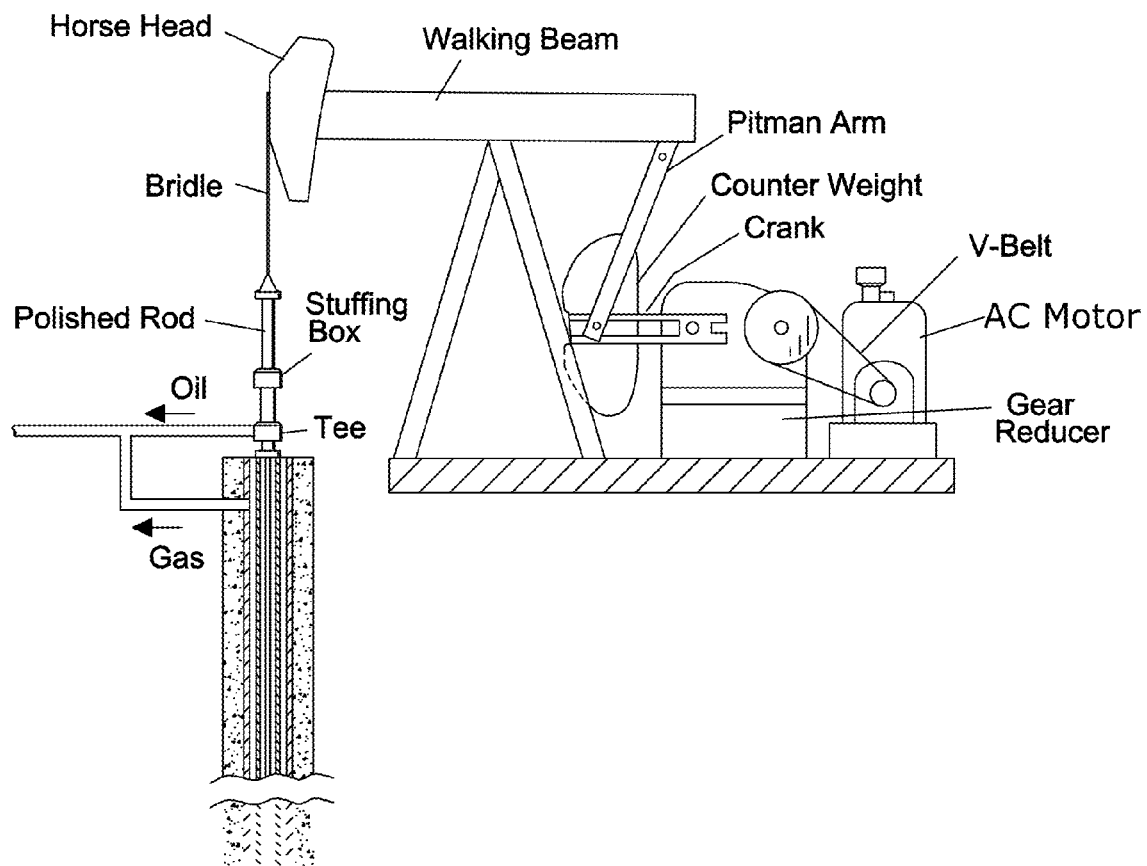
FIG. 3C is a schematic diagram of a walking beam oil well pump having its motor energized by power from a power grid through our apparatus.

As depicted in FIG. 3, one embodiment of our system is generally designated by the numeral 10 and includes at least one programmable variable frequency AC drive VFD designed, manufactured and installed in such a way as to control the speed of an AC motor M4 that is operably connected to mechanical equipment ME4. A suitable variable frequency AC drive VFD may be obtained from ABB, Oy of Helsinki, Finland. A plurality of variable frequency drives (a second AC drive is shown in dotted lines connected to motor M3) may be used, and none, some or all may be regenerative drives. The motor M4 and motors M1, M2, and M3 are all connected at their inputs to a common power grid PG through a transformer, and respectively at their outputs to mechanical equipment designated by ME1, ME2, ME3, and ME4. The mechanical equipment may be, for example, a pump, fan, conveyor, extruder, drive train of a vehicle, or any other mechanical device that requires power in the form of torque and speed transferred through a rotating shaft. In the embodiment illustrated in FIG. 3C, the mechanical equipment is a walking beam pump that pumps fluid from an oil well. The pump may be above or below ground or a beam or long-stroke pump, or other type of pump.

As depicted in FIG. 3B, the variable frequency AC drive VFD comprises an input 12a adapted to be connected to the power grid PG, a circuit breaker CB, an active converter connected to an inverter through a DC bus, and an output 12b adapted to be connected to the motor M4. All the motors M1, M2, M3, and M4 receive power from the power grid PC, but only the motor M4 is driven directly by the variable frequency AC drive VFD. The power grid PG receives reactive power transferred thereto from the variable frequency AC drive VFD. As shown in FIG. 3, between the input 12a and output 12b, is the active converter coupled to a controller 14. The controller 14 includes a microprocessor 14a programmed to regulate reactive power generation and reactive power consumption of the variable frequency AC drive VFD so that the drive produces reactive power that is fed to the power grid. Reactive power is produced only in a manner that does not significantly impair the ability of the AC inverter to provide real power to the motor M4 as the load varies under different operating circumstances. This requires different control strategies be employed under different operating circumstances.

The real power is determined by the mechanical load on the one motor M4 connected to the output 12b of the variable frequency AC drive VFD. As discussed subsequently, production and consumption of reactive power is according to one or more different control strategies. The user selects a control strategy depending on the operational characteristics of the active converter, inverter, motor, mechanical load, and the PG requirements. A selection is made by setting a Control Mode parameter by switching on one of the Control Mode Buttons I, II, or III. The controller signals to each of the variable frequency AC drives equipped with an active converter may be a fixed constant or generated by an external mechanism or software programmed to regulate overall electrical power factor. In the embodiment depicted, the signal from the monitoring device S is directed to one input of an adder 11a and the other input of the adder 11a has a set point that may be manually or automatically adjusted as called for by the particular system using our apparatus. The device S monitors on the line from the transformer the current and voltage that is being applied to the motors M1, M2, M3, and M4. This measurement and subsequent calculation yields the actual power factor of the system. The set point signal is a desired power factor that is less than unity, for example, 0.94. The difference between the set point signal and the actual power factor signal is the error signal 11c of the output of the adder 11a. The error signal 11c is used in an external controller shown as a Proportional and Integral controller 11d. The external controller 11d either increases or decreases reactive power to maintain the desired power factor of the system.

The variable frequency AC drive VFD is typically constructed as shown in FIG. 3B, and includes a power supply panel 262, an active converter panel 260a, and an inverter panel 270. The converter panel 260a includes a transistorized converter IGBT that converts electrical energy in the form of alternating current (AC) into electrical energy in form of direct current (DC) in an electrolytic capacitor EC in the inverter panel 270 that functions as a DC bus. All transistorized converters are controlled in such a way that power can flow from the incoming AC lines to the DC Bus. However, only some transistorized converters are controlled in such a way that power can flow from the incoming AC lines to the DC Bus or from the DC Bus to the AC lines. In those cases where the power can flow in only one direction the transistorized converter is called a non-regenerative converter. In those cases where the power can flow in either direction the transistorized converter is called a regenerative converter.

Many modern variable frequency AC drives equipped with such active converters have the ability to control the amount of reactive power consumed or produced in the power distribution system by the active converter. This reactive power control can be described by Equation 1 as follows:

$$Q = Q_r \text{ kvar}$$

Where:
Q=Reactive Power produced or consumed by the active converter
$Q_r$=Reactive Power reference However, operating an active converter in such a manner as to produce or consume a given amount of reactive power is not a useful control mode in many applications for variable frequency AC drives equipped with active converters. The primary deficiency of this "reactive power reference" mode of control is that most variable frequency AC drives equipped with an active converter are used to control motors that are connected to mechanical loads that have changing real power requirements. A given level of reactive power that is suitable with one level of real power may be entirely unsuitable at another level of real power. For example, an active converter rated at 100 KVA can accommodate 70.7 KW of real power and 70.7 KVAR of reactive power. This example can be described as follows by Equation 2:

$$|S_1| = \sqrt{|R_2|^2 + |Q_1|^2}$$

Where in the above example:
$|R_1| = 70.7$ kw
$|Q_1| = 70.7$ kvar
$|S_1| = 100$ kva However, if the real power requirements change to 90 KW and the reactive power level were maintained at the same level, 70.7 KVAR, then the converter would be overloaded at 114 KVA. This second example can be described as follows:

$$|S_2| = \sqrt{|R_2|^2 + |Q_1|^2}$$

Where in the above example:
$|R_2| = 90$ kw
$|Q_1| = 70.7$ kvar
$|S_2| = 114.4$ kva This overload of the active converter could cause the converter to trip off line due to excessive converter current. The reactive current level in the above example must be altered by some control method to insure that the converter is not overloaded.

Consider a similar example using the same active converter rated at 100 KVA. Again, let's consider the active converter operating at its rated 100 KVA of apparent power and 70.7 KW of real power and 70.7 KVAR of reactive power. This is the same circumstance as described in the example above and can be described as follows:

$$|S_1| = \sqrt{|R_1|^2 + |Q_1|^2}$$

Where in the above example:
$|R_1| = 70.7$ kw
$|Q_1| = 70.7$ kvar
$|S_1| = 100$ kva Now consider a changing real power requirement that results in a new real power requirement of 40 KW. If the reactive power level were maintained at 70.7 KVAR, then the converter would be loaded at an apparent power level of 81.2 KVA. This circumstance can be described as follows:

$$|S_3| = \sqrt{|R_3|^2 + |Q_1|^2}$$

Where in the above example:
$|R_3| = 40$ kw
$|Q_1| = 70.7$ kvar
$|S_3| = 81.2$ kva At an active converter loading level of 81.2 KVA, the active converter has capacity that is not being used. If one had a goal of maximizing reactive power production, then one would want to use the excess capacity present in the active converter to produce reactive power when the real power requirements allowed such operation.

Real power requirements of typical real-world mechanical loads are seldom constant. Real power requirements may change slowly or quickly, in small or large amounts, predictably or randomly. The real power requirements of the active converter are a function of and determined ultimately by the mechanical load. The example given previously is a simple example, however, it does outline some of the deficiencies encountered with most reactive power control modes available in most modern variable frequency AC drives equipped with active converter.

There is at least one manufacturer that does attempt to eliminate the "overloaded converter" problem associated discussed above. Siemens manufactures a variable frequency AC drive equipped with an active converter that has a "current limiting" feature. However, this control mode is deficient in several regards. To understand how a current limit control mode on the active converter is deficient one must fully understand all the functions that the active converter must perform. In our system we use the active converter to produce or consume reactive power in the power grid. However, the active converter performs another important and fundamental task as well: DC bus voltage control.

In our system as illustrated in FIG. 3, the active converter is controlled in such a way as to maintain a constant DC voltage level in the electrolytic capacitors. The DC voltage level controller, implemented in the active converter, is extremely responsive, stable and dynamic. The inverter will control the AC motor M4 in such a way as to produce the required level of real power in the motor M4. As the mechanical load requires more real power, the DC voltage level measured on the electrolytic capacitors will tend to drop. Simultaneously, the DC voltage level controller functioning in the converter will automatically control the active converter to consume more real power from the electrical power grid and supply that real power to the DC circuit, thereby maintaining the DC voltage level measured in the electrolytic capacitors at the DC voltage set-point. Conversely, as the mechanical load requires less real power the DC voltage level measured on the electrolytic capacitors will tend to increase. Simultaneously, the DC voltage controller functioning in the converter will automatically control the active converter to consume less real power from the electrical power and grid and supply that lower level of real power to the DC circuit, thereby maintaining the DC voltage level measured in the electrolytic capacitors at the DC voltage set-point. It is because of the DC voltage level controller in the active converter that the variable frequency AC drive equipped with an active converter is capable of operating at all levels of real power within its rating in a reliable, seamless, stable and dynamic manner.

The primary function of the variable frequency AC drive equipped with an active converter is to safely, reliably, effectively, efficiently and economically control a motor that is connected to a mechanical load. The mechanical load and its control is the most important aspect of any variable frequency AC drive, including a variable frequency AC drive equipped with an active converter. To the extent that controlling reactive power beneficially affects the safety, reliability, effectiveness, efficiency or economics of the control of the mechanical load, then reactive power control is included in the primary and most important aspects of operating a variable frequency AC drive equipped with an active converter. In our system and method:

1. Reactive current control can be used to decrease ΔT of IGBT's used in an active converter. Decreasing ΔT results in increased useful lifetime of IGBT's used in operational circumstances involving heavy power cycling as described previously. In this regard, reactive current control is included in the most important fundamental aspects of operating a variable frequency Drive equipped with active converter. To the extent that reactive current control can be used to increase the useful lifetime of IGBT's used in the active converter, reactive current control is desirable, necessary and valuable in virtually all operational circumstances involving heavy power cycling as described previously.

2. Reactive power control can be used to improve the operation of the electric power distribution system to which the variable frequency AC drive equipped with an active converter is connected. In this regard, reactive power control is desirable in some circumstances and could be considered valuable in some circumstances. However, there may be other circumstances in which reactive power control used to improve the operation of the electric power distribution system is not desirable, valuable or necessary. Furthermore, reactive power control strictly and only for the purposes of improving the operation of the electric power distribution system is not among the most important or fundamental aspects of operating a variable frequency Drive equipped with an active converter. Avoiding any compromise that sacrifices performance of the AC Drive in its fundamental aspects is worthwhile.

When a "current limiting" control mode is used in the active converter, the active converter can no longer effectively control DC Bus voltage level in a stable manner. There are times this may cause the variable frequency AC drive equipped with an active converter to trip off-line as well. Many mechanical loads are characterized by large and rapid changes in real power requirements. It is for this reason, that other methods of control of the reactive power in the active converter are used in our apparatus and system. In addition, in our control system control modes may be used that coordinate real power loading in the motor M4 and reactive power levels in the active converter.

Mode II uses the real power limit implemented in the inverter. The real power limit is not intended to be implemented in the active converter. The reason the real power limit is not a suitable mode of control for the active converter is the same as that explained above for the "current limiting" mode of control for the active converter. In general, any limit on the current or power in the active converter will compromise the performance of the active converter in its primary function. Namely, that of controlling and maintaining the DC voltage level of the DC bus capacitors at the desired level. The real power limit in the inverter may implemented using many different control strategies which are unique to different AC variable frequency drive manufacturers. In general, however, these control strategies can be typically described as follows. The actual level of instantaneous real power in the inverter is measured or calculated. This actual level of real power is compared to a threshold, called the real power limit. If the actual level of real power exceeds the threshold value of real power limit, then a control implemented in the inverter control will intervene. This intervention could be in the form of reducing inverter current or motor torque to limit the actual level of instantaneous real power in the inverter. The intervention must be controlled to insure that the instantaneous real power does not exceed the threshold value of real power limit.

Modes of Control

If generation of reactive power can be used to improve the operation of the electric power distribution system (the power grid) and not adversely affect the fundamental and important aspects of AC drive operation to any substantial degree in any substantial way, then the controlled generation of reactive power may, in such circumstances, be highly desirable. In our system one or more different control strategies may be employed depending on the changing load demands under different operational circumstances. These control strategies take into consideration safety, reliability, effectiveness and efficiency of the control of the mechanical load. The following are examples control strategies under different operational modes: (Mode I) Reactive Power Control Using Apparent Power Limit, (Mode II) Converter Apparent Power Limiting Using Inverter Real Power Limit, (Mode III) Cyclical Apparent Power Control.

Reactive Power Control Using Apparent Power Limit (Mode I)

Figure 4:
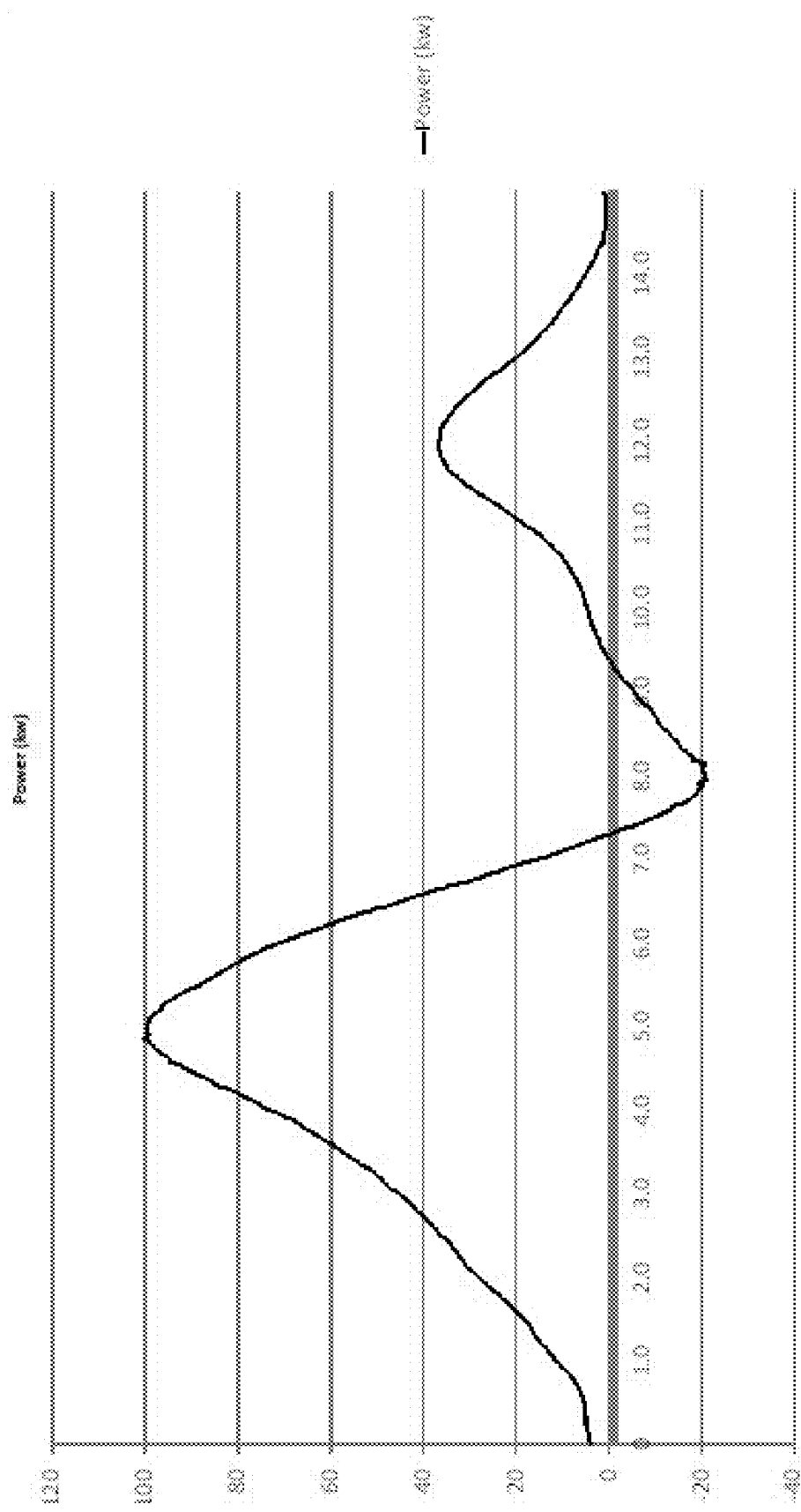
FIG. 4 is a graph illustrating a slow change in the power requirements of a mechanical load.

The ideal active converter control method would allow for reactive power to be produced or consumed according to a reactive power reference without compromising the ability of the converter to produce or consume power (kilowatts) according to the real power requirements of the mechanical load. In order to accomplish this operational goal, the ideal active converter control method would limit reactive power in circumstances in which the combination of reactive power and real power would result in apparent power that would exceed the capacity of the active converter if not controlled. In addition, the ideal active converter control method would result in reactive power production or consumption that followed the reactive power reference in those circumstances in which the combination of reactive power and real power result in apparent power that does not exceed the capacity of the active converter. This reactive power control using apparent power limit would appear as follows:

$$Q = Q_r \text{ kvar, where } Q \leq Q_{lim}$$

$$|Q_{lim}| = \sqrt{|S_{lim}|^2 - |R_{act}|^2}$$

Where in the above example:
Q=Reactive Power (RealTime Actual)
$Q_r$=Reactive Power Reference
$Q_{lim}$=Reactive Power Limit
$S_{lim}$=Apparent Power Limit An example will be used to demonstrate the above described ideal active converter control method. Consider the following sample power profile shown in FIG. 4. Given the power profile above, if the following references and limits are assumed:
$Q_r$=100 kvar
$S_{lim}$=100 kva Given the formulas:

$$Q = Q_r \text{ kvar, where } Q \leq Q_{lim}$$

$$|Q_{lim}| = \sqrt{|S_{lim}|^2 - |R_{act}|^2}$$

Figure 5:
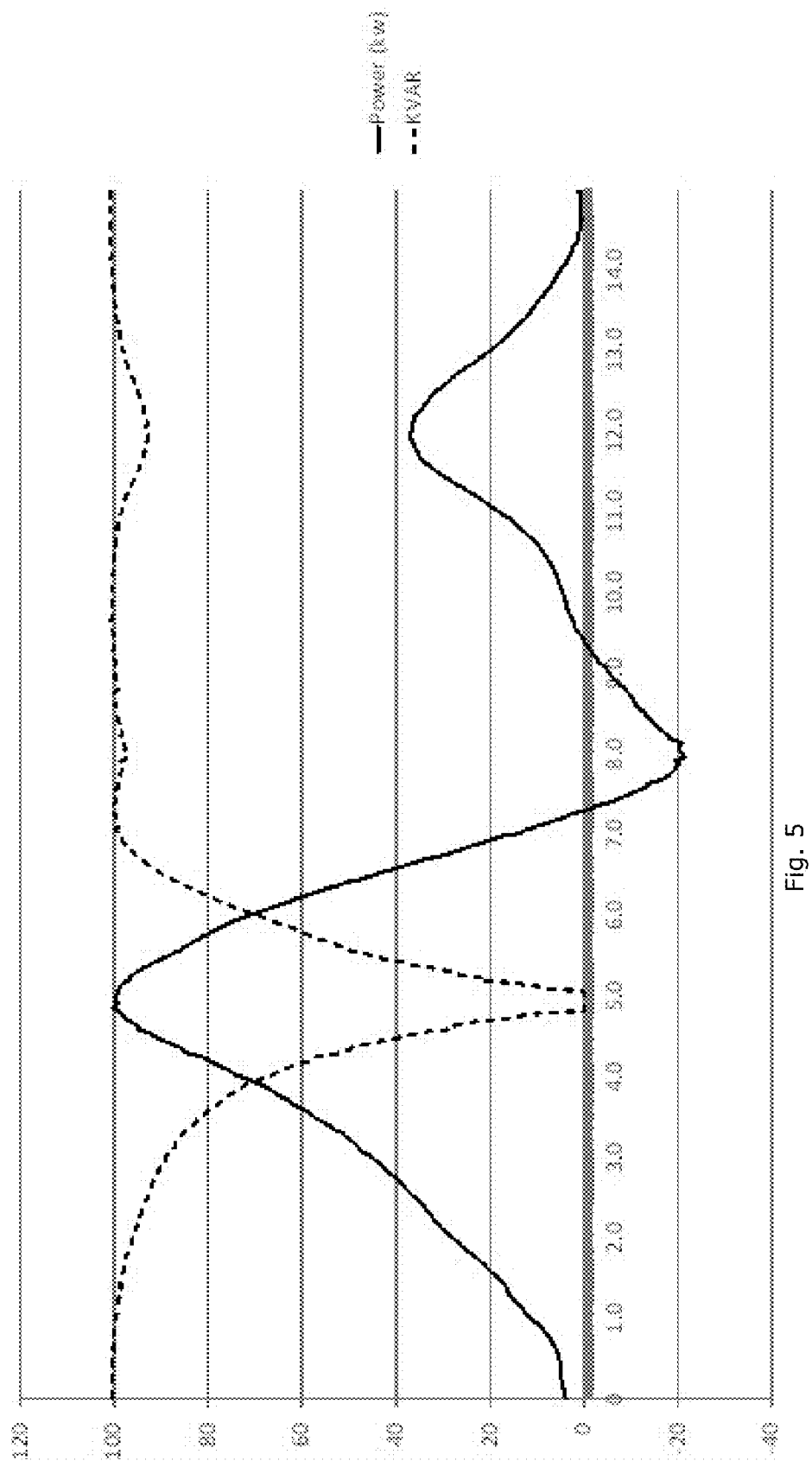
FIG. 5 is a graph illustrating the real power requirements of the mechanical load depicted in FIG. 4 and the reactive power that is generated using Control Mode I.

Reactive Power and Real Power results are shown in FIG. 5: Given the formula:

$$|S_{act}| = \sqrt{|R_{act}|^2 + |Q|^2}$$

Figure 6:
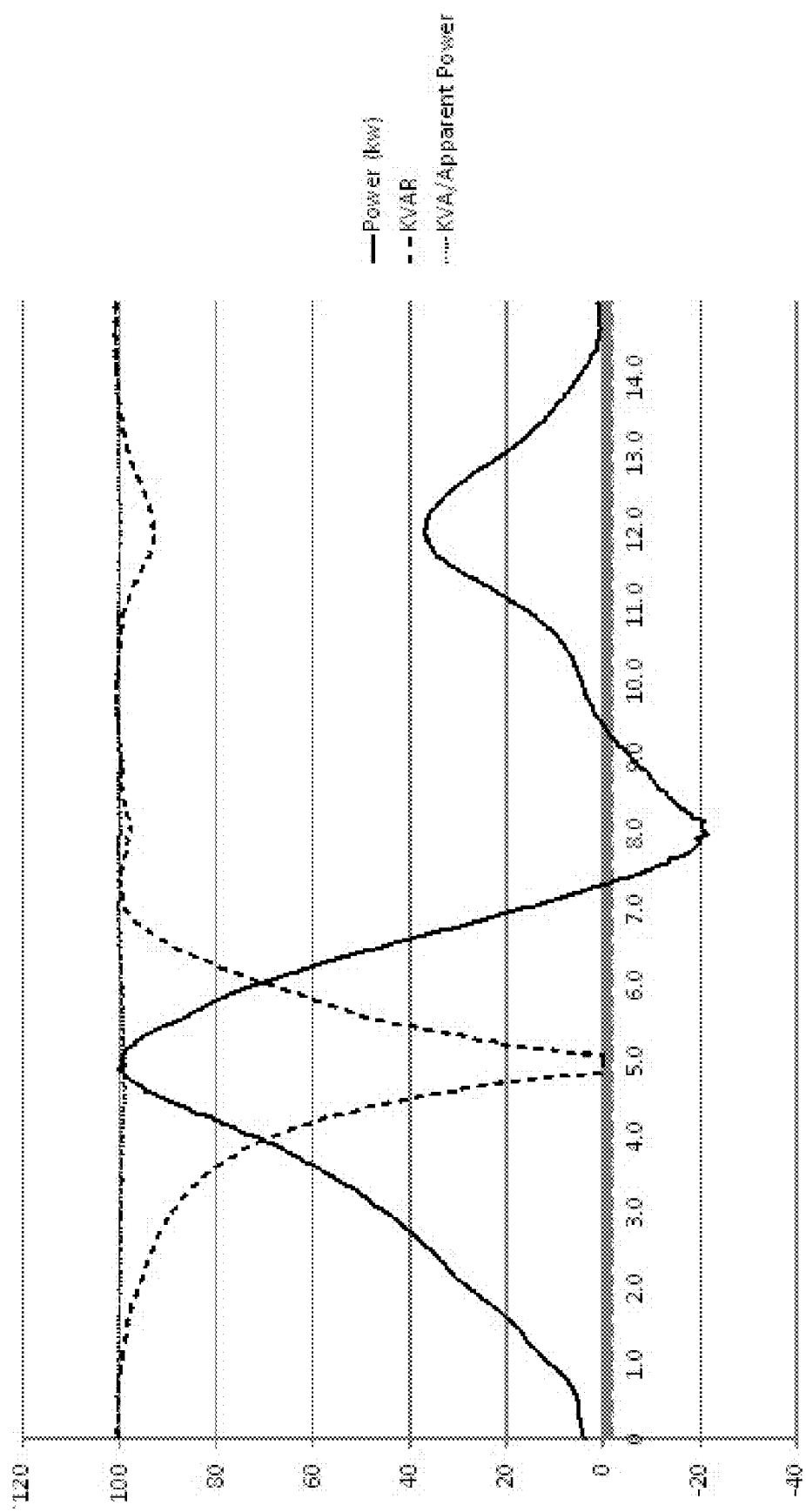
FIG. 6 is a graph illustrating the real power requirements of the mechanical load depicted in FIG. 4 and the reactive power that is generated using Control Mode I and the resulting apparent power.

Results in real power, reactive power and apparent power are illustrated in FIG. 6.

The above example shows many of the desirable characteristics of reactive power control using apparent power limit to control an active converter. Here is a list of desirable characteristics of this method of control:

Real power requirement of the mechanical load are provided for in a reliable and dynamic manner. Real power required by the mechanical load is unimpeded and not compromised.

Apparent power limit is never exceeded. If incoming voltage $V_u$ is assumed to be fixed and constant, then the maximum current rating of the active converter is never exceeded.

Reactive power is maintained at the reactive power reference level whenever possible.

Reactive power is maximized according to the control method and the reactive power reference.

The above-described control strategy of Mode I works well for applications in which real power requirements change slowly over time. The term "slowly over time" must be put into a proper context. The following description of exactly how the real time reactive power responds to the reactive power reference will offer some context for what might be considered "slowly over time". However, as a general rule of thumb, one could assert that the above described control method will function extremely well if real power requirements do not change from one level to any other level in less than about 500 milliseconds. This can also be described using the concept of bandwidth. The maximum real power bandwidth of this control mode used to control the reactive power in an active converter associated with a variable frequency AC drive is 2 Hz. As long as the power requirements are changing at a frequency less than 2 HZ, then this control mode is adequate for control. If the real power requirement is changing at a frequency of greater than 2 HZ, but less than 4 HZ, then this control mode is marginal. If the real power requirement is changing at a frequency of greater than 4 HZ, then this control mode becomes unstable and unreliable for controlling reactive power in an active converter associated with a variable frequency AC drive. Many of the mechanical loads that are controlled by variable frequency AC drives are centrifugal pumps and fans. Most centrifugal pumps and fans have mechanical loads that can be characterized by slowly changing real power requirements. Most centrifugal pumps and fans have real power requirements that change at a frequency lower than 2 HZ.

The example above is theoretical. If the real time reactive power followed the reactive power reference in a dynamic, accurate, reliable and rapid manner, then the above example would be the ideal reactive power control for an active converter. However, the real time reactive power does not follow the reactive power reference in a dynamic, accurate, reliable and rapid manner. The reasons that the real time reactive power does not follow the reactive power reference in a dynamic, accurate, reliable and rapid manner are complex. However, the primary reasons can be described as follows:

Active Converter Control Stability—the design and manufacture of the active converter and its components is extremely complex. The design of the converter involves many decisions that can be characterized as compromises between dynamic response versus stability, expensive versus low cost, large versus small, emitting large amounts of EMI versus emitting small amounts of EMI, high switching frequency versus lower switching frequency, etc. For a more complete description of these design decision please see "Stability Improvements of an LCL-filter Based Three-phase Active Rectifier" by Marco Liserre, Antonio Dell' Aquila and Frede Blaabjerg. The design compromises associated with the stability of the active converter control are the primary reason that there exists a significant delay between the real time active converter reactive power and the reactive power reference.

Large Inductor—Inductors store magnetic energy as flux. The nature of inductors is to maintain a constant current flow and resist changes to the current flow. Therefore inductors inherently degrade dynamic current response. The large inductor that is generally associated with an active converter has a small effect on the dynamic response of the active converter. However, this effect is not negligible.

Figure 7:
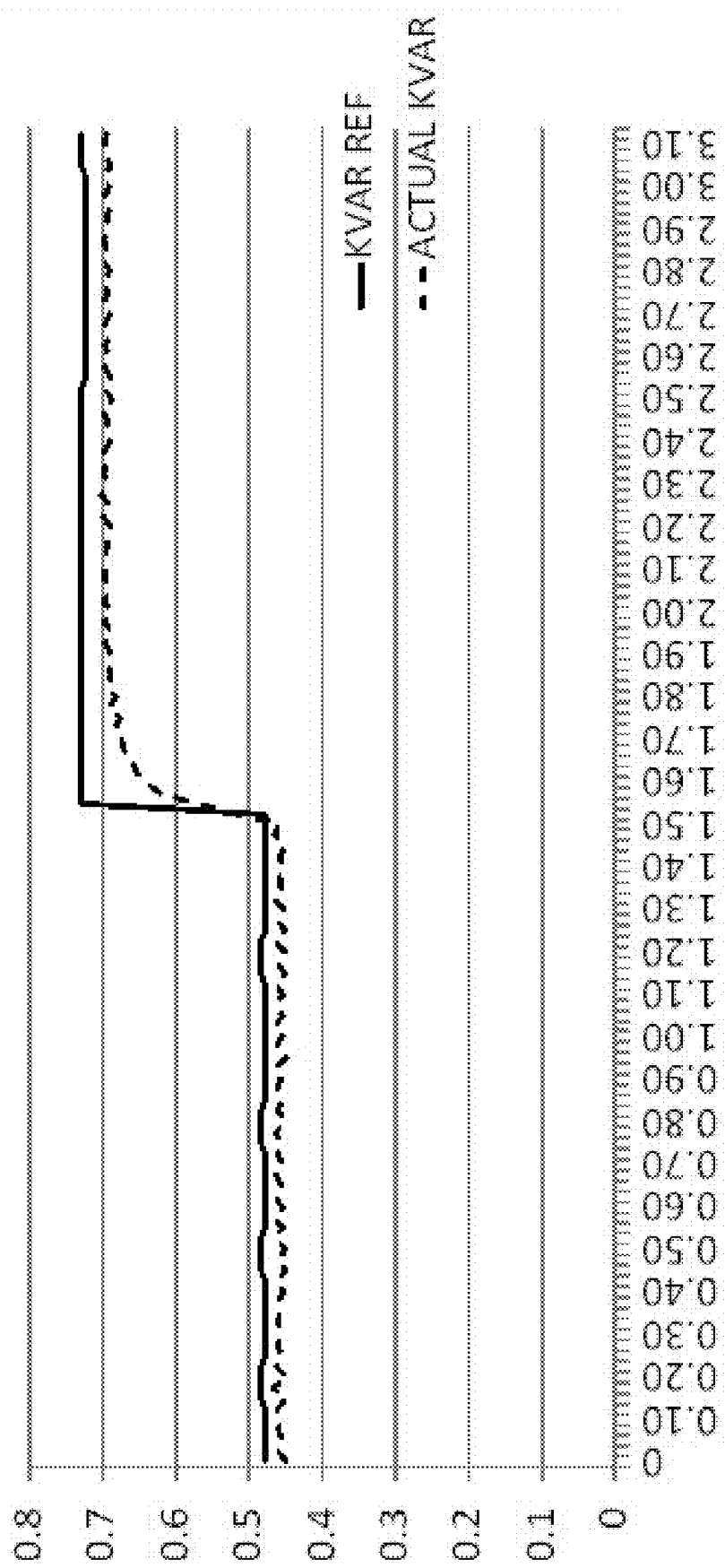
FIG. 7 is a graph illustrating the problem of delay of the reactive power in response to a changing reactive power reference.

For a more thorough and complete description of the magnitude of the reactive power delay, consider the graph depicted in FIG. 7, which shows that the actual reactive power follows the reactive power reference with a delay that can be characterized by an exponential time constant t. For the graph of FIG. 7, t=86 milliseconds. The delay demonstrated is the cause of significant complications in using an active converter to produce or consume reactive power in many real-world applications of a variable frequency AC drive equipped with a active converter in which the real power requirements may change rapidly. The term "rapidly" in any real power requirement is one that changes at a frequency of greater than 5 HZ.

When the above described Reactive Power Control Using Apparent Power Limit strategy of Mode I is used to control the active converter associated with a variable frequency AC drive in circumstances in which the real power requirements change rapidly, there are many undesirable results, and the control strategy of Mode II is then employed.

Converter Apparent Power Limiting Using Inverter Real Power Limit (Mode II)

Figure 8:
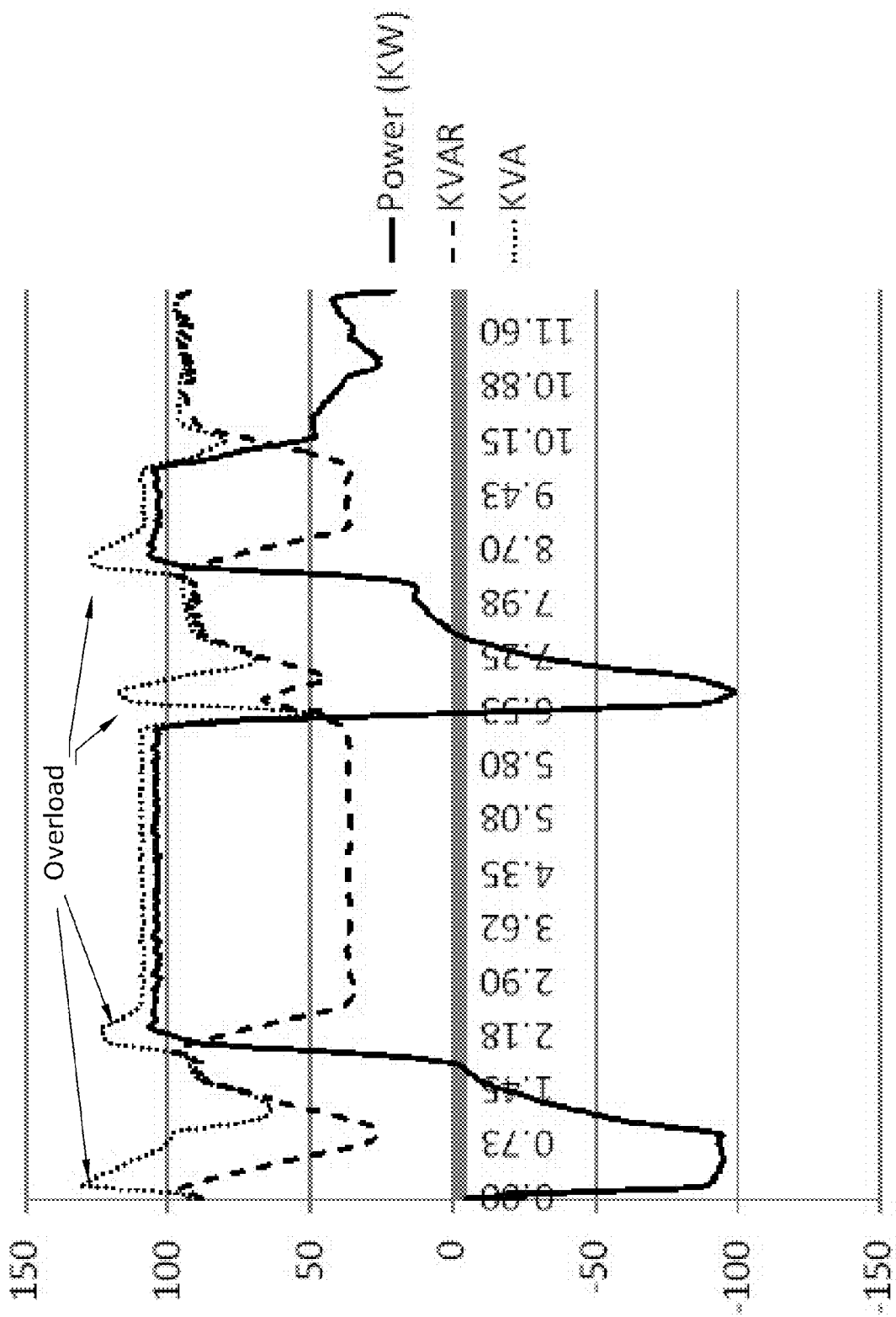
FIG. 8 is a graph illustrating an operational state employing a Mode I control.

Consider the graph shown in FIG. 8 depicting real power varying rapidly. The rapidly varying real power combined with a reactive power control that is relatively slow to react, results in several instances of overloading the active converter. This can lead to undesirable behavior in the active converter. This type of behavior can cause tripping of the active converter or, depending on how the active converter is controlled, this type of behavior can cause tripping of the inverter. This situation is potentially very troublesome and, without the proper control, can render the active converters ability to produce or consume reactive power not beneficial in circumstances in which the real power requirements change rapidly. However, there is a control strategy that overcomes some of the problems associated with the relatively slow control methods of reactive power associated with the active converter.

Consider the following Equation 10:

$$|R_{lim}| = \sqrt{|S_{lim}|^2 - |Q|^2}$$

$$|Q_{lim}| = \sqrt{|S_{lim}|^2 - (|R_{act}|*1.02)^2}$$

Where in the above Equation 10:
Q=Reactive Power (Instantaneous, RealTime Actual)
$Q_{lim}$=Reactive Power Limit
$S_{lim}$=Apparent Power Limit
$R_{act}$=Real Power (RealTime Actual), measure in inverter
Rlim=Real Power Limit of the inverter In the Control Mode II, the real power limit of the inverter is a function of the maximum apparent power capacity of the active converter and the instantaneous reactive power measured in the active converter. However, simultaneously, the Control Mode II limits the maximum reactive power based on the maximum apparent power capacity of the active converter and the instantaneous power multiplied by a scaling factor. As the mechanical load demands more power, the maximum power that the mechanical load is permitted to consume or generate as the case may be is limited by the controller. However, as the real power demanded by the load approaches levels that could result in an overloaded converter the reactive power limit is lowered. At any time that the real power generated or consumed is being limited in the inverter by Control Mode II the "Active Intervention" status of Control Mode II is said to be ON. At any time that the real power generated or consumed is not being limited in the inverter by Control Mode II the "Active Intervention" status of Control Mode II is said to be OFF. Any operational circumstance to results in the "Active Intervention" status of Control Mode II being ON results in an automatic reduction of the reactive power limit. As the reactive power limit is lowered, the instantaneous reactive power will be reduced. As the instantaneous reactive power is reduced the real power limit is increased as a function of Equation 10 above. These are two simultaneous controls that affect each other when the real power, reactive power or apparent power are at their limits.

Figure 9:
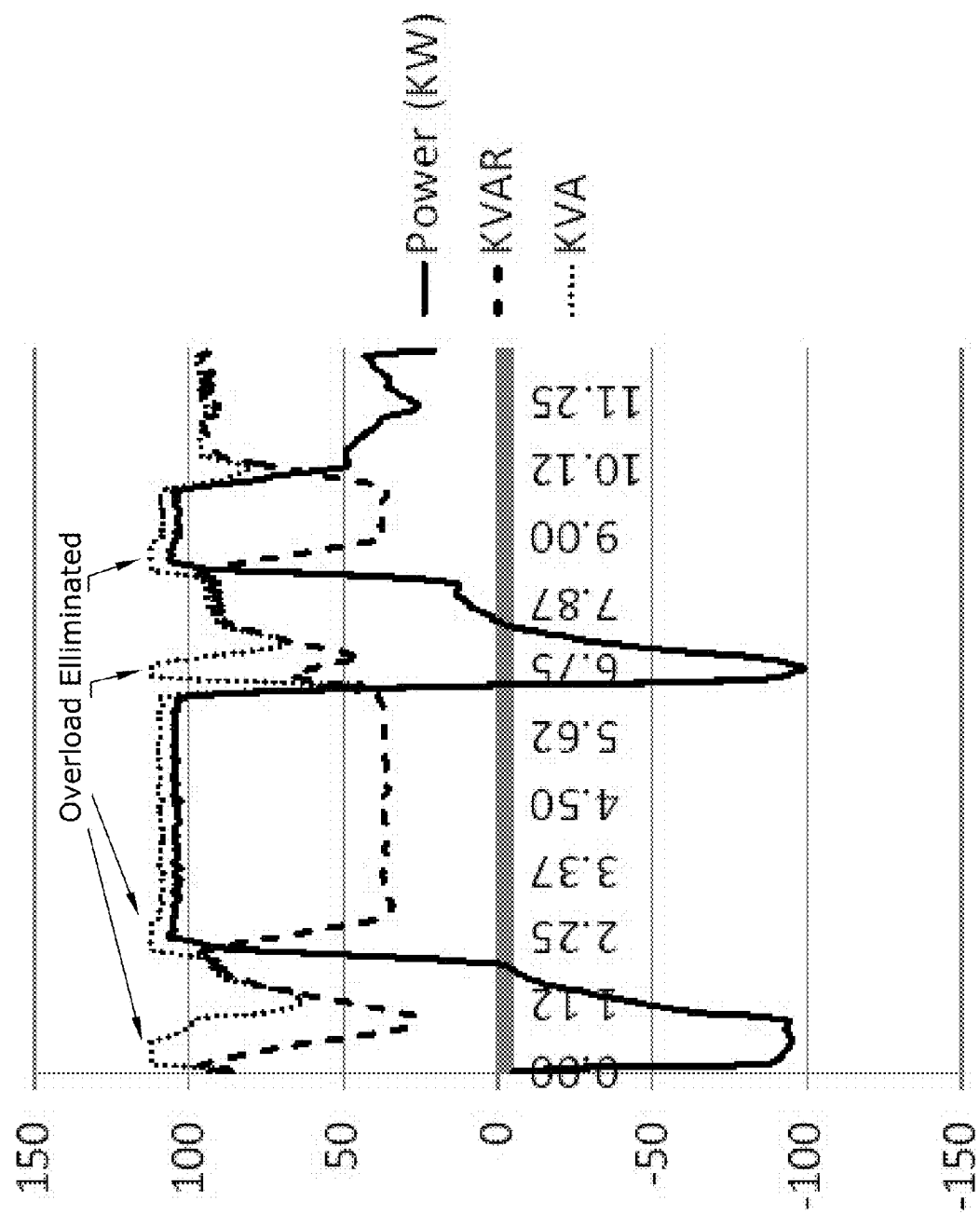
FIG. 9 is graph illustrating an operational state employing a Mode II.

Using the Control Mode II allows the reactive power reference, to be set to any level, including very high levels, without adversely affecting the operation of the active converter, inverter or the mechanical load. The reactive power reference may be set to very high levels even when the variable frequency AC drive equipped with an active converter is used to power loads with rapidly changing real power requirements. When using the above described control method the resulting performance results are illustrated in the graph of FIG. 9, which demonstrates the following regarding the control mode called real power limit as a function of reactive power:

- There is minimal negative impact on the ability of the variable frequency drive equipped with an active converter to deliver real power to the mechanical load as power is required.
- Very high levels of reactive power can be generated by the active converter without any significant overloading of the active converter, even when considered on an instantaneous basis.
- Current limiting of the active converter is usually eliminated as an operation requirement. Thereby eliminating all of the detrimental effects of employing current limiting in the active converter. Although, the capability and control mode that allows current limiting of the active converter may still be employed, the necessity of using the current limiting control mode will seldom be encountered.
- While this control method does greatly reduce any overload condition of the active converter, it does not fully maximize the ability of the active converter to generate reactive power. There are instances in which the utilized capacity of the active converter, measured in KVA, is not maintained at its maximum allowable level. This situation, while not ideal, is not a significant problem in most installations.

Cyclical Apparent Power Control Mode (Control Mode III)

Figure 10:
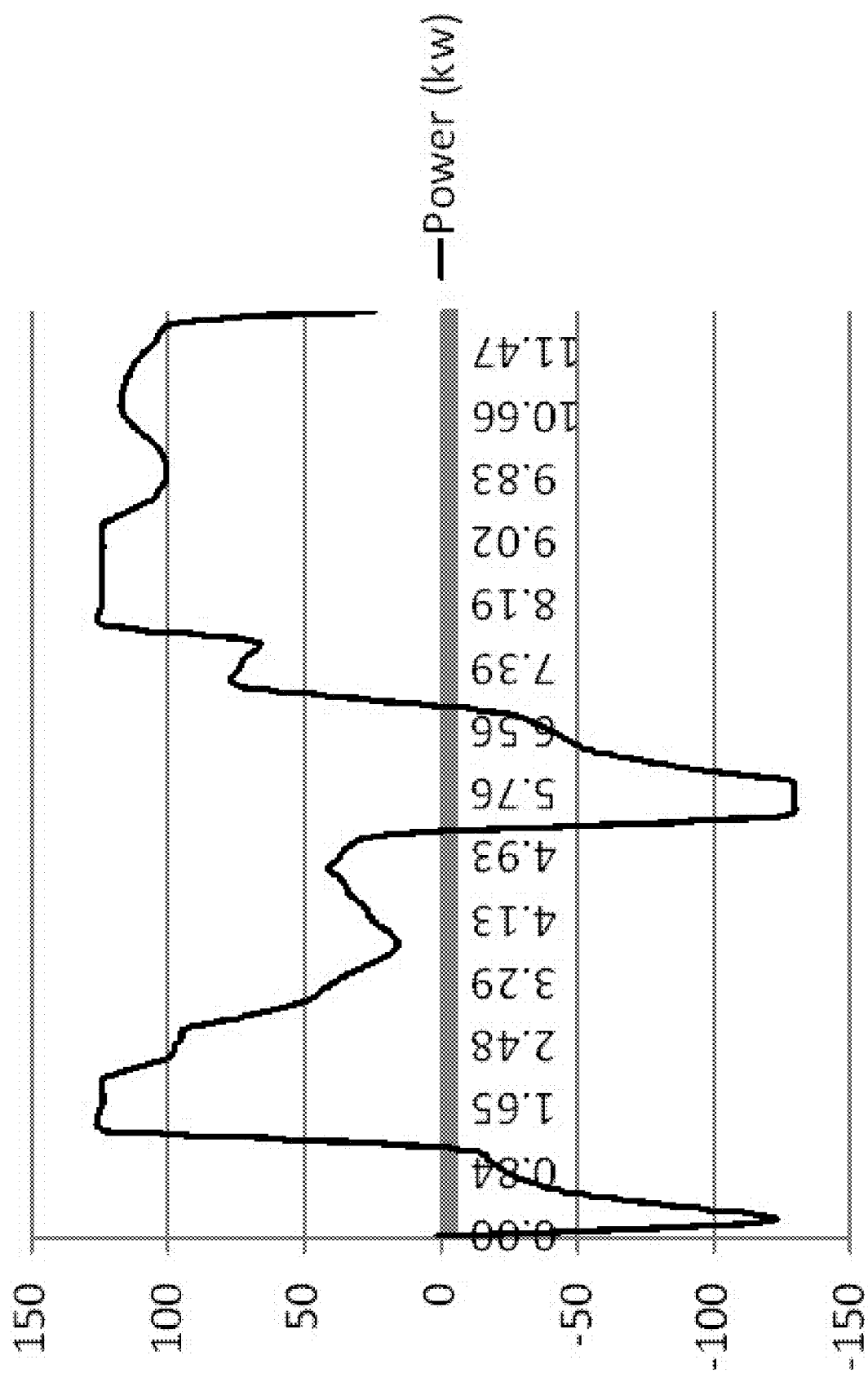
FIG. 10 is a graph illustrating a single cycle of a repetitive power profile
Figure 11:
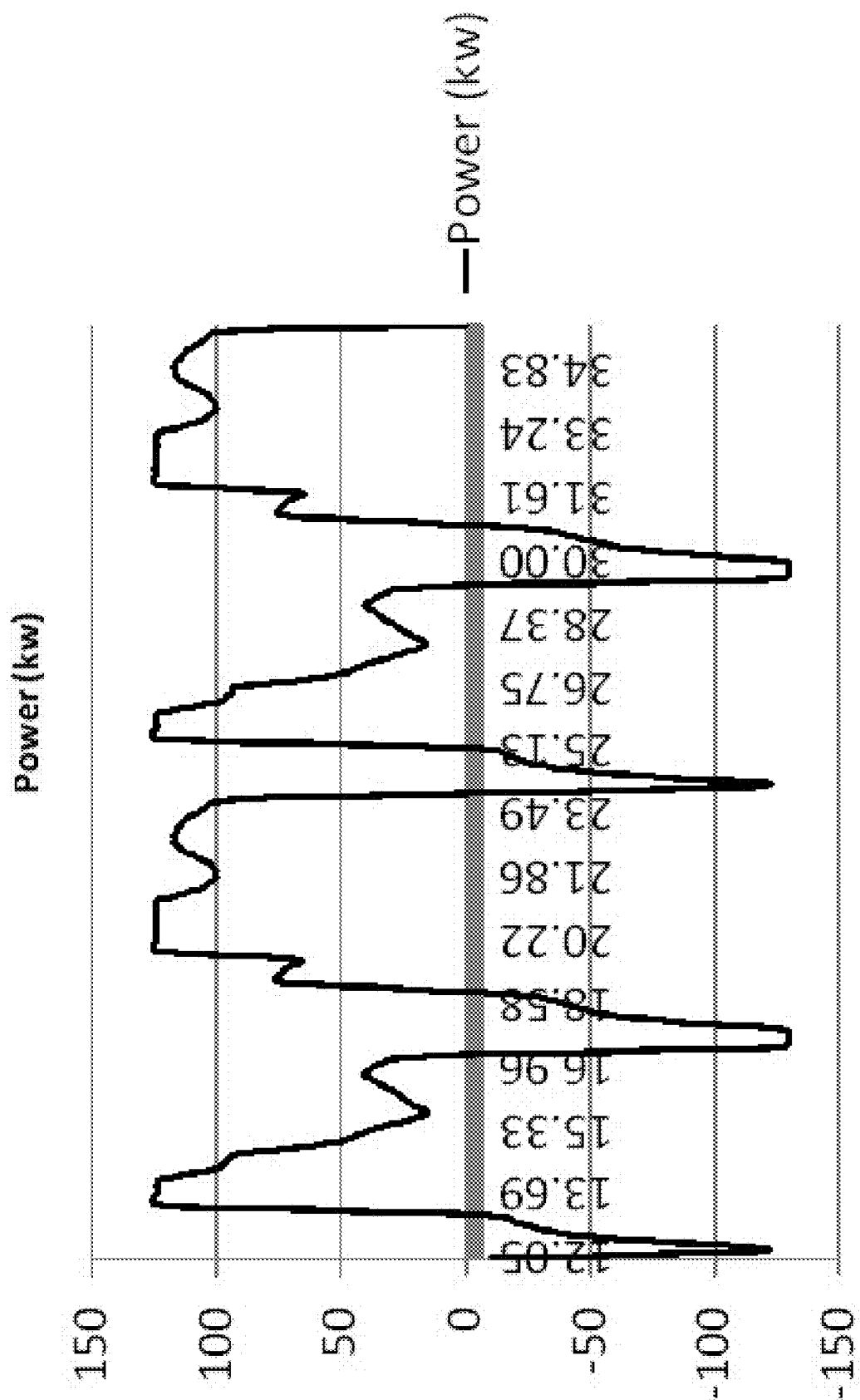
FIGS. 11 through 13 are graphs illustrating the repetitive profile depicted in FIG. 10 over greater and greater periods of time.
Figure 12:
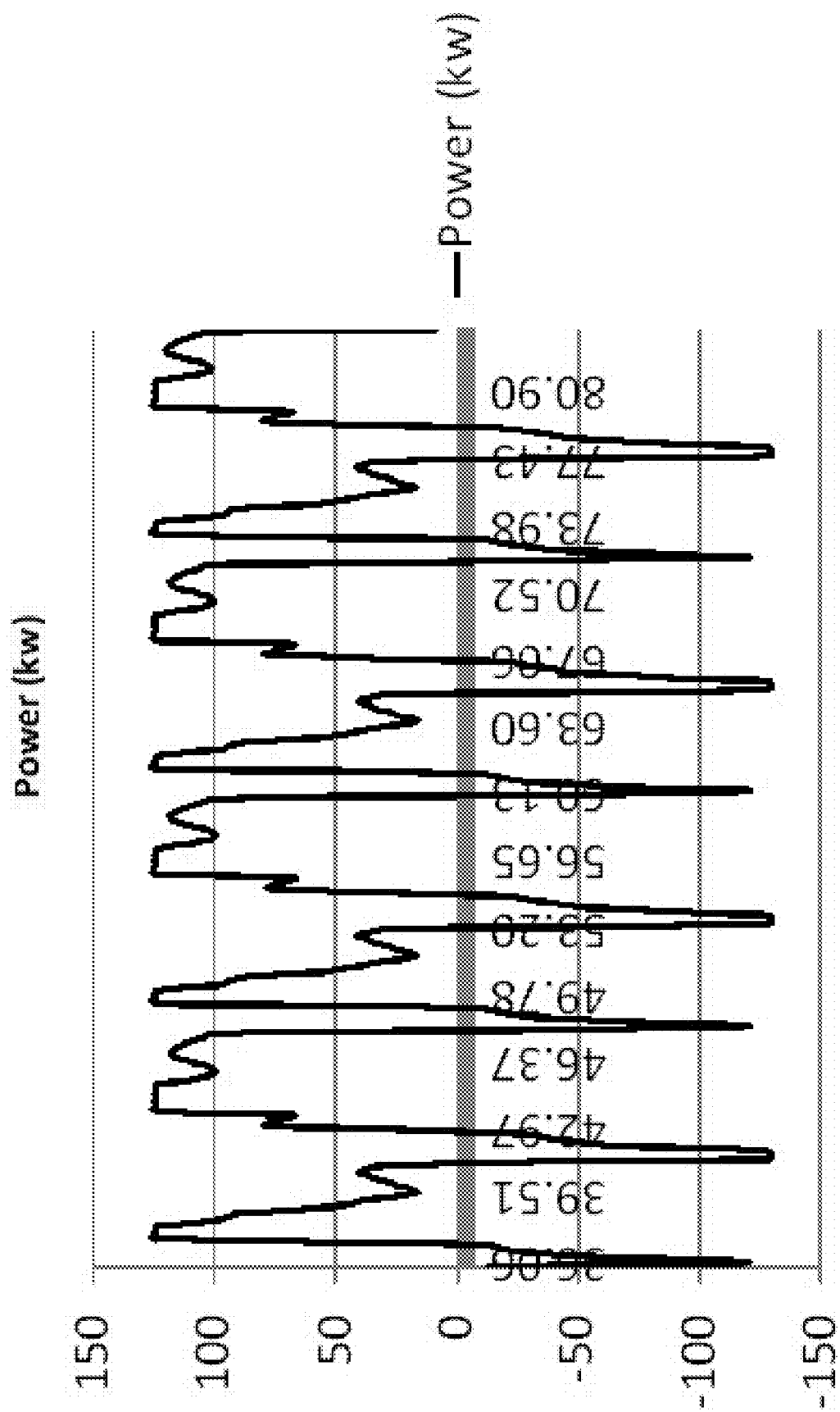
Figure 13:
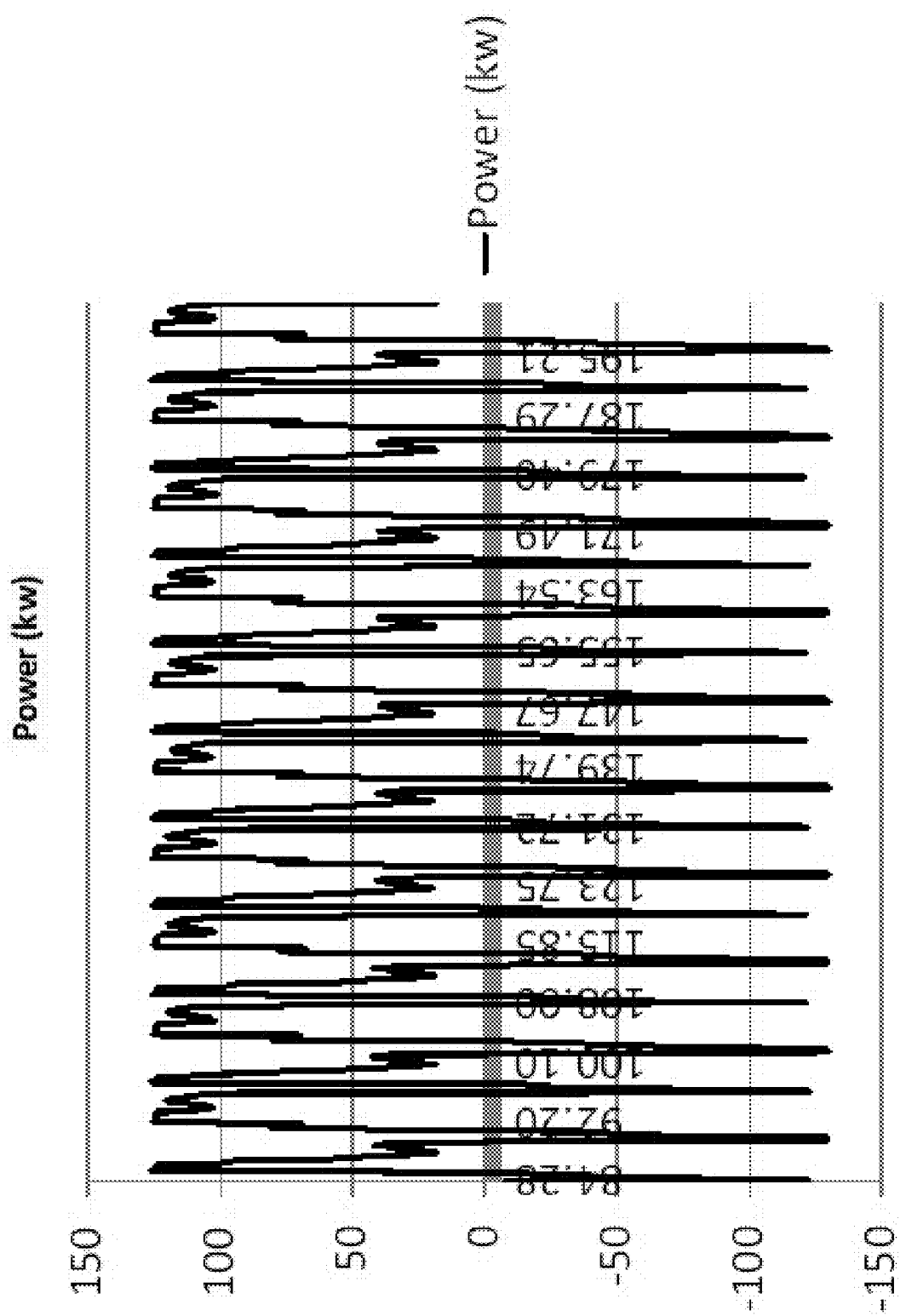

There is a unique type of mechanical load for which the real power requirement is repetitive and cyclic with respect to time. Generally, any type of mechanical motion that is reciprocating, whether linearly or rotationally, is cyclic and repetitive. Examples of these types of mechanical load include the following:

Pumping units used to produce oil and natural gas
Packaging equipment
Rotary Die
Labeling equipment
Indexing conveyor
Carriage drives
Flywheels
Punch Presses In some cases, the real power requirement of a load may be consistently repetitive according to a known cycle. If the real power requirement of a driven mechanical load has a natural, cyclic, consistent and repetitive pattern, then the real power requirement can be predicted. In other words, if the real power requirement of a load is consistently repetitive, one can predict the cyclical pattern of real power based on the previous cycle, or many previous, cycle. Consider the graph of FIG. 10, which graphically shows how the real power varies with respect to time. This particular profile shows a single cycle that is about 12 seconds in duration. We will use the start of this cycle as our time reference for this example. Now, consider the next two cycles in the graph shown in FIG. 11, which shows two cycles. As can be seen in the graph of FIG. 11, each cycle of about 12 seconds, looks very similar to the previous cycle illustrated in FIG. 10, but its profile is compressed. In addition, the next cycle can be assumed to be very much like the previous cycle. In this way, real power requirements can be considered to be predictable. A predictable real power requirement may be useful. Further illustrating the repetitive and oscillatory nature of this particular example, consider the graph of FIG. 12, which shows the next 4 cycles. And then the next 10 cycles illustrated in FIG. 13. One could imagine many hours of operation represented by thousands of these virtually identical cycles.

In the examples shown above, the real power requirements of the mechanical load are shown as a function of time. However, the real power requirements need not necessarily be a function of time. The real power requirement may be a function of position of the load, for example. If the position of the load is known over the course of a cycle, and the real power requirements repeat at each given position throughout a cycle, then the real power requirement can be considered similarly predictable. It is necessary that the real power requirement be a function of some known (either by calculation, estimation or direct measurement) variable, or variables, for the real power requirement to be considered cyclical and predictable. There may be a single variable, or a mix of multiple variables, that can be used to predict real power requirements.

Figure 14:
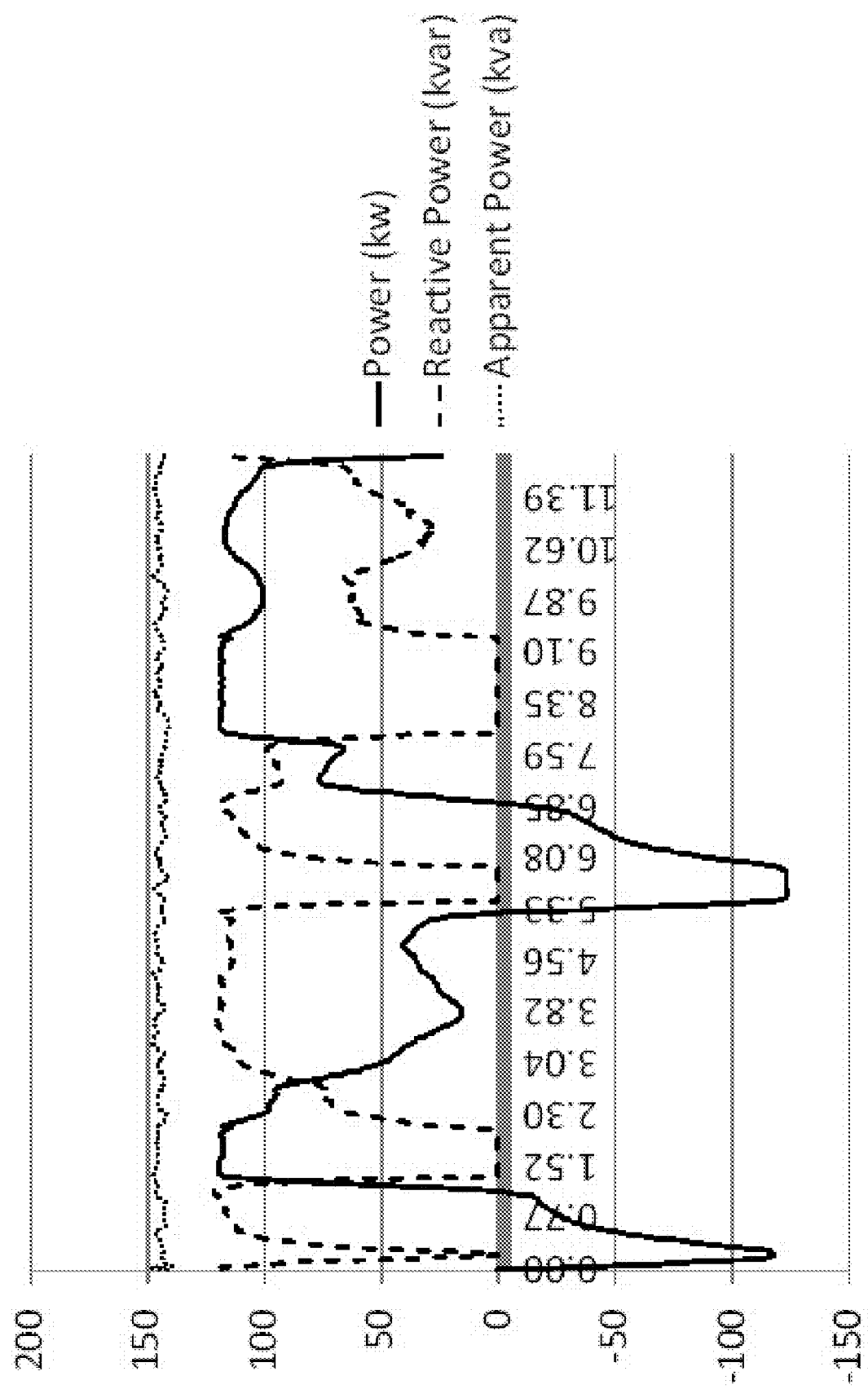
FIG. 14 is a graph illustrating an operational state employing Mode III.

In all cases in which real power requirements are cyclical and predictable, the real power requirements repeat in a way that allows reactive power to be controlled in such a way that apparent power can be kept constant. Constant apparent power has many advantages. Consider the control mode illustrated in FIG. 14 where the mechanical load has real power requirements that repeat according the graph of FIG. 10. In this mode, each point in time has associated with it a real power requirement. If we dissect the above graph and identify real power requirements associated with each interval of 100 milliseconds. This cycle is 12 seconds in duration. There are 120 intervals of 100 milliseconds in a 12 second interval. Therefore the above cyclical real power requirement will be represented by 120 unique variables. Thus, the real power requirement of the above graph is described by the following parameters we shall call the Real Power Array:

$R_0$=1.47 kw
$R_1$=−76.8 kw
$R_2$=−123.3 kw
$R_3$=−110.7 kw

- 
- 
-

$R_{119}$=77.5 kw
$R_{120}$=23.8 kw

We can now calculate the reactive power needed to maintain constant apparent power. The calculation of reactive power to maintain a constant apparent power will be done according to the following Equation:

$$|Q_n| = \sqrt{|S_r|^2 - |R_n|^2}$$

Where:
$Q_n$=Reactive Power Reference for $n^{th}$
$S_r$=Apparent Power Reference (desired apparent power)
$R_n$=Real Power (as described above)Q The above equation is solved for each value of n. Since the equation has two knowns and one unknown, the unknown is solved for each value of n. Assuming Sr=120 kva results in the following Reactive Power Reference Array:

$Q_0$=120 kvar
$Q_1$=92.2 kvar
$Q_2$=0 kvar
$Q_3$=46.3 kvar
- 
-

$Q_{119}$=91.6 kvar
$Q_{120}$=117.6 kvar

Figure 15:
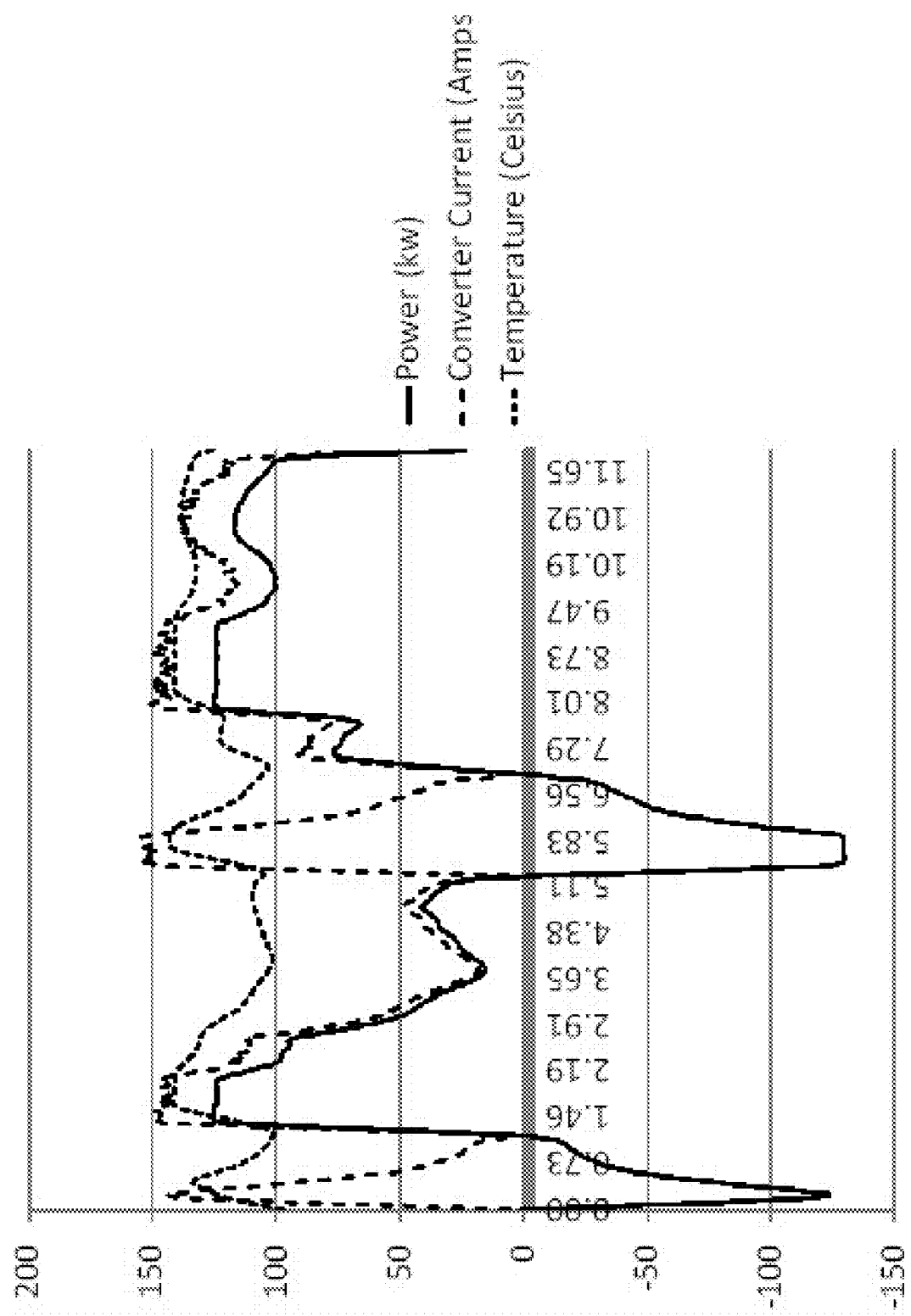
FIG. 15 is a graph illustrating the real power requirements of those in FIG. 10 and the resulting converter current and converter temperature where reactive power is controlled to be nil.

This control strategy, which may be referred to as Cyclical Apparent Power Control (CAP), results in the real power, reactive power and apparent power profiles for the cyclical load in the graph of FIG. 15.

In practice, due to the delay in the actual reactive power to follow the reactive power reference, the Reactive Power Reference Array is necessarily time shifted by a constant that is approximately the time constant of the delay of the reactive power with respect to the reactive power reference.

Using CAP yields several very desirable results:
Nearly constant apparent power in the active converter.
No overloaded operation of the active converter. This is true on an average and instantaneous basis.
Reactive power production is essentially optimal at all times. If it is desired under certain circumstances to produce a maximum amount of reactive power, the CAP control method results in full utilization of the active converter to produce reactive power without any type of overload of the active converter.
No interference with the ability of the variable frequency AC drive equipped with Active converter to supply real power to the mechanical load. This is the primary objective of all variable frequency AC drives as described above.

Using CAP also eliminates some of the undesirable effects of other control methods, such as:
Eliminates the undesirable effects of using current limit to prevent overloads of the active converter.
Eliminates interference with the ability of the variable frequency AC drive equipped with active converter to supply real power to the mechanical load.
Eliminates the under-utilization of the active converter to supply reactive power in maximum quantities when desired.

CAP can only be applied to mechanical loads that are characterized by cyclical and predictable real power profiles. However, when CAP can be used the result is the optimum performance of the active converter to perform all desired operations.

There are circumstances in which a mechanical load may have a real power requirement that is cyclical and predictable most of the time, or even only occasionally. CAP can be used to beneficially affect performance of the variable frequency AC drive equipped with an active converter in these circumstances as well. There are several ways CAP might be used in these types of circumstances. CAP could be combined with other control methods described herein. CAP might be combined with Reactive Power Control using Apparent Power Limit. CAP may be combined with Reactive Power Control using Real Power Limit, especially for loads that are characterized by rapid, large, abrupt or very dynamic changes in real power requirements. In these circumstances the beneficial effects of CAP may be realized in wide variety of loads that have real power requirements that are only occasionally cyclical.

Apparent Power Used to Reduce

Temperature Change in Transistors

As discussed above, heavy power cycling leads to thermal cycling which in turn leads to premature transistor failure. Power cycling is characterized by large changes in current through a transistor. To the extent that current can be stabilized in a transistor the temperature of the transistor can be stabilized. As was explained previously, relatively small decreases in $\Delta T_c$ can lead to extremely large increases in the useful lifetime of an IGBT transistor. A decrease in $\Delta T_c$ and a more stable transistor temperature are synonymous. The graph shown in FIG. 15 doesn't employ any of the control strategies. Reactive power in the converter is controlled to be nil. Therefore, the current in the converter is a function of the mechanical real power requirements. Controlled in this way, the converter current varies in magnitude significantly over the course of a single cycle. The measured converter temperature changes significantly over the course of a single cycle. $\Delta T_c$=46° C. for the graph shown in FIG. 15.

Figure 16:
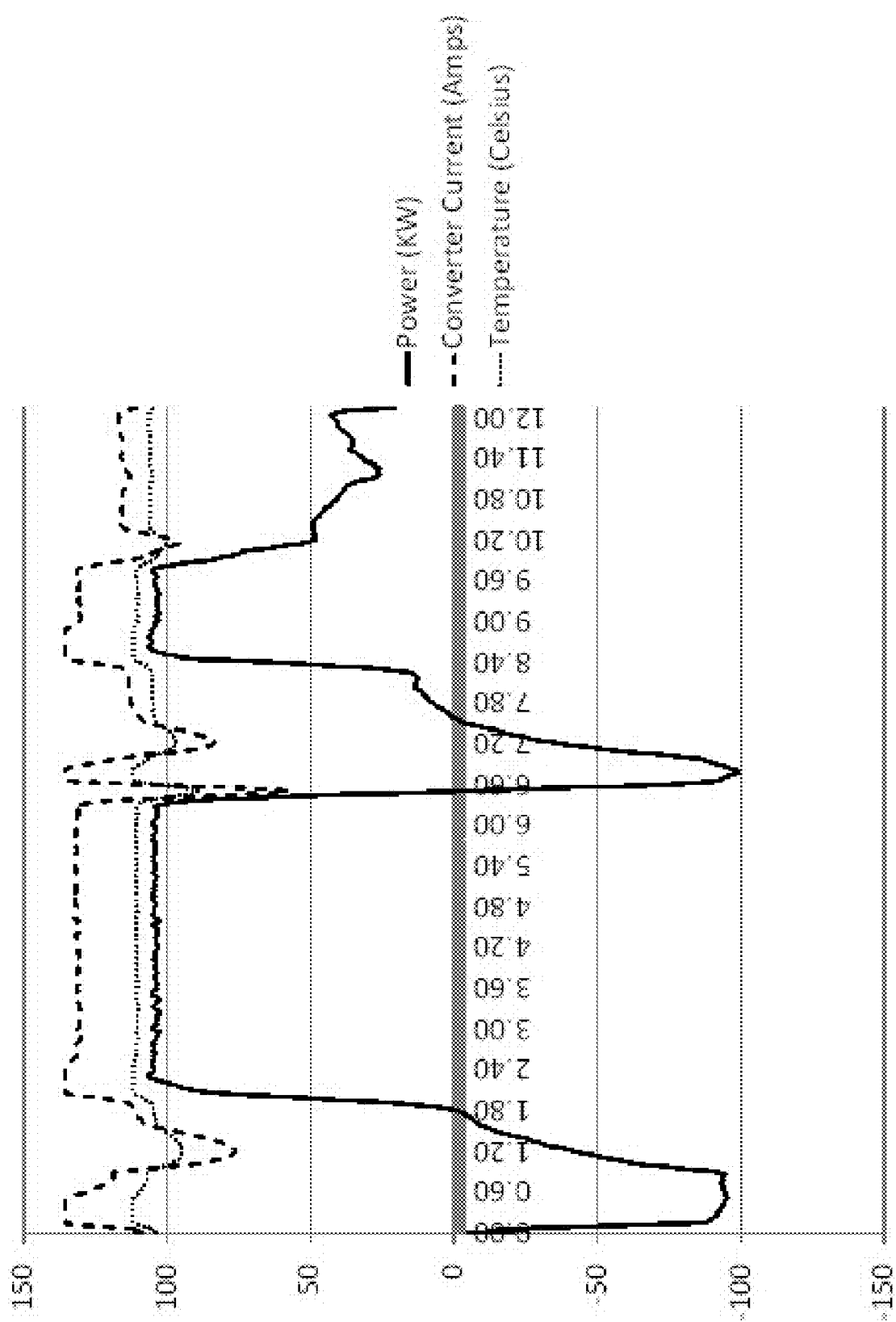
FIG. 16 is a graph illustrating the real power requirements of those in FIG. 10 and the resulting converter current and converter temperature using Mode II to control reactive power.

Now consider operation of the active converter using the Mode II. In this example the converter has a constant reactive power reference $Q_{ref}$=100 kvar The graph shown in FIG. 16 illustrates employing Mode II, where the reactive power in the converter and real power in the inverter and converter are controlled as described previously. The current in the converter is a function of the mechanical real power requirements and the reactive power Control Mode I. Controlled in this way, the converter current varies in magnitude over the course of a single cycle, but far less than the operational circumstance described previously. The measured converter temperature changes over the course of a single cycle. $\Delta T_c$=23° C. for the graph of FIG. 16. This is roughly a 50% reduction from the previously described $\Delta T_c$=46° C. As was explained previously, this reduction in $\Delta T_c$ will result in significantly increased useful life of the converter IGBT transistors. The increase in useful lifetime will be approximately 2000% or 20 times in this case.

Figure 17:
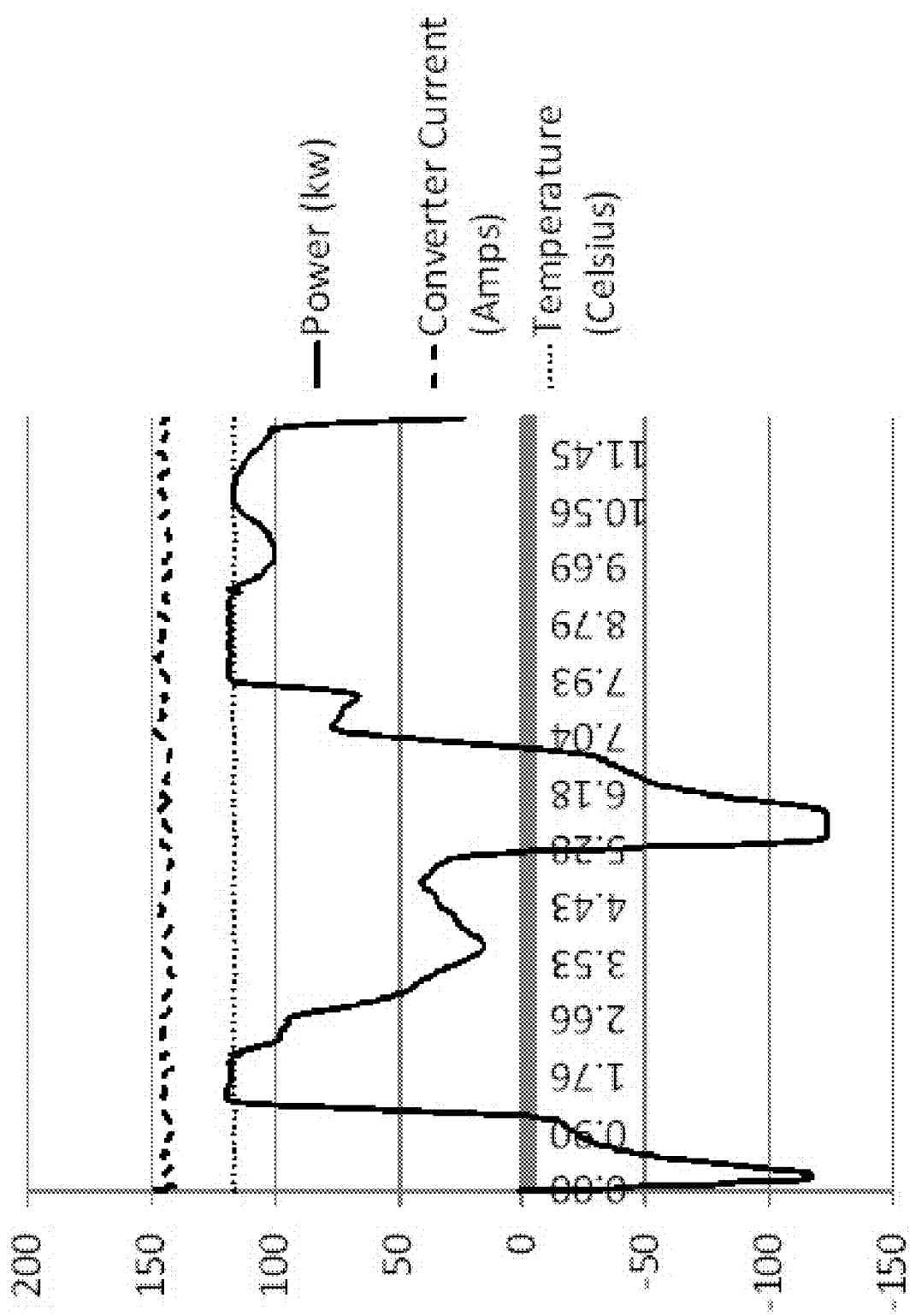
FIG. 17 is a graph illustrating the real power requirements of those in FIG. 10 and the resulting converter current and converter temperature using a combination of Mode II and Mode III to control reactive power

Now consider the graph of FIG. 17 were the operation of the active converter is controlled using the Mode III where the converter has a constant reactive power reference $Q_{ref}$=120 kvar The graph of FIG. 17 shows reactive power in the active converter controlled as described previously. The current in the converter is a function of the mechanical real power requirements and the reactive power Control Mode III.

Controlled in this way, the converter current is essentially constant over the course of a single cycle. The measured converter temperature changes over the course of a single cycle. $\Delta T_c=2°$ C. for the graph above. Thus Mode III virtually eliminates thermal stress due to power cycling on the converter IGBT's. As was explained previously, this reduction in $\Delta T_c$ will result in elimination of thermal stress due to power cycling and elimination of the degradation in expected lifetime due to power cycling.

As discussed in greater detail in the attached APPENDIX A—TUTORIAL, reactive power is a function of voltage and reactive current. Reactive current and reactive power are proportional to each other only if voltage is considered constant. However, many power distribution systems have voltages that vary over the course of time. There are IEEE and ANSI Standards that regulate the amount of voltage variation that are considered generally acceptable in most power distribution systems.

Each of the control strategies described above could be controlled and implemented using reactive current rather than reactive power. However, with limited exceptions as discussed above, using reactive current as a limiting factor does not noticeably change the effectiveness of each control strategy. In addition, using reactive current is not manifestly different in any significant way, as far as the control strategies themselves are concerned. All quantities discussed in the section entitled "Modes Of Control," can be defined in terms of current and voltage. Reactive power and real power can be defined in terms of apparent power, and apparent power can be defined in terms of voltage and current.

SCOPE OF THE INVENTION

The above presents a description of the best mode we contemplate of carrying out our control system and method, and of the manner and process of making and using them, in such full, clear, concise, and exact terms as to enable a person skilled in the art to make and use. Our system and method is, however, susceptible to modifications and alternate constructions from the illustrative embodiments discussed above which are fully equivalent. Consequently, it is not the intention to limit our system and method to the particular embodiments disclosed. On the contrary, our intention is to cover all modifications and alternate constructions coming within the spirit and scope of our system and method as generally expressed by the following claims, which particularly point out and distinctly claim the subject matter of our invention:

Appendix A—Tutorial

The following tutorial is presented to assist in better understanding of the above disclosure and is not intended to be an admission of prior art.

Power in an electrical circuit is the rate of flow of energy past a given point in a circuit. In AC circuits, energy storage elements such as inductance and capacitance may result in periodic reversals of the direction of energy flow. The portion of power, averaged over one complete cycle of the AC period of the AC waveform, results in net transfer of energy in one direction is known as real power. The portion of power due to stored energy, which returns to the source in each cycle is known as reactive power.

In a simple AC circuit consisting of a source and a linear load, both the current and the voltage are sinusoidal. If the load is purely resistive, the two quantities reverse their polarity at the same time. At every instant the product of the voltage and current is positive, indicating that the direction of energy flow does not reverse. In this case, only real power is transferred. If the load is purely reactive, then the voltage and current are 90° out of phase. For half of each cycle, the product of voltage and current is positive, but on the other half of the cycle, the product is negative, indicating that on average, exactly as much energy flows toward the load as flows back. There is no net energy flow over one cycle. In this case, only reactive energy flows—there is no net transfer of energy to the load. All real-world loads have resistance, inductance and capacitance, so both real and reactive power will flow to real-world loads. Power engineers measure apparent power as the vector sum of real and reactive power. Apparent power is the product of the root-mean-square (RMS) voltage and current. Power Engineers care about apparent power because even though the current associated with reactive power does no work in the load, it heats wires, wasting energy. Conductors, transformers and generators must be sized to carry the total current, not just the current that does useful work.

If a capacitor and an inductor are placed in parallel, then the currents flowing through the inductor and the capacitor tend to cancel out rather than adding. Conventionally, capacitors are considered to generate reactive power and inductors are considered to consume reactive power. Reactive power generation and reactive power consumption is the fundamental mechanism for controlling the power factor in electric power transmission and distribution; typically capacitors are inserted in a circuit to partially cancel reactive power 'consumed' by the load.

Figure 24:
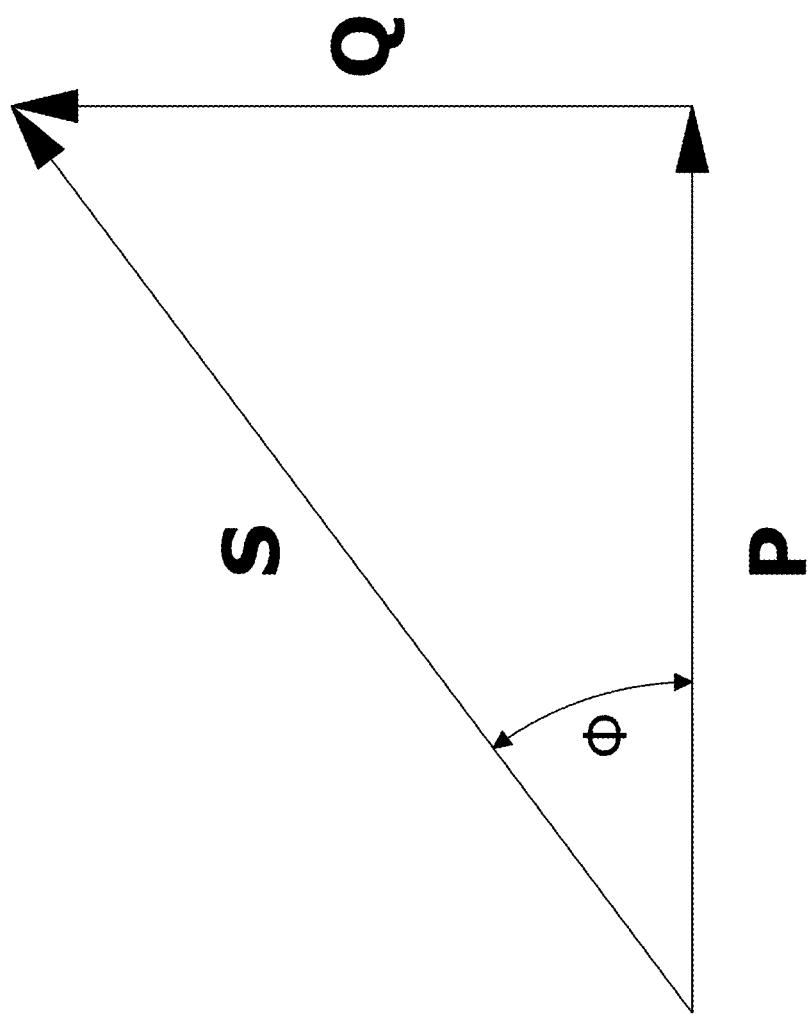
FIG. 24 is a vector diagram illustrating an electrical power circuit with a lagging power factor of 0.8.

The Power Triangle of FIG. 24 shows the relationship of vectors in a plane.

P=Real Power (watt [W])

Q=Reactive Power (volt-amperes reactive [VAR])

S=Complex Power (volt-ampere [VA])

|S|=Apparent Power (volt-ampere [VA])

φ=Phase of Current (degree [°])

For the above shown power triangle:

|P|=4

|Q|=3

|S|=5

φ=36.87°

There are several important mathematical relationships between Real Power, Reactive Power, Apparent Power and Phase. The following is a partial list of Equations setting forth these mathematical relationships:

$$|S| = \sqrt{|P|^2 + |Q|^2}$$

$$|P| = |S|\cos(\phi)$$

$$|Q| = |S|\sin(\phi)$$

$$\phi = \tan^{-1}\frac{|Q|}{|P|}$$

$$\vec{S} = \vec{P} + \vec{Q}$$

Understanding the relationship between the quantities listed above is at the heart of understanding electrical power engineering. Without further elaboration the concepts defined in the definition of the Power Triangle will be assumed to be accepted, established, well-defined and understood by skilled power engineers.

For most electrical quantities "K" can be added for multiples of 1,000. "M" can be added for multiples of 1,000,000. For example, 100 KW is 100,000 Watts. 10 MVAR is 10,000,000 VAR.

Power Distribution Systems

Introduction

A sample power distribution system is shown on FIG. 18 through FIG. 23. These types of drawings are called "single line" or "one line" diagrams. Virtually all commercial and industrial power distribution systems are 3 phase AC (Alternating Current) systems. Single line diagrams are used to describe relevant aspects of electrical power distribution systems succinctly using a single line to represent all 3 phases of voltage and all 3 phases of current. 3 phase systems can be of a 3-wire or a 4-wire type. 3 phase systems can be referenced to ground or not referenced to ground. Transformers described in single line diagrams are virtually always devices that are comprised of 3 separate magnetic circuits that use changing magnetic flux to induce voltage and current in electrical circuits which are connected to the transformer. These magnetic circuits may be enclosed in single enclosure or 3 separate enclosures. Regardless of the type of electrical power distribution system and the components that comprise that electrical power distribution system, single line diagrams are useful for designing, analyzing, describing and specifying electrical power distribution systems. Without further elaboration this application will use single line diagrams to describe electrical power distributions systems and to describe the components that comprise said electrical power distribution system. Single line diagrams are accepted, well-defined and understood by skilled power engineers as a method to represent electrical power distribution systems and associated components.

Ratings used in single line diagrams can be of many different types. For example, voltage ratings used in single line diagrams may be considered as voltage measured between phases or voltage ratings used in single line diagram may be considered as voltage measured between any of the three phases and ground. However, most ratings used in single line diagrams, and the ratings used in this application, are considered to be defined as follows:

VOLTAGE—/RMS AC voltage between any two of the three phases[1]. So-called line to line voltage CURRENT—/RMS AC current measured in any single conductor[1]. So-called line current.

VA—/Product of volts and amps of all 3 phases[2].

[1]—Voltage and current in single line diagrams is considered to be balanced. An electrical power distribution system characterized by balanced voltage has equal RMS AC voltage levels between any one reference phase and either of the remaining two phases. The balanced voltage is present regardless of which three phases is used as the reference phase described above. An electrical power distribution system characterized by balanced current has equal RMS AC current levels in all 3 phase conductors. KV is a unit of measure that equal 1,000 RMS AC Volts.

[2]—VA rating is the scaled product of the line to line voltage and the line current. KVA is a unit of measure that is equal to 1,000 volt-amperes. MVA is a unit of measure that equals 1,000,000 volt-amperes.

Fundamental Frequency

The fundamental frequency, often referred to simply as the fundamental and abbreviated $f_0$ or $F_0$, is defined as the lowest frequency of a periodic waveform. In electrical power systems analysis, unless stated otherwise, the vectors used to described voltage, current, real power, apparent power and reactive power are intended to describe power systems at their fundamental frequency. If frequencies other than the fundamental are to be considered, this is usually explicitly stated and referred to as harmonic frequencies.

Distribution Transformers

A transformer is a device that converts AC voltage and AC current at one level to a different AC current and voltage level. There are many different types of transformers used in various electrical applications. In its most basic description a transformer will have an electrical connection for high voltage (high-side), an electrical connection for low voltage (low-side) and a volt-ampere rating (VA, KVA or MVA). In the case of a distribution transformer the high-side is called the primary and the low-side is called the secondary. The principal function of the distribution transformer is to transmit electrical power from the primary to the secondary. Power flow is considered to be from the primary to the secondary. The primary is fed from an electrical circuit that ultimately is supplied with electrical power from an electrical power generation facility. The secondary is connected to an electrical circuit that consumes power that is used in electrical loads in the local distribution circuit. The secondary of the transformer must provide all of the voltage and current to the various electrical loads powered by the local electrical power distribution circuit.

Real Power Consumption

Real power is measured in watts (W or KW or MW). Consumption of real power is the result of a given amount of energy being consumed in a given amount of time. Motors consume large amounts of real power. Real power in a motor is proportional to the product of speed and torque measured at the motor's output shaft plus losses due to inefficiency. Please see FIG. 23A for a graphical representation of electrical power, mechanical power and losses characterized by a motor. The electrical power consumed is equal to the mechanical power plus the losses. Or considered another way, the mechanical power is equal to the electrical power minus the losses. Motors consume relatively small amounts of real power that is lost to inefficiency. The real power that is lost in a motor is defined as inefficiency of the motor. Transformers are electrical devices that are typically considered to consume power in the primary connection and produce power in the secondary connection. Therefore, there is little net change in real power as real power is conducted through the transformers. What change there is in net real power when considering a transformer is the losses due to inefficiency in the transformer. All devices, components and conductors in an industrial electrical power distribution system lose some real power due to inefficiency. The losses in most electrical devices increase as the load is increased. However, some losses of real power will exist at very light or zero load due to circulating reactive power required to magnetize components.

Real Power Generation

Real power is measured in watts (W or KW or MW). Generation of real power is the result of a given amount of energy being generated in a given amount of time. Generators generate large amounts of real power. Real power in a generator is proportional to the product of speed and torque measured at the generator's input shaft plus losses due to inefficiency. Please see FIG. 23B for a graphical representation of electrical power, mechanical power and losses characterized by a generator. The electrical power generated is equal to the mechanical power minus the losses. Or considered another way, the mechanical power is equal to the electrical power plus the losses. Generators generate relatively small amounts of real power that is lost to heating of the generator. The real power that is lost to heating in a generator is virtually all the result of inefficiency of the generator. Please note, there are no generators shown in the sample power system in FIG. 18 through FIG. 23.

Reactive Power Consumption

Reactive power, as described above, does not necessarily require real power to be generated or consumed. Generally, any device that requires magnetic flux to operate will require reactive power. Transformers, as described previously, use magnetic flux to transform electrical power. Transformers will consume reactive power regardless of the amount of real power being transferred through the transformer. A good estimate of the reactive power required by a transformer is equal to about 10% of the transformer's rating. Using this estimate—a 225 KVA rating transformer for example would require 22.5 KVAR of reactive power. Transformers are energized on the primary side. Therefore, the reactive power in a transformer is usually considered to be supplied by the circuit connected to the primary side of the transformer. Induction motors require magnetic flux as well to generate torque. A good estimate of the reactive power required by a motor is equal to about 40% of the motor's rating. Using this estimate—a 150 HP motor @ 480 VAC would require about 57 KVAR of reactive power. It is important to note that the reactive power requirements of both transformers and motors is approximately constant regardless of load. Another way to say this is that both transformers and motors require reactive power regardless of the amount of real power being transferred or consumed.

Reactive Power Generation

In most electrical power distribution systems capacitors are used to generate reactive power. There are, however, other means of generating reactive power. Namely static VAR compensators, synchronous condensers and synchronous generators can be used to generate reactive power. For the purposes of this tutorial, capacitors will be used as a source of reactive power. Capacitors that are used in applications for the purpose of generating reactive power are typically called "power factor correction capacitors" or PF Cap. Altering the power factor is a result of the PF Cap generating reactive power, as will be discussed later. PF Caps generally have a VAR or KVAR rating and a voltage rating. PF Caps can be of a single rating: for example, 200 KVAR. PF Caps with a single rating simply produce the rated amount of reactive power when energized with voltage. PF Caps can be adjustable: for example 20-200 KVAR. This type of capacitor typically consists of many small PF Caps that can be switched on or off to produce the desired amount of reactive power.

Reactive Power and Variable Frequency Drives with an Active Line Side Converter

Variable frequency drives with active line side converters can also be used to generate or consume reactive power. Variable Frequency Drives with Active Line Side Converters typically consists of many large capacitors connected together internally. A transistorized converter can be used to inject reactive power into the electrical power distribution system at a level that corresponds to a reactive power reference that is connected to the drive. The same transistorized converter can be used to consume reactive power from the electrical grid at a level that corresponds to a reactive power reference that is connected to the drive. A transistorized converter uses transistors, switched at very high frequency to control the amount of reactive power that is either consumed or generated by the converter.

Apparent Power

Figures 26A, 27A:
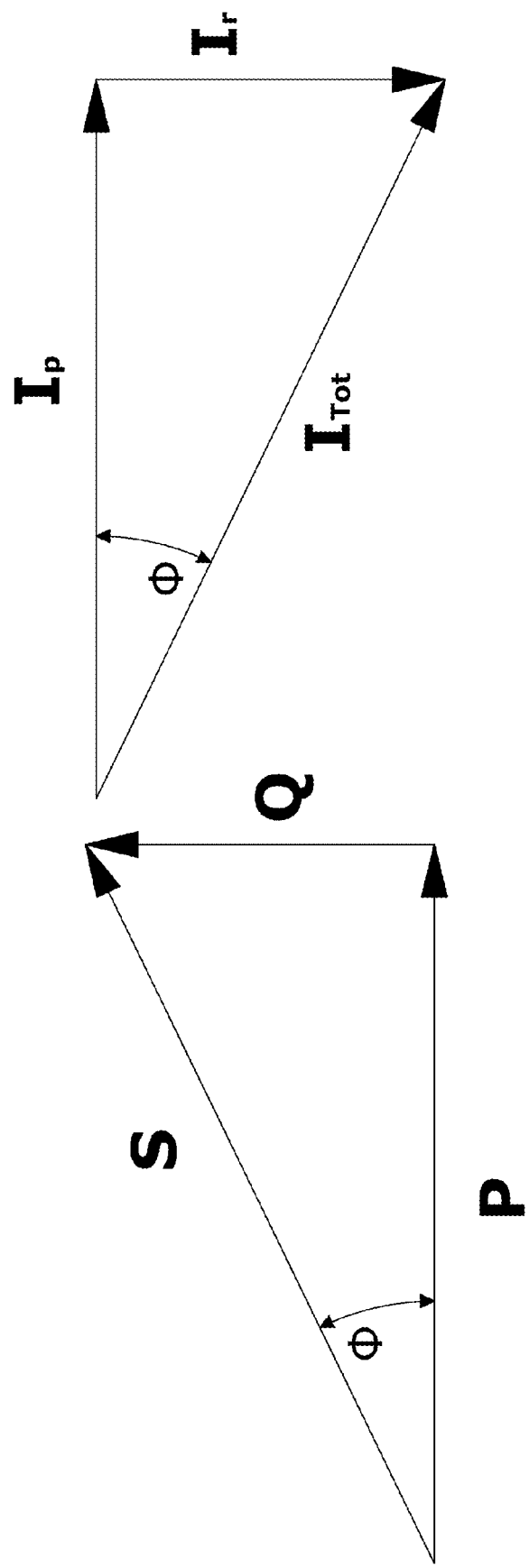
FIG. 26A is a vector diagram illustrating an electrical power circuit with a lagging power factor of 0.9.
FIG. 27A is a vector diagram illustrating the current components resulting from the operation condition shown in FIG. 26A.

Apparent Power is used to combine concisely real power and reactive power into a single mathematical quantity. FIG. 26A and FIG. 27B are used to represent relationship amongst apparent power, real current, reactive current, real power, reactive power, voltage and total current. Apparent power is a phasor representation of the scaled product of voltage and current in a power circuit. However, the convention is that apparent power is the complex conjugate of the product of voltage and current. A complex conjugate is a mathematical concept that is well understood by skilled power engineers. In FIG. 26A the apparent power is shown to lead the real power in phase by the angle 25.84°. However, in FIG. 27B the total current is shown to lag the real current by the angle 25.84°. Real power is the scaled product of voltage and current with zero phase difference. As can be shown in FIG. 26A and FIG. 27B real current and real power are in phase with each other. Real current and real power are also in phase with voltage. "In phase" is used to mean there exists zero phase difference between these vectors. Reactive power is the scaled product of voltage and current with a phase difference of 90°. If one assumes the voltage, real current and real power axis to be 0°, then it is evident that the reactive current lags the voltage by 90°. As will be explained later, this is said to be a lagging power factor circuit. Inductors, transformers and motors are considered by this convention to be devices that are characterized by a lagging power factor. The total current shown in FIG. 27B is the vector sum of the real current and reactive current. The total current is what is measured in any of the 3 phase conductors in an electrical power distribution network. Therefore, apparent power and total current are proportional to each other if voltage is considered to be constant. In addition, real power and real current are proportional to each if the voltage is considered to be constant. In addition, reactive power and reactive current are proportional to each other if the voltage is considered to be constant. In most electrical power distribution systems voltage is very stable and can be considered to be a constant. There are exceptions to the constant voltage assumption that will be discussed later. However, for most analysis voltage can be considered to be constant. Apparent Power and total current is conserved, which is to say that the sum of the apparent power and current flows out of sources equals the sum of the apparent power flows and current into the other elements of the circuit.

Voltage Drop

Voltage drop is the result of current being conducted through an impedance. Virtually all conductors and transformers have impedance. Therefore, as either the level of impedance or the level of current increases, the voltage drop will tend to increase. This is true of both conductors and transformers.

Power Factor

Power factor is the ratio between real power and apparent power. Power factor is a dimensionless quantity between 0 and 1. Formula for power factor magnitude:

$$pf = \frac{|P|}{|S|}$$ Equation

Rearranging this formula results in:

$$|P|=|S|*pf$$ Equation

However, examining the power triangle in FIG. 24 reveals this relationship as well:

$$|P|=|S|*\cos(\phi) \quad \text{Equation}$$

Therefore:

$$pf=\cos(\phi) \quad \text{Equation}$$

The power factor is the cosine of the phase angle between real power and complex power. This also is the phase difference between voltage and total current in an AC circuit.

The magnitude of power factor, however, is not all that is necessary to describe power factor in its entirety. One must also specify whether the power factor is "leading" or "lagging". A lagging power factor is one in which the current lags the voltage in its phase. A lagging power factor is one in which the voltage leads the current in its phase. A leading power factor is one in which the current leads the voltage in phase. A leading power factor is one in which the voltage lags the current in phase. FIG. 26A and FIG. 27B show a power triangle which represents a lagging power factor. FIG. 26A shows the classic power triangle with the apparent power leading the real power. However, the conventions between apparent power and current is that these two quantities are calculated using a complex conjugate. FIG. 27B shows the total current lagging the real current. Since real power results in current flow that is exactly in phase with voltage, the voltage phase is the same as the phase of the real current. Therefore, the total current lags the voltage in phase by the angle 25.84°.

The power triangle shown in FIG. 24 characterizes a lagging power factor and has dimensions as follows:

$$|P_7|=4, |Q_7|=3$$

and $$|S_7|=5$$

$$\phi=36.87°, \quad \text{Equation}$$

and $$pf=\cos(36.78°)=0.8 \quad \text{Equation}$$

Analyzing this power triangle would yield the following results:
Equation

Let us now consider the power triangle of FIG. 25 which characterizes a lagging power factor and has dimensions as follows:

$$|P_8|=4, |Q_8|=1.937$$

and $$|S_8|=4.444$$

and
Analyzing this power triangle would yield the following results:

$$\phi=25.842°$$

$$pf=\cos 25.842°=0.9 \quad \text{Equation}$$

Figure 25:
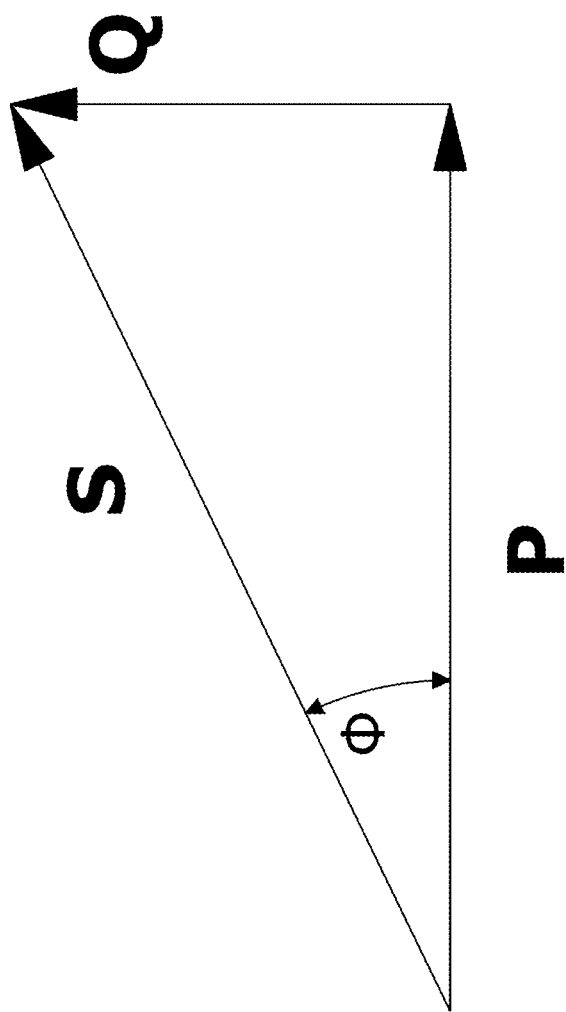
FIG. 25 is a vector diagram illustrating an electrical power circuit with a lagging power factor of 0.9.

If we analyze the differences between the two power triangles shown in FIG. 24 and FIG. 25 the following observations can be made. First, real power is 4 in both FIG. 24 and FIG. 25. There is no change in net power flow between these two figures. Second, the reactive power level in FIG. 25 is lower than the reactive power level in FIG. 24. The reactive power level in FIG. 25 is 64.6% of the reactive power in FIG. 24. Third, lowering the net reactive power level lowers the apparent power level, even maintaining the real power level constant. Since, as was explained earlier, apparent power and total current are proportional to each other, the total current in FIG. 25 is 88.9% of the total current in FIG. 24. Therefore, lowering the net reactive power level will result in a lower level of current measured in each conductor. Fourth, it is shown that in these typical power triangles, changing the level reactive power results in a significantly smaller relative change in apparent power. It is for this reason, that near unity power factor, relatively large changes in reactive power result in relatively small changes in apparent power, relatively small changes in total current and relatively small changes in power factor. And finally, fifth, changing the net level of reactive power changes the power factor if the real power is maintained constant.

Reactive Power vs. Reactive Current

Reactive power and reactive current are closely related, but not identical. Reactive current is measured in Amps. Reactive Power is measured in VAR, or volt-amperes-reactive. Reactive power is the scaled product of voltage and reactive current with a phase difference of 90°. Therefore, reactive current and reactive power are proportional to each other only when voltage is constant.

Power Distribution Example

FIG. 18 through FIG. 23 show how real power, reactive power and apparent power are analyzed to describe the operation of an electrical power distribution system. FIGS. 18 through 23 depict a power distribution network with different operating modes for each of the described pieces of electrical equipment.

Figure 18:
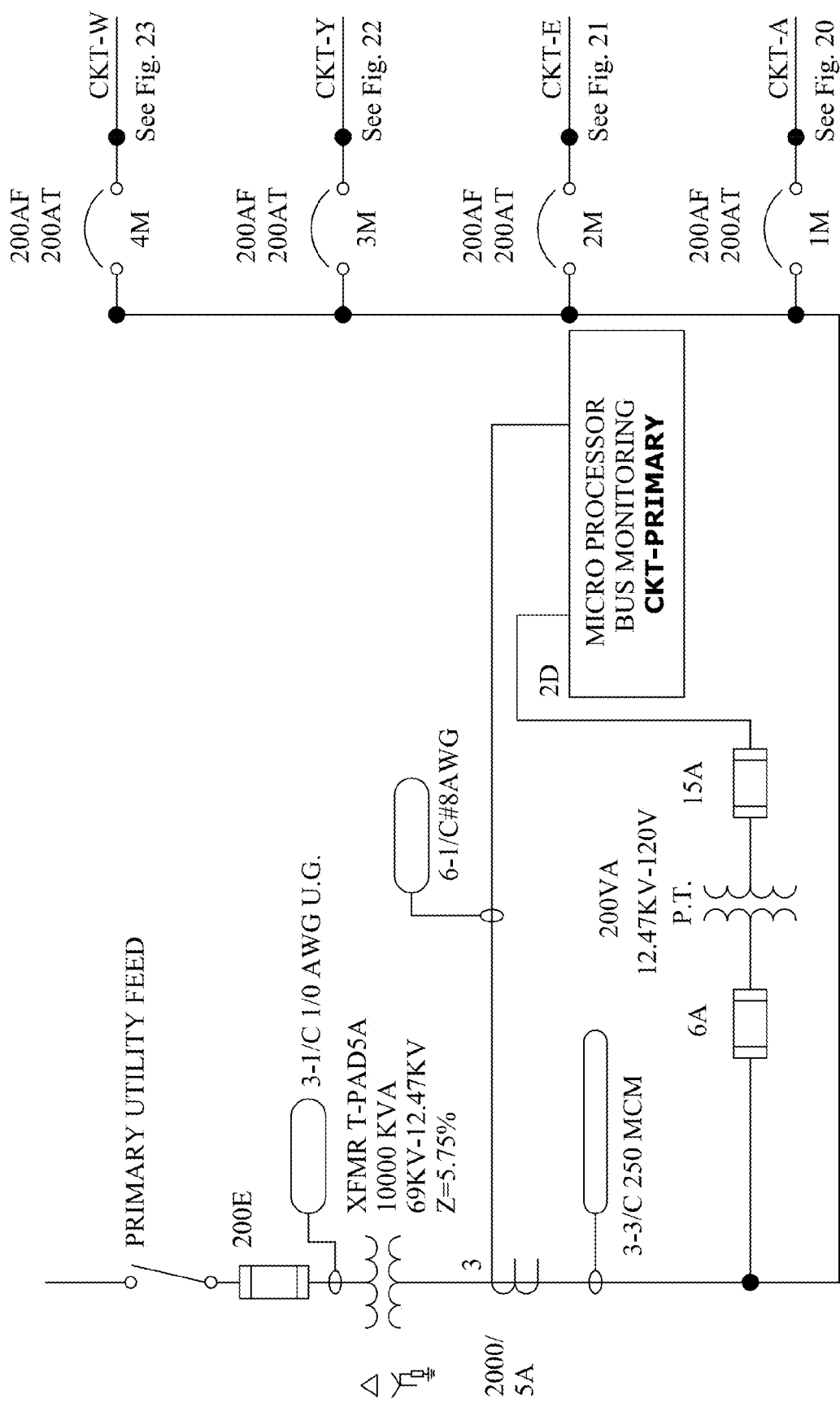
FIG. 18 is a schematic diagram of a power circuit and instrumentation that may be used to monitor that power circuit.
Figure 19:
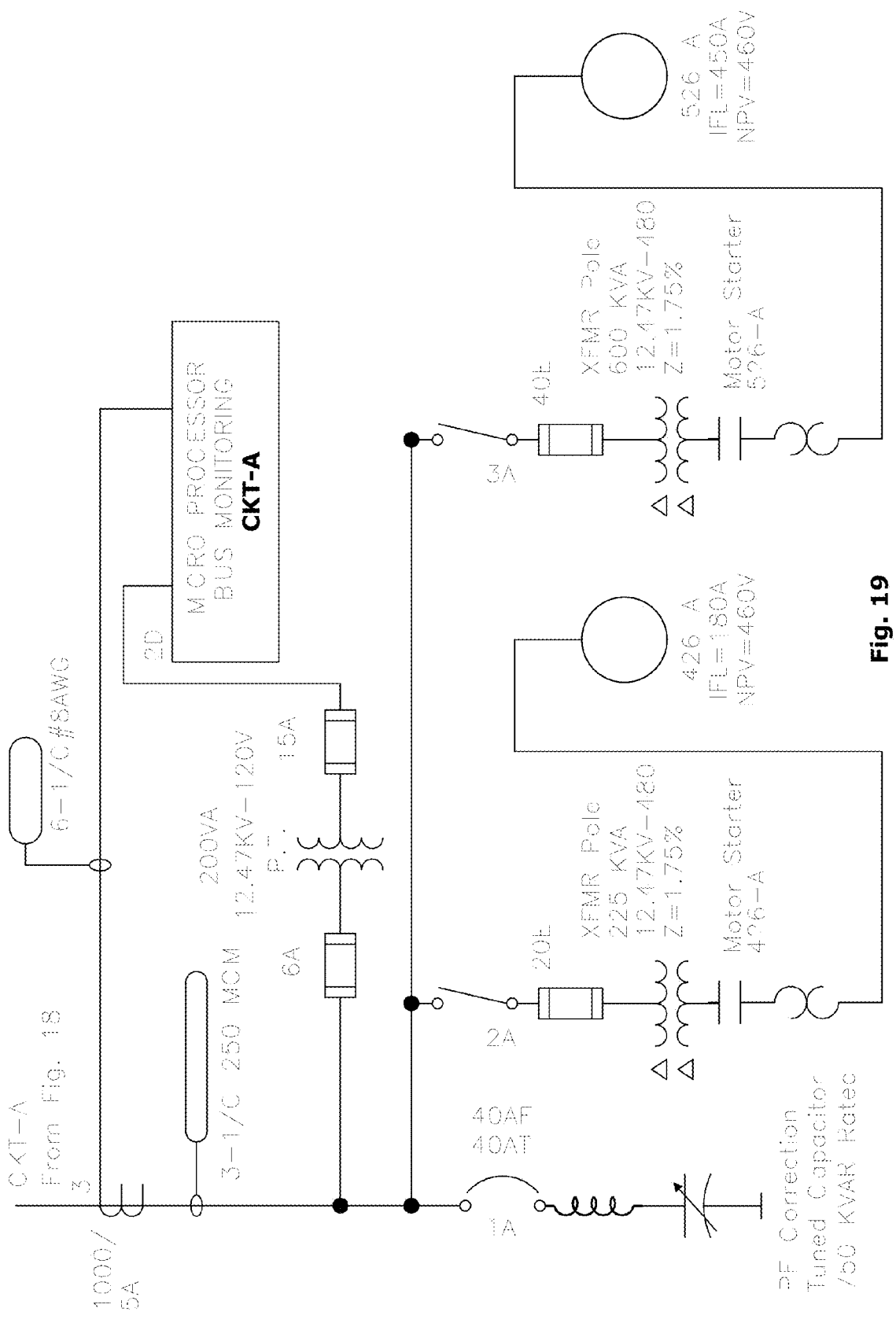
FIG. 19 is a schematic diagram of a power circuit that is a sub-circuit of the power circuit shown in FIG. 18 and instrumentation that may be used to monitor that power circuit.
Figure 20:
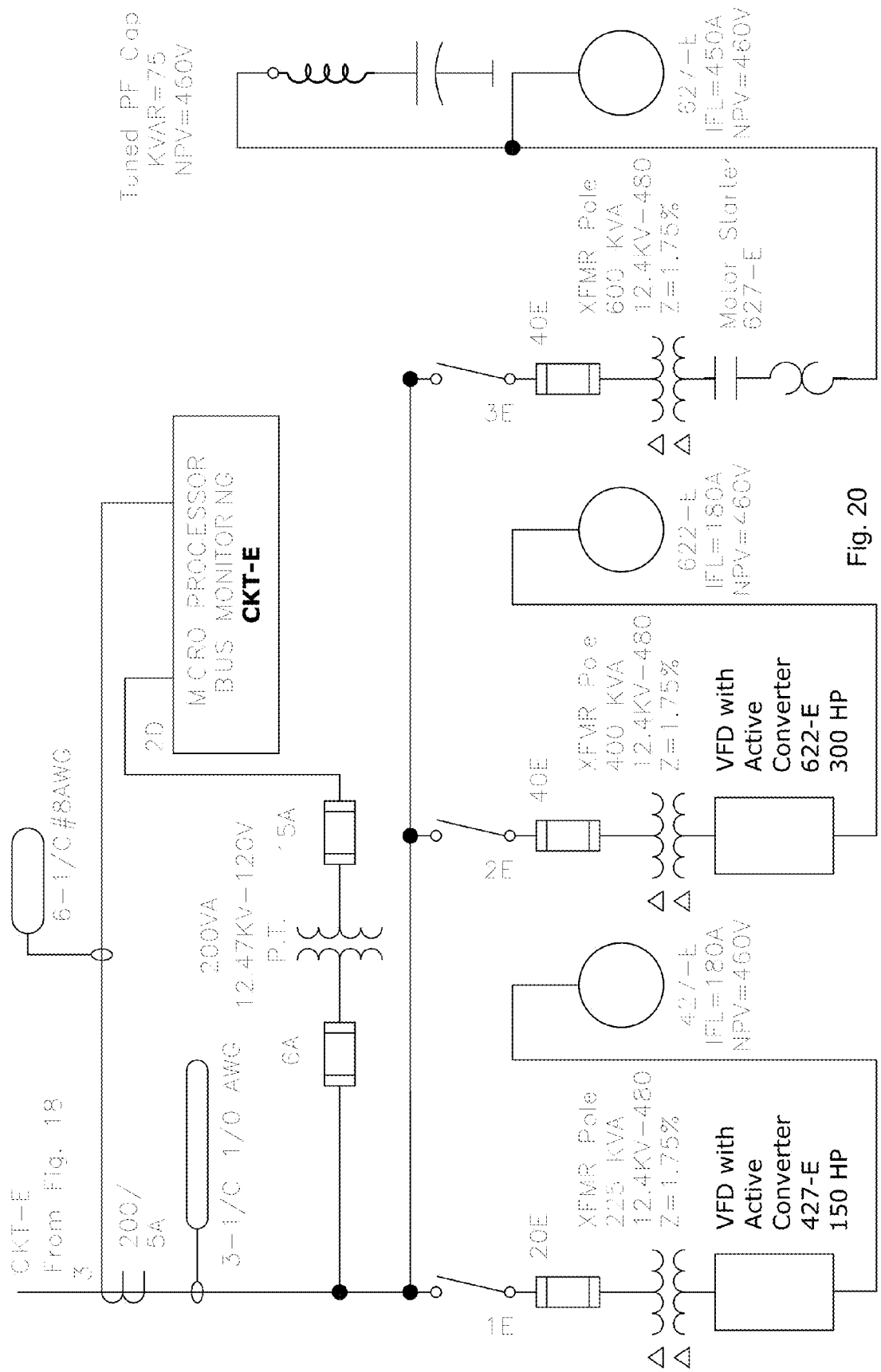
FIG. 20 is a schematic diagram of a power circuit that is a sub-circuit of the power circuit shown in FIG. 18 and the instrumentation that may be used to monitor that power circuit.
Figure 21:
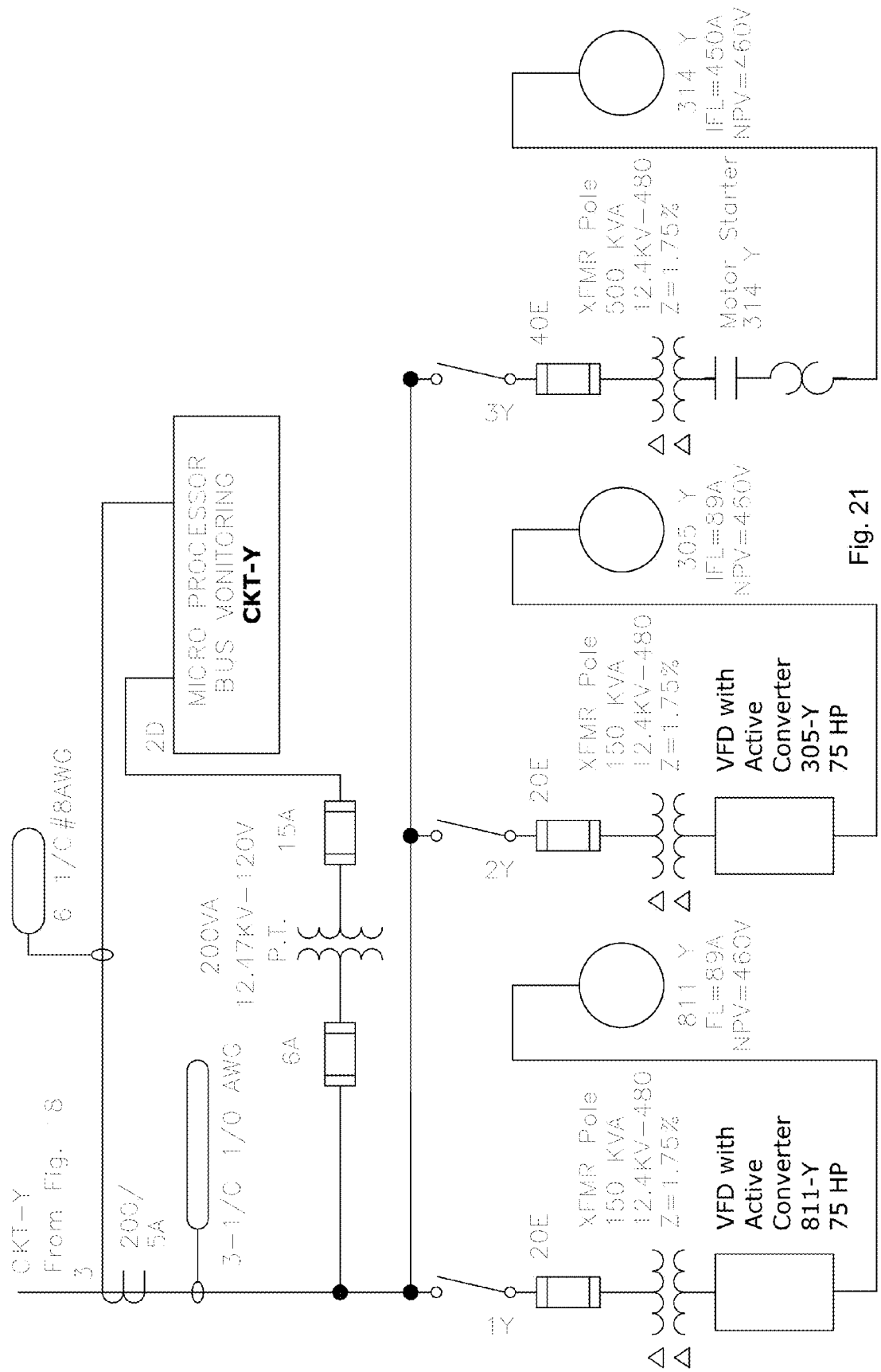
FIG. 21 is a schematic diagram of a power circuit that is a sub-circuit of that power circuit shown in FIG. 18 and the instrumentation that may be used to monitor that power circuit.
Figure 22:
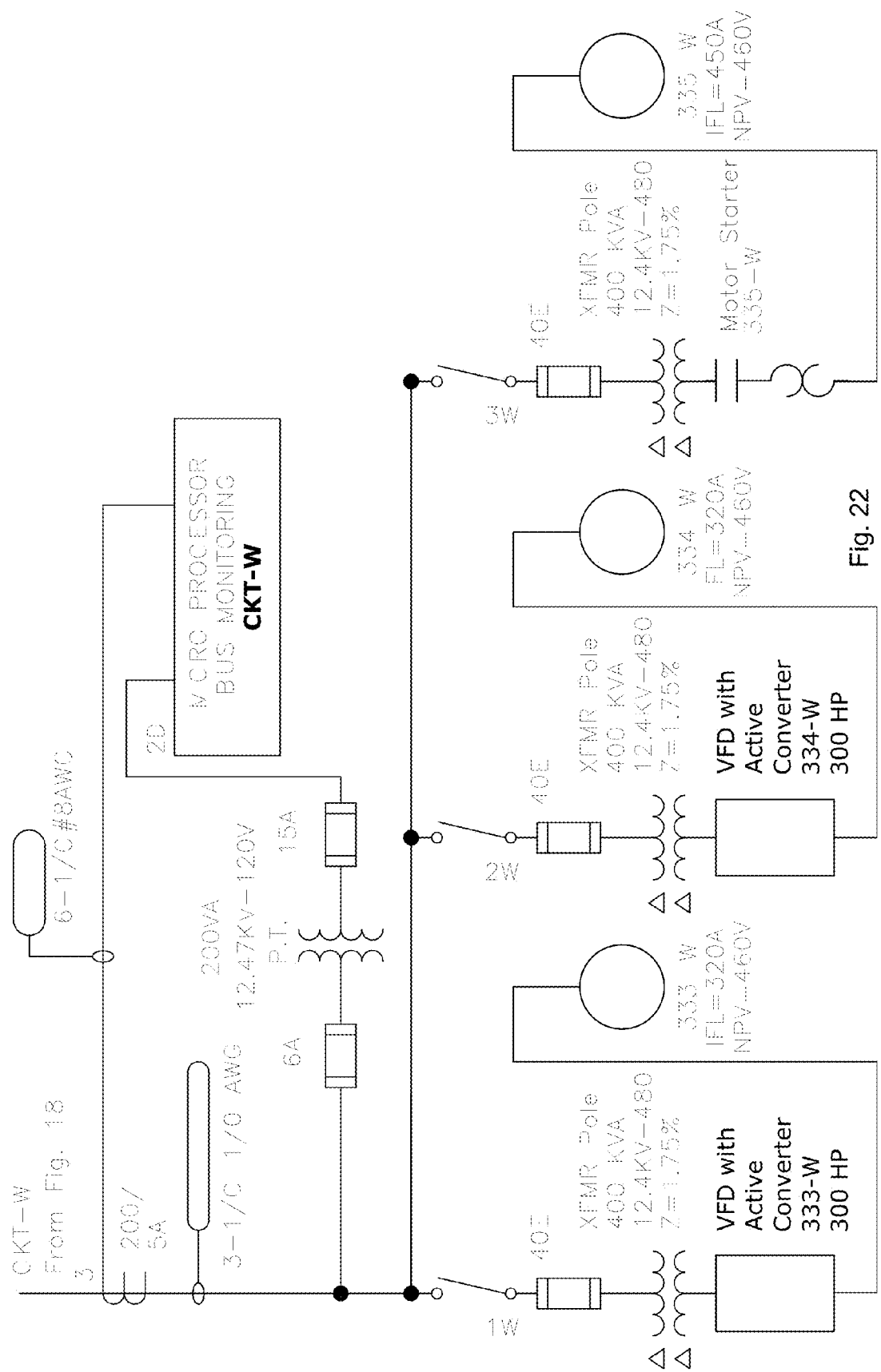
FIG. 22 is a schematic diagram of a power circuit that is a sub-circuit of that power circuit shown in FIG. 18 and the instrumentation that may be used to monitor that power circuit.
Figure 23C:
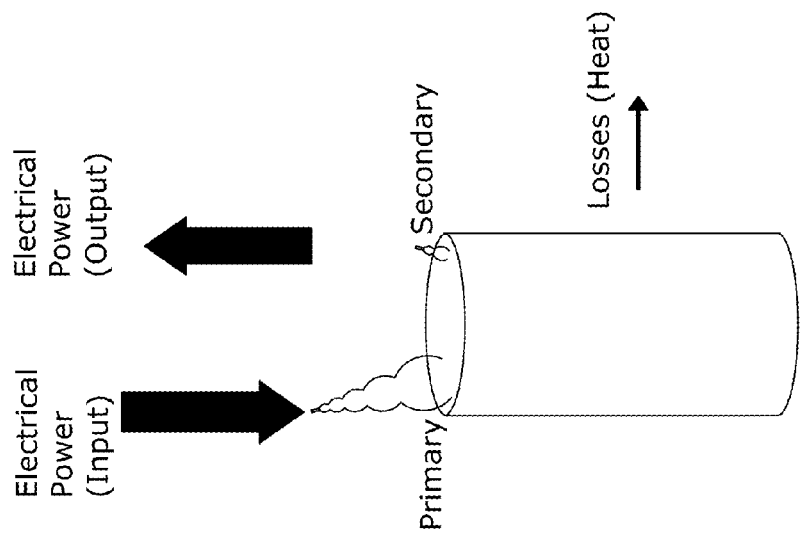
FIG. 23C is an illustration of how power is transferred through a transformer.
Figure 23B:
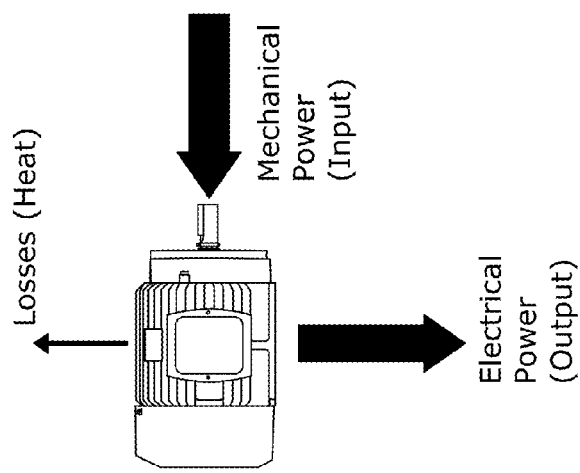
FIG. 23B is an illustration of how power is transferred through an electric motor when power is being transferred from the mechanical load to the power grid PG.
Figure 23A:
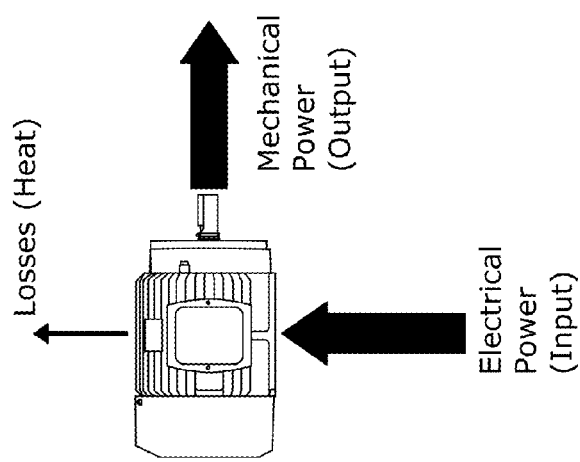
FIG. 23A is an illustration of how power is transferred through an electric motor when power is being transferred from the power grid PG to the mechanical load.

The secondary of the transformer T-PAD5AA, FIG. 18, is rated at 12.4 KV @ 116 Amps. Therefore, if the transformer T-PAD5AA is not to be overloaded, the amperes measured at its secondary must not exceed 116 A. There are 4 sub-circuits, sometimes called feeders, that are powered by the secondary of transformer T-PAD5AA. These feeders are CKT-A, CKT-E, CKT-Y and CKT-W.

There are 5 different Bus Monitoring devices installed in this power distribution system. The 5 different bus monitoring devices will be called
1. BUS—CKT-PRIMARY
2. BUS—CKT-A
3. BUS—CKT-E
4. BUS—CKT-Y
5. BUS—CKT-W Each of the bus monitors measures current and voltage in all 3 phases of the electrical power distribution system. Each of the bus monitors measures current and voltage at one location only. The one location that the bus monitor measures current and voltage is shown in the one line diagram. The bus monitor is a sophisticated device. It has the capability to calculate real power, reactive power, real current, reactive current, total current, power factor, apparent power and many other quantities associated with an electrical power distribution system. Additionally, the bus monitor is equipped with communication capabilities. The bus monitor has the capacity to transmit all of its measured and calculated quantities via a communication network (not shown) to a central computer (not shown). The central computer will typically be equipped with software that can analyze the entire electrical power distribution network using information measured and calculated at each of the bus monitors.

Power engineers can use this information to make decisions regarding the operation of the electrical power distribution system. Decisions such as which circuits to energize or de-energize, which devices to operate or not operate and how to control devices that are in operation can all be made manually or automatically by analyzing information from the bus monitors and other information. Bus monitors and associated software are useful for safe, reliable, efficient and economical operation of a power distribution system. Bus monitors and associated software are the result of technology and knowledge developed by power engineers over the course of many decades that is mature, well developed, extremely powerful and refined. Bus monitors and associated software are typically relatively expensive to purchase and require skilled power engineers to operate.

For the purposes of the following examples, it will be assumed that the current and voltage is measured and known at all points in the electrical power distribution system. In order to keep the examples simple and relevant, certain assumptions will be made. Conductors shall be considered to be ideal with zero resistance, zero inductance, zero capacitance phase to ground and zero capacitance phase to phase. Assuming ideal conductors is not something that could be done in real-world analysis of a power distribution system. However, this does greatly reduce the complexity of the analysis without detracting from the conveying the relevant aspects of our system and method. Another assumption shall be that all quantities and analysis shall be done on an average basis. This assumption is extremely important and requires further elaboration. Many mechanical loads change rapidly and unpredictably. An example could be a conveyor belt. The conveyor belt may be powered by a one of the motors shown in our sample power distribution system. The conveyor belt may be operated in such a way that it is moving heavy boxes. Considering this conveyor belt further, the heavy boxes may be placed onto the conveyor belt and taken off the conveyer belt at different locations and at random intervals of time. As the heavy boxes are placed on the conveyor belt the load may spike upwards. As the boxes are taken off of the conveyor belt the load may rapidly drop. Therefore, the load may be characterized by rapid changes. However, if the load is averaged over a given period of time the average load will be much more stable. It is the average load that will be considered in the analysis of our examples. This particular average loading assumption is typical when analyzing electrical power distribution systems. This is because of a concept called "load diversity".

Load diversity is a well understood and complex concept that involves analysis of probabilities. For example, if a factory has dozens of the conveyors as described previously the probability of the loads of all conveyors spiking simultaneously is virtually zero. Therefore, the power distribution system need not be specified, designed or installed to accommodate this worst case scenario. Additional assumptions for all analysis of sample power distribution system examples: Transformer efficiency is 98%, motor efficiency is 90%, transformer magnetizing current is 10% of rating and motor magnetizing current is 40% of rating. Electrical representation of motors and transformers for the purposes of this application shall be assumed to be the simplest most basic models for transformers and motors. For example, the transformer magnetizing branch used in the transformer model shall include inductance only. Magnetic branch losses shall be ignored and electrical resistance of the magnetizing branch shall be assumed to be infinite. These assumptions will greatly reduce the complexity of the information and calculations without negatively impacting the description of our system and method.

Finally, one point of clarification should be made. Transformers are unique devices in that they have a primary voltage and secondary voltage and a single KVA rating. So one might ask, does the KVA rating apply to the primary side of the transformer or the secondary side of the transformer. In fact, the KVA rating applies to both the primary and secondary side of the transformer. This is because the transformer reduces the voltage by the exact same ratio that it increases the current. Said another way, if an example transformer reduces voltage by a factor of 10, and if the primary has a current rating of 10 amps and voltage rating of 100, then the secondary will have the a current rating of 100 amps and voltage rating of 10. The product of voltage and amperage is the same on both the primary and secondary. It is for this reason that, some of the analysis shows unloaded transformers drawing apparent power at 480 VAC even though there is actually zero load on the secondary (480 VAC) side of the transformer. For the purposes of our analysis, it does not matter if the KVA, KVAR or KW is referred to the primary or the secondary side of the transformer. Furthermore, it clarifies the information and calculation to choose one side of the transformer to refer all calculations. Therefore, we shall choose the secondary side for the purposes of this application. Therefore, a typical summary report for this electrical power distribution system will appear as follows:

Example #0—No Equipment Operating

Transformers energized. Reactive current required to magnetize distribution transformers only. Zero reactive power injection.

SUMMARY REPORT
Example #0
Description: No equipment operating.

| | | | |
|---|---|---|---|
| CKT-PRIMARY | Voltage | 12362 | VAC |
| | Current | 17 | AMPS |
| | Real Power | 0 | KW |
| | Reactive Power | 378 | KVAR |
| | Apparent Power | 378 | KVA |
| | Power Factor | 0.00 | |
| CKT-A | Voltage | 12362 | VAC |
| | Current | 3 | AMPS |
| | Real Power | 0 | KW |
| | Reactive Power | 73 | KVAR |
| | Apparent Power | 73 | KVA |
| | Power Factor | 0.00 | |
| CKT-E | Voltage | 12362 | VAC |
| | Current | 4 | AMPS |
| | Real Power | 0 | KW |
| | Reactive Power | 95 | KVAR |
| | Apparent Power | 95 | KVA |
| | Power Factor | 0.00 | |
| CKT-Y | Voltage | 12362 | VAC |
| | Current | 4 | AMPS |
| | Real Power | 0 | KW |
| | Reactive Power | 80 | KVAR |
| | Apparent Power | 80 | KVA |
| | Power Factor | 0.00 | |
| CKT-W | Voltage | 12362 | VAC |
| | Current | 6 | AMPS |
| | Real Power | 0 | KW |
| | Reactive Power | 130 | KVAR |
| | Apparent Power | 130 | KVA |
| | Power Factor | 0.00 | |
| Summary Components | PF CAP | | |
| CKT-A (Components) | Voltage | 12362 | VAC |
| | Current | 0 | AMPS |
| | Real Power | 0 | KW |
| | Reactive Power | 0 | KVAR |
| | Apparent Power | 0 | KVA |

SUMMARY REPORT
Example #0
Description: No equipment operating.

|  |  |  |  |
|---|---|---|---|
|  | Power Factor | 0 |  |
|  | 426A |  |  |
|  | Voltage | 475 | VAC |
|  | Current | 27 | AMPS |
|  | Real Power | 0 | KW |
|  | Reactive Power | 22.5 | KVAR |
|  | Apparent Power | 22.5 | KVA |
|  | Power Factor | 0.00 |  |
|  | 526A |  |  |
|  | Voltage | 475 | VAC |
|  | Current | 60 | AMPS |
|  | Real Power | 0 | KW |
|  | Reactive Power | 50 | KVAR |
|  | Apparent Power | 50 | KVA |
|  | Power Factor | 0.00 |  |
| CKT-E | 427E |  |  |
| (Components) | Voltage | 475 | VAC |
|  | Current | 27 | AMPS |
|  | Real Power | 0 | KW |
|  | Reactive Power | 22.5 | KVAR |
|  | Apparent Power | 23 | KVA |
|  | Power Factor | 0.00 |  |
|  | 622E |  |  |
|  | Voltage | 475 | VAC |
|  | Current | 27 | AMPS |
|  | Real Power | 0 | KW |
|  | Reactive Power | 22.5 | KVAR |
|  | Apparent Power | 23 | KVA |
|  | Power Factor | 0.00 |  |
|  | 627E |  |  |
|  | Voltage | 475 | VAC |
|  | Current | 60 | AMPS |
|  | Real Power | 0 | KW |
|  | Reactive Power | 50 | KVAR |
|  | Apparent Power | 50 | KVA |
|  | Power Factor | 0.00 |  |
| CKT-Y | 811Y |  |  |
| (Components) | Voltage | 475 | VAC |
|  | Current | 18 | AMPS |
|  | Real Power | 0 | KW |
|  | Reactive Power | 15 | KVAR |
|  | Apparent Power | 15 | KVA |
|  | Power Factor | 0.00 |  |
|  | 305Y |  |  |
|  | Voltage | 475 | VAC |
|  | Current | 18 | AMPS |
|  | Real Power | 0 | KW |
|  | Reactive Power | 15 | KVAR |
|  | Apparent Power | 15 | KVA |
|  | Power Factor | 0.00 |  |
|  | 314Y |  |  |
|  | Voltage | 475 | VAC |
|  | Current | 60 | AMPS |
|  | Real Power | 0 | KW |
|  | Reactive Power | 50 | KVAR |
|  | Apparent Power | 50 | KVA |
|  | Power Factor | 0.00 |  |
| CKT-W | 333W |  |  |
| (Components) | Voltage | 475 | VAC |
|  | Current | 48 | AMPS |
|  | Real Power | 0 | KW |
|  | Reactive Power | 40 | KVAR |
|  | Apparent Power | 40 | KVA |
|  | Power Factor | 0.00 |  |
|  | 334W |  |  |
|  | Voltage | 475 | VAC |
|  | Current | 48 | AMPS |
|  | Real Power | 0 | KW |
|  | Reactive Power | 40 | KVAR |
|  | Apparent Power | 40 | KVA |
|  | Power Factor | 0.00 |  |
|  | 335W |  |  |
|  | Voltage | 475 | VAC |
|  | Current | 60 | AMPS |
|  | Real Power | 0 | KW |

SUMMARY REPORT
Example #0
Description: No equipment operating.

|  |  |  |
|---|---|---|
| Reactive Power | 50 | KVAR |
| Apparent Power | 50 | KVA |
| Power Factor | 0.00 |  |

Figure 28:
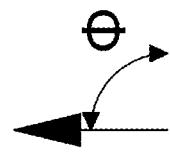
FIG. 28 is a vector diagram illustrating the electrical power circuit described in Example #0.

See FIG. 28 for schematic illustrating power triangle for Example #0.

Analysis of Example #0

Figure 1:
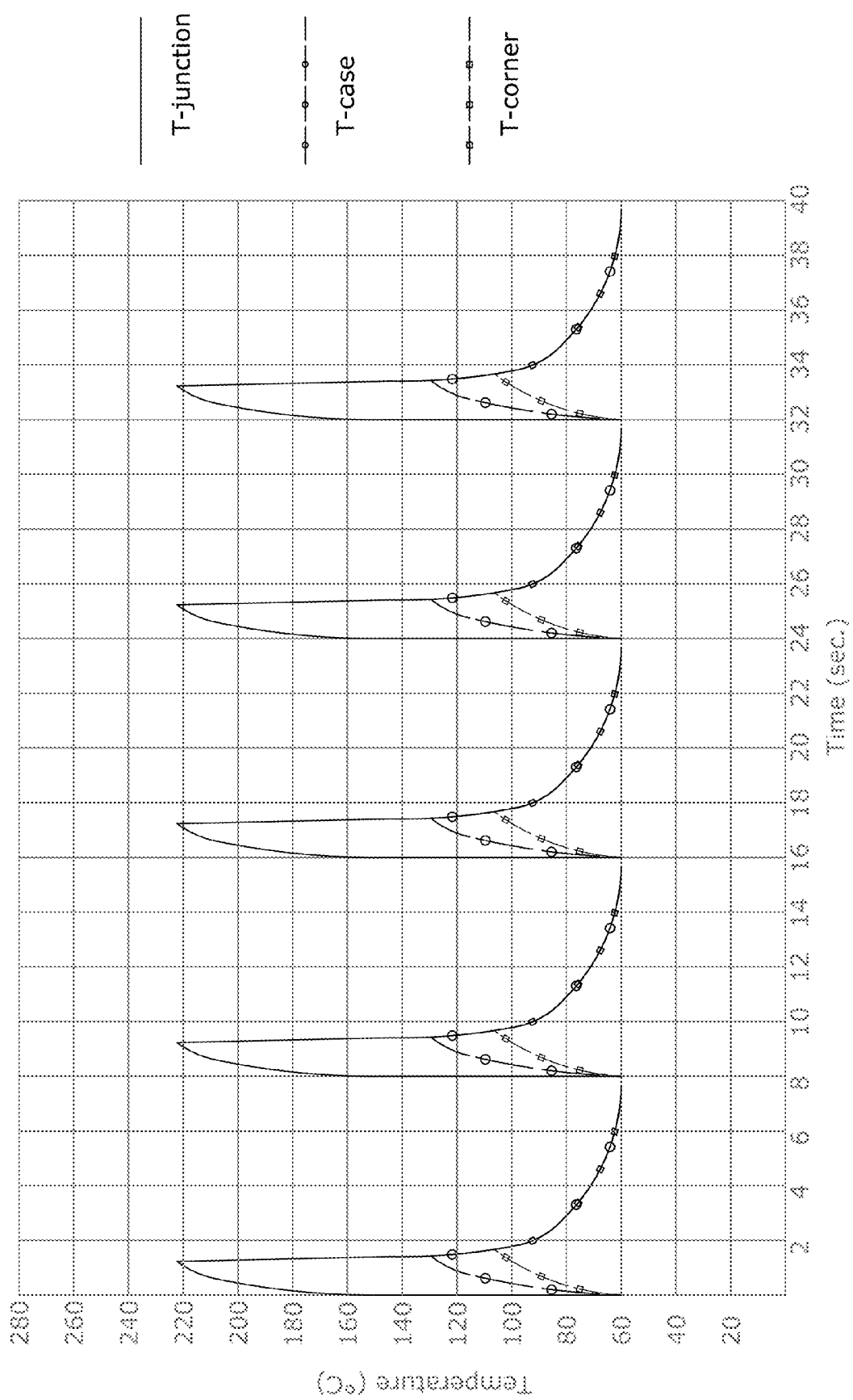
FIG. 1 is a graph illustrating transient temperature changes in an active converter over time.
Figure 2:
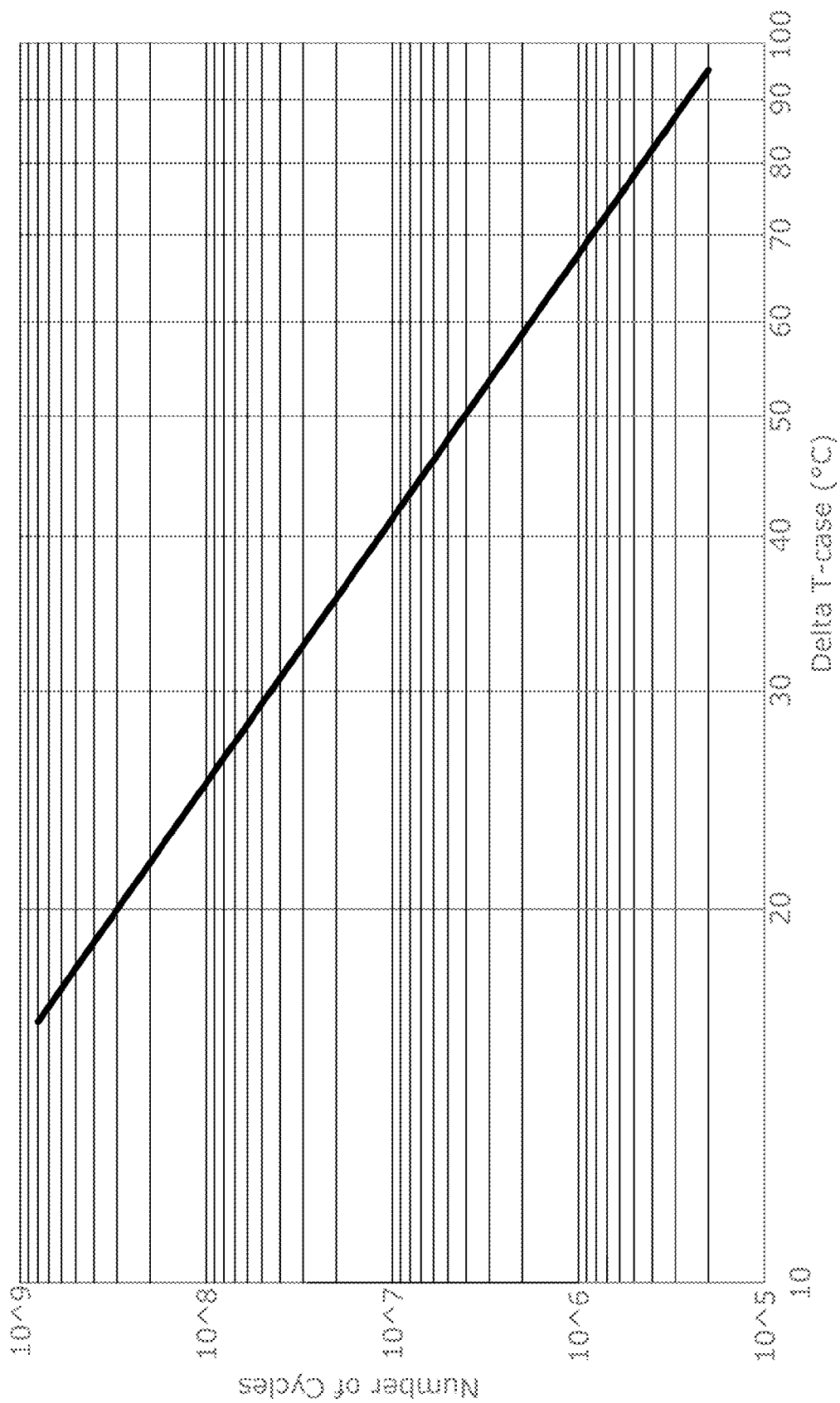
FIG. 2 is a graph illustrating how the number of cyclic temperature changes reduces the number of power cycling events.

Voltage at CKT-PRIMARY is 12,362 VAC. This voltage level is 108 VAC lower than the nominal voltage at this circuit location, which is 12,470. 108 VAC represents a 0.9% voltage drop vs. nominal voltage. This small voltage drop is due to the impedance of the T-PAD5A transformer. Transformers, in general, will have a slight voltage drop as which increases as the current through the transformer increases. At maximum current, 116 Amps for T-PAD5A, the voltage drop at CKT-PRIMARY would be 5.75% of nominal voltage. The number 5.75% is the rated impedance of the transformer shown on the drawing in FIG. 1.

Current at CKT-PRIMARY is 17 Amps. This current is due, in its entirety, to the magnetizing of the smaller distribution transformers in the electrical power distribution system.

KW at CKT-PRIMARY is 0. This example is considered at no load with ideal conductors and ideal transformers. Therefore, there is no real power transferred in this example.

KVAR at CKT-PRIMARY is 378 KVAR. This value is the sum of all the reactive power required to magnetize all of the distribution transformers in this electrical power distribution network.

KVA at CKT-PRIMARY is 378 KVA. The apparent power will equal the reactive power when there is no real power transferred.

Power Factor at CKT-PRIMARY is 0. Power factor is KW/KVA. Since KW is zero, the pf is zero.

Example #1—all Equipment Operating at 80% Load

Transformers energized. Reactive current required to magnetize distribution transformers and induction motors. The motor located at 627-E has a power factor correction capacitor that is integrated into its electrical circuit. Therefore, 627-E cannot be energized without energizing the power factor correction capacitor associated with this piece of electrical equipment. The circuit associated with 627-E has a net reactive power consumption of 115 KVAR. There is zero reactive power injection from other sources.

SUMMARY REPORT
Example #1
Description: All equipment operating 80% load
Reactive Power from PF Cap on 627-E only
Tuned PF Cap on CKT-A de-energized

|  |  |  |  |
|---|---|---|---|
| CKT-PRIMARY | Voltage | 11876 | VAC |
|  | Current | 96 | AMPS |
|  | Real Power | 1860 | KW |
|  | Reactive Power | 919 | KVAR |
|  | Apparent Power | 2074 | KVA |
|  | Power Factor | 0.90 |  |
| CKT-A | Voltage | 11876 | VAC |
|  | Current | 21 | AMPS |

SUMMARY REPORT
Example #1
Description: All equipment operating 80% load
Reactive Power from PF Cap on 627-E only
Tuned PF Cap on CKT-A de-energized

| | | | |
|---|---|---|---|
| | Real Power | 365 | KW |
| | Reactive Power | 269 | KVAR |
| | Apparent Power | 453 | KVA |
| | Power Factor | 0.81 | |
| CKT-E | Voltage | 11876 | VAC |
| | Current | 23 | AMPS |
| | Real Power | 465 | KW |
| | Reactive Power | 160 | KVAR |
| | Apparent Power | 492 | KVA |
| | Power Factor | 0.95 | |
| CKT-Y | Voltage | 11876 | VAC |
| | Current | 20 | AMPS |
| | Real Power | 365 | KW |
| | Reactive Power | 220 | KVAR |
| | Apparent Power | 426 | KVA |
| | Power Factor | 0.86 | |
| CKT-W | Voltage | 11876 | VAC |
| | Current | 33 | AMPS |
| | Real Power | 665 | KW |
| | Reactive Power | 270 | KVAR |
| | Apparent Power | 718 | KVA |
| | Power Factor | 0.93 | |
| Summary Components CKT-A (Components) | PF CAP Voltage | 11876 | VAC |
| | Current | 0 | AMPS |
| | Real Power | 0 | KW |
| | Reactive Power | 0 | KVAR |
| | Apparent Power | 0 | KVA |
| | Power Factor | 0 | |
| | 426A | | |
| | Voltage | 457 | VAC |
| | Current | 153 | AMPS |
| | Real Power | 100 | KW |
| | Reactive Power | 78.5 | KVAR |
| | Apparent Power | 127 | KVA |
| | Power Factor | 0.79 | |
| | 526A | | |
| | Voltage | 457 | VAC |
| | Current | 392 | AMPS |
| | Real Power | 265 | KW |
| | Reactive Power | 190 | KVAR |
| | Apparent Power | 326 | KVA |
| | Power Factor | 0.81 | |
| CKT-E (Components) | 427E | | |
| | Voltage | 457 | VAC |
| | Current | 123 | AMPS |
| | Real Power | 100 | KW |
| | Reactive Power | 22.5 | KVAR |
| | Apparent Power | 103 | KVA |
| | Power Factor | 0.98 | |
| | 622E | | |
| | Voltage | 457 | VAC |
| | Current | 123 | AMPS |
| | Real Power | 100 | KW |
| | Reactive Power | 22.5 | KVAR |
| | Apparent Power | 103 | KVA |
| | Power Factor | 0.98 | |
| | 627E | | |
| | Voltage | 457 | VAC |
| | Current | 347 | AMPS |
| | Real Power | 265 | KW |
| | Reactive Power | 115 | KVAR |
| | Apparent Power | 289 | KVA |
| | Power Factor | 0.92 | |
| CKT-Y (Components) | 811Y | | |
| | Voltage | 457 | VAC |
| | Current | 63 | AMPS |
| | Real Power | 50 | KW |
| | Reactive Power | 15 | KVAR |
| | Apparent Power | 52 | KVA |
| | Power Factor | 0.96 | |
| | 305Y | | |
| | Voltage | 457 | VAC |
| | Current | 63 | AMPS |
| | Real Power | 50 | KW |
| | Reactive Power | 15 | KVAR |
| | Apparent Power | 52 | KVA |
| | Power Factor | 0.96 | |
| | 314Y | | |
| | Voltage | 457 | VAC |
| | Current | 392 | AMPS |
| | Real Power | 265 | KW |
| | Reactive Power | 190 | KVAR |
| | Apparent Power | 326 | KVA |
| | Power Factor | 0.81 | |
| CKT-W (Components) | 333W | | |
| | Voltage | 457 | VAC |
| | Current | 245 | AMPS |
| | Real Power | 200 | KW |
| | Reactive Power | 40 | KVAR |
| | Apparent Power | 204 | KVA |
| | Power Factor | 0.98 | |
| | 334W | | |
| | Voltage | 457 | VAC |
| | Current | 245 | AMPS |
| | Real Power | 200 | KW |
| | Reactive Power | 40 | KVAR |
| | Apparent Power | 204 | KVA |
| | Power Factor | 0.98 | |
| | 335W | | |
| | Voltage | 457 | VAC |
| | Current | 392 | AMPS |
| | Real Power | 265 | KW |
| | Reactive Power | 190 | KVAR |
| | Apparent Power | 326 | KVA |
| | Power Factor | 0.81 | |

Figure 29:
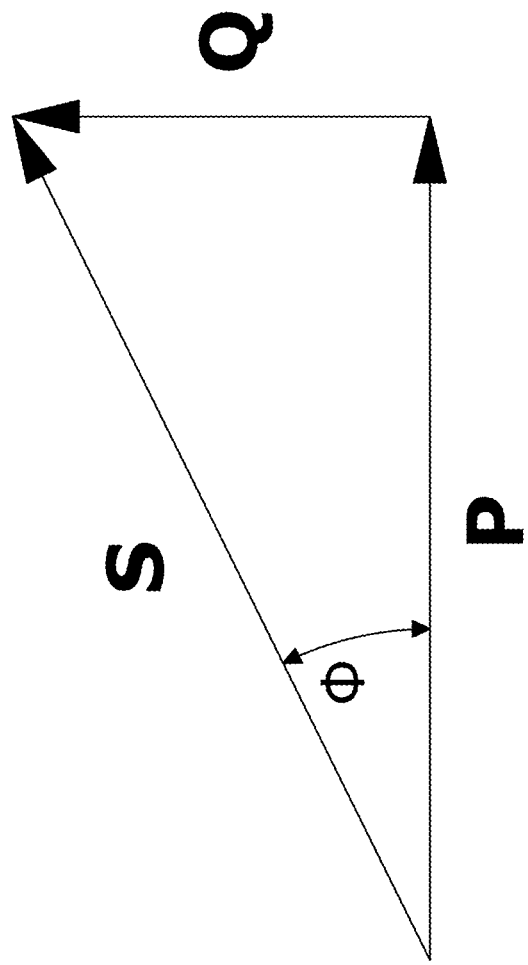
FIG. 29 is a vector diagram illustrating the electrical power circuit described in Example #1.

See FIG. 29 for schematic illustrating power triangle for Example #1.

Analysis of Example #1

Focusing on CKT-W component 334W is useful. Consider the reactive power shown component 334W in Example #1 vs. CKT-W component 334W in Example #0. In both examples, the required reactive power is 40 KVAR. As we established in Example #0, the 40 KVAR for this component is the required reactive current to magnetize the distribution transformer associated with this particular component. The reason no additional reactive power is indicated in Example #1 is that this component is equipped with an Variable frequency AC drive with Active Converter. The Variable frequency AC drive with Active Converter requires zero magnetizing current to operate the motor in all circumstances. As will be discussed in subsequent examples, the Variable frequency AC drive with Active Converter has the capability to inject or consume reactive power according to a reference and a control mode to be described later. The power factor shown for CKT-W component 334W is shown to be 0.98. This is, in fact, one of the characteristics of all Variable frequency AC drives equipped with Active Converter when said drive is operated in a control mode to neither inject nor consume reactive power. If we consider this component in even more details, one might ask "what is the source of the magnetizing current for the 300 Hp motor associated 334W?" The answer is, the Variable frequency AC drive with Active Converter is the source of the magnetizing current. The 40 KVAR shown for 334W is the amount of KVAR the electrical power distribution system must provide to this component. However, there is much more KVAR that is not "seen" by the electrical power distribution network. The induction motor on 334W must have magnetizing current. There is approximately 110 KVAR of reactive power required by the 300 Hp to magnetize its rotor. The 110 KVAR is present and can be measured between the wires connecting the output of Variable frequency AC drive equipped with Active Converter and the motor. However, this current does not exist on the wires connecting the input of the Variable frequency AC drive equipped with Active Converter and the electrical distribution system. One might say the Variable frequency AC drive equipped with Active Converter is manufacturing magnetizing current within itself. This is a true statement. The Variable frequency AC drive equipped with Active Converter has a large internal capacitor. Reactive Power is simply controlled and "circulated" between the output of the Variable frequency AC drive equipped with Active Converter and the induction motor. The input of the Variable frequency AC drive equipped with Active Converter never "sees" this current and this current cannot be measured in the electrical power distribution system.

Analyzing CKT-Y component 314Y shows a component operating at a relatively low power factor. This component is a large induction motor installed without a Variable frequency AC drive with Active Converter. Because there is no drive, the reactive power required to magnetize the induction motor must be provided by the electrical power distribution system. This is indicated by the large amount of reactive power, 190 KVAR, as compared to the real power, 267 KW. In this example, there is no KVAR injection, therefore, the reactive power for 314Y must be supplied the T-PAD5A transformer. The current associated with the reactive power must flow through the electrical power distribution system connecting the T-PAD5A transformer and 314Y.

Analyzing 627E in comparison to 314Y is informative as well. Both components 627E and 314Y are similar large induction motors. Both motors are consuming real power at the same level: 267 KW. However, 314Y is consuming 190 KVAR of reactive power and operating at a 0.81 pf. 627E is consuming 115 KVAR of reactive power and operating at a 0.92 pf. The reason 627E is consuming less KVAR of reactive power is that this motor is equipped with a reactive current source, namely the 75 KVAR "Tuned PF Cap" shown in the drawing. Both motors are in fact consuming the same amount of reactive power: 140 KVAR. However, 627E has a source of reactive power that is always active when the motor is energized. The Tune PF Cap produces 75 KVAR. Therefore, the net reactive power that must be supplied by the electrical power distribution system is the difference between the reactive power consumed by the motor and the reactive power produced by the Tuned PF Cap: 140 KVAR−75 KVAR=65 KVAR. When the 65 KVAR required by the combination of the motor and Tuned PF Cap is added to the 60 KVAR required to magnetize the transformer associated with 627E, the result is 115 KVAR of reactive power. 314Y is similar in every regard to 627E with the exception of the Tuned PF Cap. Therefore, 314Y requires 75 KVAR more than 627E, or 190 KVAR. Furthermore, consider the amperage required for 314Y vs. 627E. 314Y draw 392 Amps vs. 627E draw 347 Amps. Increasing the power factor and lowering reactive power demand results in significant reductions in overall amp draw. In this particular example 314Y requires 13% more amps than 627E.

The item to analyze in Example #2 is the overall totals measured at CKT-PRIMARY. The transformer T-PAD5A is supplying 2074 KVA, or about 83% of its rated capacity of 2500 KVA. This level of loading is within the transformer's capacity. However, one must bear in mind the fact that this example is calculated at 80% motor loading. Most power engineers would consider this electrical power distribution network fully loaded, if not slightly overloaded. Most power engineers would not consider adding any additional load to this electrical power distribution network as it presently configured and operating, Example #2—All Equipment Operating at 50% Load Transformers energized. Reactive current required to magnetize distribution transformers and induction motors. Zero net reactive power injection from any sources.

SUMMARY REPORT
Example #2
Description: All equipment operating 50% load
Zero net reactive power injection from sources.

| | | |
|---|---|---|
| CKT-PRIMARY | Voltage | 12047 VAC |
| | Current | 68 AMPS |
| | Real Power | 1160 KW |
| | Reactive Power | 919 KVAR |
| | Apparent Power | 1479 KVA |
| | Power Factor | 0.78 |
| CKT-A | Voltage | 12047 VAC |
| | Current | 16 AMPS |
| | Real Power | 228 KW |
| | Reactive Power | 269 KVAR |
| | Apparent Power | 352 KVA |
| | Power Factor | 0.65 |
| CKT-E | Voltage | 12047 VAC |
| | Current | 15 AMPS |
| | Real Power | 290 KW |
| | Reactive Power | 160 KVAR |
| | Apparent Power | 331 KVA |
| | Power Factor | 0.88 |
| CKT-Y | Voltage | 12047 VAC |
| | Current | 15 AMPS |
| | Real Power | 227 KW |
| | Reactive Power | 220 KVAR |
| | Apparent Power | 316 KVA |
| | Power Factor | 0.72 |
| CKT-W | Voltage | 12047 VAC |
| | Current | 23 AMPS |
| | Real Power | 415 KW |
| | Reactive Power | 270 KVAR |
| | Apparent Power | 495 KVA |
| | Power Factor | 0.84 |
| Summary Components CKT-A (Components) | PF CAP | |
| | Voltage | 12047 VAC |
| | Current | 0 AMPS |
| | Real Power | 0 KW |
| | Reactive Power | 0 KVAR |
| | Apparent Power | 0 KVA |
| | Power Factor | 0 |
| | 426A | |
| | Voltage | 463 VAC |
| | Current | 121 AMPS |
| | Real Power | 62.5 KW |
| | Reactive Power | 78.5 KVAR |
| | Apparent Power | 100 KVA |
| | Power Factor | 0.62 |
| | 526A | |
| | Voltage | 463 VAC |
| | Current | 303 AMPS |
| | Real Power | 165 KW |
| | Reactive Power | 190 KVAR |
| | Apparent Power | 252 KVA |
| | Power Factor | 0.66 |
| CKT-E (Components) | 427E | |
| | Voltage | 463 VAC |
| | Current | 80 AMPS |
| | Real Power | 62.5 KW |
| | Reactive Power | 22.5 KVAR |
| | Apparent Power | 66 KVA |

SUMMARY REPORT
Example #2
Description: All equipment operating 50% load
Zero net reactive power injection from sources.

| | | | |
|---|---|---|---|
| | | Power Factor | 0.94 |
| | 622E | | |
| | | Voltage | 463 VAC |
| | | Current | 80 AMPS |
| | | Real Power | 62.5 KW |
| | | Reactive Power | 22.5 KVAR |
| | | Apparent Power | 66 KVA |
| | | Power Factor | 0.94 |
| | 627E | | |
| | | Voltage | 463 VAC |
| | | Current | 242 AMPS |
| | | Real Power | 165 KW |
| | | Reactive Power | 115 KVAR |
| | | Apparent Power | 201 KVA |
| | | Power Factor | 0.82 |
| CKT-Y (Components) | 811Y | | |
| | | Voltage | 463 VAC |
| | | Current | 41 AMPS |
| | | Real Power | 31 KW |
| | | Reactive Power | 15 KVAR |
| | | Apparent Power | 34 KVA |
| | | Power Factor | 0.90 |
| | 305Y | | |
| | | Voltage | 463 VAC |
| | | Current | 41 AMPS |
| | | Real Power | 31 KW |
| | | Reactive Power | 15 KVAR |
| | | Apparent Power | 34 KVA |
| | | Power Factor | 0.90 |
| | 314Y | | |
| | | Voltage | 463 VAC |
| | | Current | 303 AMPS |
| | | Real Power | 165 KW |
| | | Reactive Power | 190 KVAR |
| | | Apparent Power | 252 KVA |
| | | Power Factor | 0.66 |
| CKT-W (Components) | 333W | | |
| | | Voltage | 463 VAC |
| | | Current | 158 AMPS |
| | | Real Power | 125 KW |
| | | Reactive Power | 40 KVAR |
| | | Apparent Power | 131 KVA |
| | | Power Factor | 0.95 |
| | 334W | | |
| | | Voltage | 463 VAC |
| | | Current | 158 AMPS |
| | | Real Power | 125 KW |
| | | Reactive Power | 40 KVAR |
| | | Apparent Power | 131 KVA |
| | | Power Factor | 0.95 |
| | 335W | | |
| | | Voltage | 463 VAC |
| | | Current | 303 AMPS |
| | | Real Power | 165 KW |
| | | Reactive Power | 190 KVAR |
| | | Apparent Power | 252 KVA |
| | | Power Factor | 0.66 |

Figure 30:
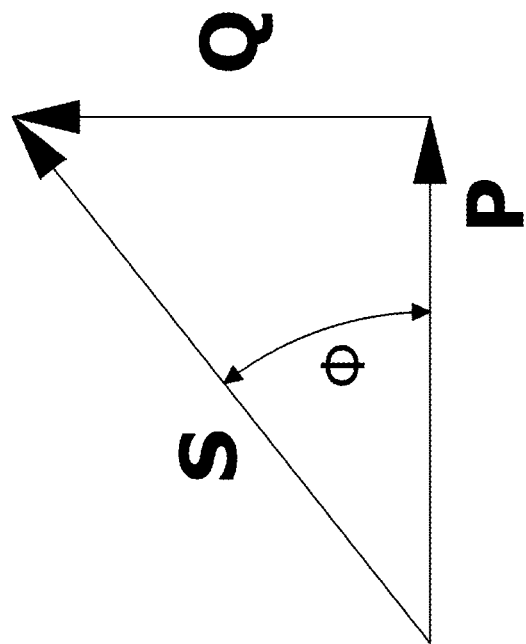
FIG. 30 is a vector diagram illustrating the electrical power circuit described in Example #2.

See FIG. 30 for schematic illustrating power triangle for Example #2.

Analysis of Example #2

There is little change between Example #2 and Example #1. However, Example #2 represents a much more realistic operating configuration for most electrical power distribution networks. It is very common, in practice, to measure loading levels of between 40% and 70% on most electrical power distribution networks. In fact, most power distribution networks operate at this level of load 99% of to the time. Looking into specifics characteristics of Example #2, the overall power factor measured at CKT-PRIMARY is 0.78. The transformer loading is 1479 KVAR or 59% of rated load. Both the power factor and loading level of Example #2 are significantly lower than that in Example #1. Again, Example #2 is a more realistic representative configuration of most real-world electrical power distribution networks.

Example #3—All Equipment Operating at 50% Load

Transformers energized. Reactive current required to magnetize distribution transformers and induction motors. Maximum Reactive Power produced CKT-A component PF CAP. Zero net reactive power injected from other sources.

SUMMARY REPORT
Example #3
Description: All equipment operating 50% load
Maximum Reactive Power Injection from Tuned PF Cap on CKT-A
Zero Net Reactive Power Injection from other sources

| | | | |
|---|---|---|---|
| CKT-PRIMARY | | Voltage | 12135 VAC |
| | | Current | 54 AMPS |
| | | Real Power | 1160 KW |
| | | Reactive Power | 169 KVAR |
| | | Apparent Power | 1172 KVA |
| | | Power Factor | 0.99 |
| CKT-A | | Voltage | 12135 VAC |
| | | Current | 25 AMPS |
| | | Real Power | 228 KW |
| | | Reactive Power | −482 KVAR |
| | | Apparent Power | 533 KVA |
| | | Power Factor | 0.43 |
| CKT-E | | Voltage | 12135 VAC |
| | | Current | 15 AMPS |
| | | Real Power | 290 KW |
| | | Reactive Power | 160 KVAR |
| | | Apparent Power | 331 KVA |
| | | Power Factor | 0.88 |
| CKT-Y | | Voltage | 12135 VAC |
| | | Current | 15 AMPS |
| | | Real Power | 227 KW |
| | | Reactive Power | 220 KVAR |
| | | Apparent Power | 316 KVA |
| | | Power Factor | 0.72 |
| CKT-W | | Voltage | 12135 VAC |
| | | Current | 23 AMPS |
| | | Real Power | 415 KW |
| | | Reactive Power | 270 KVAR |
| | | Apparent Power | 495 KVA |
| | | Power Factor | 0.84 |
| Summary Components CKT-A (Components) | | PF CAP | |
| | | Voltage | 12135 VAC |
| | | Current | 35 AMPS |
| | | Real Power | 0 KW |
| | | Reactive Power | −750 KVAR |
| | | Apparent Power | 750 KVA |
| | | Power Factor | 0 |
| | 426A | | |
| | | Voltage | 467 VAC |
| | | Current | 121 AMPS |
| | | Real Power | 62.5 KW |
| | | Reactive Power | 78.5 KVAR |
| | | Apparent Power | 100 KVA |
| | | Power Factor | 0.62 |
| | 526A | | |
| | | Voltage | 467 VAC |
| | | Current | 303 AMPS |
| | | Real Power | 165 KW |
| | | Reactive Power | 190 KVAR |
| | | Apparent Power | 252 KVA |
| | | Power Factor | 0.66 |
| CKT-E (Components) | 427E | | |
| | | Voltage | 467 VAC |
| | | Current | 80 AMPS |
| | | Real Power | 62.5 KW |
| | | Reactive Power | 22.5 KVAR |
| | | Apparent Power | 66 KVA |
| | | Power Factor | 0.94 |
| | 622E | | |

-continued

SUMMARY REPORT
Example #3
Description: All equipment operating 50% load
Maximum Reactive Power Injection from Tuned PF Cap on CKT-A
Zero Net Reactive Power Injection from other sources

|  |  | Voltage | 467 VAC |
|---|---|---|---|
|  |  | Current | 80 AMPS |
|  |  | Real Power | 62.5 KW |
|  |  | Reactive Power | 22.5 KVAR |
|  |  | Apparent Power | 66 KVA |
|  |  | Power Factor | 0.94 |
|  | 627E |  |  |
|  |  | Voltage | 467 VAC |
|  |  | Current | 242 AMPS |
|  |  | Real Power | 165 KW |
|  |  | Reactive Power | 115 KVAR |
|  |  | Apparent Power | 201 KVA |
|  |  | Power Factor | 0.82 |
| CKT-Y | 811Y |  |  |
| (Components) |  | Voltage | 467 VAC |
|  |  | Current | 41 AMPS |
|  |  | Real Power | 31 KW |
|  |  | Reactive Power | 15 KVAR |
|  |  | Apparent Power | 34 KVA |
|  |  | Power Factor | 0.90 |
|  | 305Y |  |  |
|  |  | Voltage | 467 VAC |
|  |  | Current | 41 AMPS |
|  |  | Real Power | 31 KW |
|  |  | Reactive Power | 15 KVAR |
|  |  | Apparent Power | 34 KVA |
|  |  | Power Factor | 0.90 |
|  | 314Y |  |  |
|  |  | Voltage | 467 VAC |
|  |  | Current | 303 AMPS |
|  |  | Real Power | 165 KW |
|  |  | Reactive Power | 190 KVAR |
|  |  | Apparent Power | 252 KVA |
|  |  | Power Factor | 0.66 |
| CKT-W | 333W |  |  |
| (Components) |  | Voltage | 467 VAC |
|  |  | Current | 158 AMPS |
|  |  | Real Power | 125 KW |
|  |  | Reactive Power | 40 KVAR |
|  |  | Apparent Power | 131 KVA |
|  |  | Power Factor | 0.95 |
|  | 334W |  |  |
|  |  | Voltage | 467 VAC |
|  |  | Current | 158 AMPS |
|  |  | Real Power | 125 KW |
|  |  | Reactive Power | 40 KVAR |
|  |  | Apparent Power | 131 KVA |
|  |  | Power Factor | 0.95 |
|  | 335W |  |  |
|  |  | Voltage | 467 VAC |
|  |  | Current | 303 AMPS |
|  |  | Real Power | 165 KW |
|  |  | Reactive Power | 190 KVAR |
|  |  | Apparent Power | 252 KVA |
|  |  | Power Factor | 0.66 |

Figure 31:
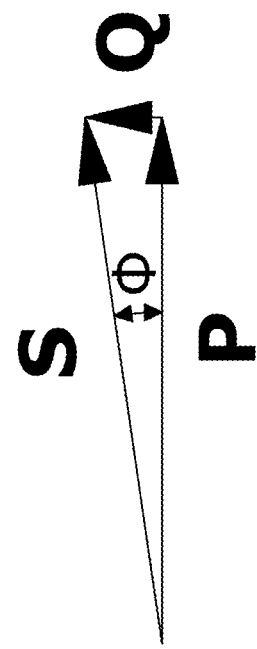
FIG. 31 is a vector diagram illustrating the electrical power circuit described in Example #3.

See FIG. 31 for schematic illustrating power triangle for Example #3.

Analysis of Example #3

There are few differences between the summary report of Example #2 and that of Example #3. However, the differences that do exist are significant and informative. All equipment in Example #2 and Example #3 is operating identically except for CKT-A Tuned PF CAP. In Example #3 the Tuned PF Cap is energized and producing its maximum rated amount of reactive power: 750 KVAR. In Example #3, CKT-A no shows a net reactive power consumption of −482 KVAR. −482 KVAR of reactive power consumption is identical to 482 KVAR of reactive power production according to the standard. Therefore, CKT-A is now a net producer of reactive power. Notice the power factor or CKT-A is shown as 0.43 in Example #3. This is a leading power factor, as opposed to a lagging power factor. As explained in the Apparent Power section above, a leading power factor is a circumstance in which the current leads the voltage in phase.

Finally, we must examine the CKT-PRIMARY results between the two examples. Here are the results:

| Example #2 | | | |
|---|---|---|---|
| CKT-PRIMARY | Voltage | 12047 | VAC |
|  | Current | 68 | AMPS |
|  | Real Power | 1160 | KW |
|  | Reactive Power | 919 | KVAR |
|  | Apparent Power | 1479 | KVA |
|  | Power Factor | 0.78 | |
| Example #3 | | | |
| CKT-PRIMARY | Voltage | 12135 | VAC |
|  | Current | 54 | AMPS |
|  | Real Power | 1160 | KW |
|  | Reactive Power | 169 | KVAR |
|  | Apparent Power | 1172 | KVA |
|  | Power Factor | 0.99 | |

The total reactive power of Example #3 is 169 KVAR. The total reactive power of Example #2 is 919 KVAR. As one would expect, there exists a net 750 KVAR difference between the two totals. This is due to the fact that Example #3 has the Tuned PF CAP injecting its maximum rated 750 KVAR of reactive power. However, as can be seen, there are many other effects of lowering the net reactive power demand in Example #3 vs. Example #2. The apparent power of Example #3 is 1172 KVA, while the apparent power of Example #2 is 1479 KVA. Reducing reactive power level also reduces apparent power levels. The current of Example #3 is 54 Amps, while the current of Example #2 is 68 Amps. As was explained earlier, lowering the current draw also reduces the voltage drop. Therefore, the voltage in Example #3 is 12,135 VAC, while the voltage in Example #2 is 12,047. In general, reducing reactive power requirements reduces the load on the T-PAD5A transformer and reduces the current in the conductors connected to the T-PAD5A transformer. Reducing the reactive power also increases the voltage, and makes the voltage more stable. The power factor in Example #3 is 0.99, while the power factor of Example #2 is 0.78. In most circumstances a slightly lagging power factor at the T-PAD5A transformer is desirable. A leading power factor at the T-PAD5A transformer would be highly undesirable. Most power systems are not designed or controlled to operate with a leading power factor for many reasons that are primarily related to voltage stability. The specific reasons that power systems are not designed to operate with a leading power are well understood by skilled power system engineers and will not be elaborated on further. However, it is not the case that no portions of the power system are to be operated with a leading power factor. For example, the feeder CKT-A in Example #3 is operated with a leading power factor. Operating portions of the system, so long as the system is designed to accommodate such operation, at a leading power factor is accepted practice and may, in some cases, be desirable. In any event, operation at a power factor of 0.99 at the CKT-PRIMARY location is the absolute maximum power factor that would be considered acceptable.

Please bear in mind, Example #3 and Example #2 are considered at identical real power levels: 1160 KW. The mechanical loading of the motors in both examples are identical. It is by changing the operation of the electrical system that one can change the electrical system's reliability, stability and versatility.

Example #4—All Equipment Operating at 40% Load

Transformers energized. Reactive current required to magnetize distribution transformers and induction motors. CKT-A component PF CAP is de-energized. Reactive power injected from active converters at 40% of rating.

SUMMARY REPORT
Example #4
Description: All equipment operating 50% load
40% of Rated Reactive Power Injection from Tuned PF Cap on CKT-A
40% of Rated Reactive Power Injection from Active Converters

| | | | |
|---|---|---|---|
| CKT-PRIMARY | Voltage | 12132 | VAC |
| | Current | 55 | AMPS |
| | Real Power | 1160 | KW |
| | Reactive Power | 227 | KVAR |
| | Apparent Power | 1181 | KVA |
| | Power Factor | 0.98 | |
| CKT-A | Voltage | 12132 | VAC |
| | Current | 11 | AMPS |
| | Real Power | 228 | KW |
| | Reactive Power | −32 | KVAR |
| | Apparent Power | 230 | KVA |
| | Power Factor | 0.99 | |
| CKT-E | Voltage | 12132 | VAC |
| | Current | 14 | AMPS |
| | Real Power | 290 | KW |
| | Reactive Power | 48 | KVAR |
| | Apparent Power | 294 | KVA |
| | Power Factor | 0.99 | |
| CKT-Y | Voltage | 12132 | VAC |
| | Current | 13 | AMPS |
| | Real Power | 227 | KW |
| | Reactive Power | 164 | KVAR |
| | Apparent Power | 280 | KVA |
| | Power Factor | 0.81 | |
| CKT-W | Voltage | 12132 | VAC |
| | Current | 19 | AMPS |
| | Real Power | 415 | KW |
| | Reactive Power | 46 | KVAR |
| | Apparent Power | 418 | KVA |
| | Power Factor | 0.99 | |
| Summary Components CKT-A (Components) | PF CAP | | |
| | Voltage | 12132 | VAC |
| | Current | 14 | AMPS |
| | Real Power | 0 | KW |
| | Reactive Power | −300 | KVAR |
| | Apparent Power | 300 | KVA |
| | Power Factor | 0 | |
| | 426A | | |
| | Voltage | 467 | VAC |
| | Current | 121 | AMPS |
| | Real Power | 62.5 | KW |
| | Reactive Power | 78.5 | KVAR |
| | Apparent Power | 100 | KVA |
| | Power Factor | 0.62 | |
| | 526A | | |
| | Voltage | 467 | VAC |
| | Current | 303 | AMPS |
| | Real Power | 165 | KW |
| | Reactive Power | 190 | KVAR |
| | Apparent Power | 252 | KVA |
| | Power Factor | 0.66 | |
| CKT-E (Components) | 427E | | |
| | Voltage | 467 | VAC |
| | Current | 85 | AMPS |
| | Real Power | 62.5 | KW |
| | Reactive Power | −33.5 | KVAR |
| | Apparent Power | 71 | KVA |
| | Power Factor | 0.88 | |
| | 622E | | |
| | Voltage | 467 | VAC |

-continued

SUMMARY REPORT
Example #4
Description: All equipment operating 50% load
40% of Rated Reactive Power Injection from Tuned PF Cap on CKT-A
40% of Rated Reactive Power Injection from Active Converters

| | | | |
|---|---|---|---|
| | Current | 85 | AMPS |
| | Real Power | 62.5 | KW |
| | Reactive Power | −33.5 | KVAR |
| | Apparent Power | 71 | KVA |
| | Power Factor | 0.88 | |
| | 627E | | |
| | Voltage | 467 | VAC |
| | Current | 242 | AMPS |
| | Real Power | 165 | KW |
| | Reactive Power | 115 | KVAR |
| | Apparent Power | 201 | KVA |
| | Power Factor | 0.82 | |
| CKT-Y (Components) | 811Y | | |
| | Voltage | 467 | VAC |
| | Current | 40 | AMPS |
| | Real Power | 31 | KW |
| | Reactive Power | −13 | KVAR |
| | Apparent Power | 34 | KVA |
| | Power Factor | 0.92 | |
| | 305Y | | |
| | Voltage | 467 | VAC |
| | Current | 40 | AMPS |
| | Real Power | 31 | KW |
| | Reactive Power | −13 | KVAR |
| | Apparent Power | 34 | KVA |
| | Power Factor | 0.92 | |
| | 314Y | | |
| | Voltage | 467 | VAC |
| | Current | 303 | AMPS |
| | Real Power | 165 | KW |
| | Reactive Power | 190 | KVAR |
| | Apparent Power | 252 | KVA |
| | Power Factor | 0.66 | |
| CKT-W (Components) | 333W | | |
| | Voltage | 467 | VAC |
| | Current | 174 | AMPS |
| | Real Power | 125 | KW |
| | Reactive Power | −72 | KVAR |
| | Apparent Power | 144 | KVA |
| | Power Factor | 0.87 | |
| | 334W | | |
| | Voltage | 467 | VAC |
| | Current | 174 | AMPS |
| | Real Power | 125 | KW |
| | Reactive Power | −72 | KVAR |
| | Apparent Power | 144 | KVA |
| | Power Factor | 0.87 | |
| | 335W | | |
| | Voltage | 467 | VAC |
| | Current | 303 | AMPS |
| | Real Power | 165 | KW |
| | Reactive Power | 190 | KVAR |
| | Apparent Power | 252 | KVA |
| | Power Factor | 0.66 | |

Figure 32:
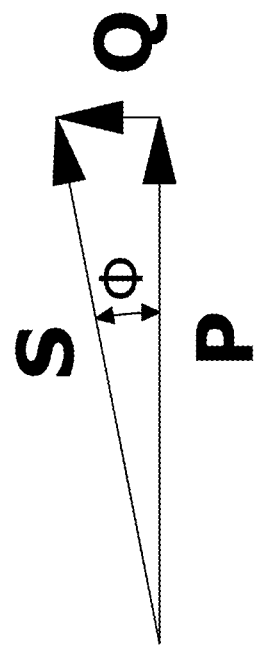
FIG. 32 is a vector diagram illustrating the electrical power circuit described in Example #4.

See FIG. 32 for schematic illustrating power triangle for Example #4.

Analysis of Example #4

Analysis of the power system operated in this configuration is complex, however, it is extremely helpful and information to consider this type of operation to appreciate the benefits of distributed reactive power production. Example #4 is best analyzed in comparison to Example #3:

| CKT-PRIMARY | Example #4 | Example #3 |
|---|---|---|
| Voltage | 12132 VAC | 12135 VAC |
| Current | 55 AMPS | 54 AMPS |
| Real Power | 1160 KW | 1160 KW |

-continued

| CKT-PRIMARY | Example #4 | Example #3 |
|---|---|---|
| Reactive Power | 227 KVAR | 169 KVAR |
| Apparent Power | 1181 KVA | 1172 KVA |
| Power Factor | 0.98 | 0.99 |

As can be seen in the two examples above, the conditions at the large transformer T-PAD5A are virtually identical between the two examples. Again, real power in both examples is identical. The voltage, current, real power, apparent power and power factor show no significant differences between the two examples. The reactive power is slightly different, with Example #4 being 34% higher than that of Example #3. However, as can be seen in the numbers above, the overall level of reactive power in both examples is not sufficiently large enough to significantly change the overall operation of the T-PAD5A transformer.

Next, let's look at the feeder circuits:

|  | Example #4 | Example #3 |
|---|---|---|
| CKT-A |  |  |
| Current | 11 AMPS | 25 AMPS |
| Reactive Power | −32 KVAR | −482 KVAR |
| CKT-E |  |  |
| Current | 14 AMPS | 15 AMPS |
| Reactive Power | 48 KVAR | 160 KVAR |
| CKT-Y |  |  |
| Current | 13 AMPS | 15 AMPS |
| Reactive Power | 164 KVAR | 220 KVAR |
| CKT-W |  |  |
| Current | 19 AMPS | 23 AMPS |
| Reactive Power | 46 KVAR | 270 KVAR |

To understand the changes in the feeder circuits shown above, one must recall that in Example #3 there was a single large source of reactive power located in CKT-A. This single large source of reactive power in Example #3 was a single Tuned PF Capacitor that had a rating of 750 KVAR. This capacitor was the source of reactive power used by all the loads on all the other feeders that consumed reactive power. However, in Example #4 there are many distributed sources of reactive power. It is the distributed nature of the reactive power that causes the feeder amperages to drop significantly. For example, feeder CKT-W in Example #4 draws 19 amps vs. an amp draw in Example #3 of 23 amps. The reduction in amps in Example #4 is due to the fact that in this example, there are reactive current sources on feeder CKT-W, not just reactive loads. The reactive sources on feeder CKT-W can feed reactive power to the reactive loads on CKT-W, therefore, the total current measured flowing from T-PAD5A to the feeder CKT-W is reduced. Using distributed reactive power sources has the effect reducing current loads in feeders as shown in these examples. In very large and complex electrical power distribution networks the effect of having many diverse and distributed sources of reactive power and many diverse and distributed loads that consume reactive power would be to effectively lower the current in virtually all feeder circuits. Depending on the specific circumstances present in the electrical power distribution system, this effect could be significant. In fact, lowering current on feeder circuits could allow more loads to be fed from existing feeders or allow existing loads to operate at higher loading levels.

The invention claimed is:

1. A system comprising:
   an AC motor having an input and an output adapted to be connected to a changing load;
   a variable frequency AC drive having an input adapted to be electrically coupled to an electric power grid and an output electrically connected to the input of the AC electric motor;
   said variable frequency AC drive including an active converter having a predetermined maximum apparent power capacity and an inverter connected to the converter and an output connected to the AC motor to provide reactive power to the motor;
   a programmed controller coupled to said converter to regulate reactive power generation and consumption of the variable frequency AC drive so that said drive produces reactive power when said converter is utilizing less than said converter's maximum apparent power capacity, said reactive power being generated without compromising the ability of the drive to provide real power as demanded by said load, said reactive power being fed to the power grid;
   wherein the programmed controller has a selectable mode control that establishes which one or more than one of a plurality of control strategies is employed, said strategies governing the combination of reactive power and real power to avoid the apparent power exceeding the maximum apparent power capacity of the active converter;
   wherein the programmed control strategies include (1) a first control strategy where the load on the motor changes slowly, (2) a second control strategy where the load changes rapidly, and (3) a third control strategy where the load is cyclic; and
   a device that monitors current and voltage from the power grid and generates a reference signal corresponding to a power factor for a system in which the apparatus is connected, and the controller is programmed to respond to said signal.

2. The system of claim 1, wherein according to the first control strategy the reactive power is a function of the maximum apparent power capacity of the converter and the real power demanded.

3. The system of claim 1, wherein according to the second control strategy the real power limit of an inverter connected to the converter through a DC bus is a function of the maximum apparent power capacity of the active converter and the instantaneous reactive power of the active converter.

4. The system of claim 1 wherein according to the third control strategy the reactive power is controlled so that apparent power is kept essentially constant.

5. The system of claim 1, wherein as the real power demanded by a load approaches levels resulting in an overload of the active converter, a predetermined real power limit of the inverter is lowered, and, as said predetermined real power limit is lowered, a predetermined instantaneous reactive power limit is reduced, and as said instantaneous reactive power is reduced, the predetermined real power limit of said inverter is increased.

6. An oil well including:
   an AC motor having an input and an output operably connected to a pump driven by to a pump that provides a cyclic load;
   a variable frequency AC drive having an input adapted to be electrically coupled to an electric power grid and an output electrically connected to the input of the AC electric motor;

said variable frequency AC drive including an active converter having a predetermined maximum apparent power capacity and an inverter connected to the converter and an output connected to the AC motor to provide reactive power to the motor;

a programmed controller coupled to said converter to regulate reactive power generation and consumption of the variable frequency AC drive so that said drive produces reactive power when said converter is utilizing less than said converter's maximum apparent power capacity, said reactive power being generated without compromising the ability of the drive to provide real power as demanded by said load, said reactive power being fed to the power grid;

wherein the programmed controller has a selectable mode control that establishes which one or more than one of a plurality of control strategies is employed, said strategies governing the combination of reactive power and real power to avoid the apparent power exceeding the maximum apparent power capacity of the active converter;

wherein the programmed control strategies include (1) a first control strategy where the load on the motor changes slowly, (2) a second control strategy where the load changes rapidly, and (3) a third control strategy where the load is cyclic; and a device that monitors current and voltage from the power grid and generates a reference signal corresponding to a power factor for a system in which the apparatus is connected, and the controller is programmed to respond to said signal.

7. An oil well including:

a pump operably connected to a cyclic load and driven by an AC motor having an input and an output;

a variable frequency AC drive having an input adapted to be electrically coupled to an electric power grid and an output electrically connected to the input of the AC electric motor;

said variable frequency AC drive including an active converter having a predetermined maximum apparent power capacity and an inverter connected to the converter and an output connected to the input of the AC motor to provide reactive power to said motor;

a programmed controller coupled to said converter to regulate reactive power generation and consumption of the variable frequency AC drive so that said AC drive produces reactive power when said converter is utilizing less than said converter's maximum apparent power capacity, said reactive power being generated without compromising the ability of the AC drive to provide real power as demanded by said cyclic load, said reactive power being fed to the power grid;

said programmed controller having a mode control that establishes a control strategy for said cyclic load where the reactive power is controlled so that apparent power is kept constant;

wherein the programmed controller has a selectable mode control that establishes which one or more than one of a plurality of control strategies is employed, said strategies governing the combination of reactive power and real power to avoid the apparent power exceeding the maximum apparent power capacity of the active converter;

wherein the programmed control strategies include (1) a first control strategy where the load on the motor changes slowly, (2) a second control strategy where the load changes rapidly, and (3) a third control strategy where the load is cyclic; and a device that monitors current and voltage from the power grid and generates a reference signal corresponding to a power factor for a system in which the apparatus is connected, and the controller is programmed to respond to said signal.

\* \* \* \* \*